United States Patent
Okada et al.

(10) Patent No.: US 7,102,650 B2
(45) Date of Patent: Sep. 5, 2006

(54) GRAPHIC DISPLAY APPARATUS, CHARACTER DISPLAY APPARATUS, DISPLAY METHOD, RECORDING MEDIUM, AND PROGRAM

(75) Inventors: Satoshi Okada, Kyoto (JP); Noriyuki Koyama, Kyoto (JP); Yoshimi Asai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/133,247

(22) Filed: May 20, 2005

(65) Prior Publication Data

US 2005/0212815 A1    Sep. 29, 2005

Related U.S. Application Data

(62) Division of application No. 09/864,217, filed on May 25, 2001, now Pat. No. 6,914,615.

(30) Foreign Application Priority Data

May 26, 2000   (JP)   .............................. 2000-157420
May 10, 2001   (JP)   .............................. 2001-140777

(51) Int. Cl.
 *G09G 5/00*   (2006.01)
(52) U.S. Cl. ...................... 345/615; 345/613; 345/614; 345/582; 345/589
(58) Field of Classification Search ................ 345/615, 345/613, 614, 582, 589
See application file for complete search history.

(56) References Cited

U.S. PATENT DOCUMENTS

| | | | |
|---|---|---|---|
| 4,720,745 A | 1/1988 | DeForest et al. | |
| 5,278,950 A | 1/1994 | Takei et al. | |
| 5,329,599 A | 7/1994 | Curry et al. | |
| 5,450,208 A | 9/1995 | Murata | |
| 5,572,638 A | 11/1996 | Fujii | |
| 5,838,333 A * | 11/1998 | Matsuo | 345/604 |
| 5,873,022 A | 2/1999 | Huizer et al. | |
| 6,069,971 A * | 5/2000 | Kanno et al. | 382/144 |
| 6,118,452 A | 9/2000 | Gannett | |
| 6,396,505 B1 | 5/2002 | Lui et al. | |
| 6,535,221 B1 | 3/2003 | Allen et al. | |
| 6,677,950 B1 * | 1/2004 | Ohba et al. | 345/503 |

FOREIGN PATENT DOCUMENTS

| | | |
|---|---|---|
| EP | 0 435 391 A2 | 7/1991 |
| EP | 0 528 365 A2 | 2/1993 |

OTHER PUBLICATIONS

SID 00 Digest, "20.4: Displaced Filtering for Patterned Displays," C. Betrisey et al., pp. 296-299.

* cited by examiner

*Primary Examiner*—Kee M. Tung
*Assistant Examiner*—Mike Rahmjoo
(74) *Attorney, Agent, or Firm*—Birch, Stewart, Kolasch & Birch, LLP

(57) ABSTRACT

A graphic display apparatus for displaying a graphic which is represented by binary bit map data includes: a display device including a plurality of sub-pixels; and a control section for controlling the display device, wherein the plurality of sub-pixels form a plurality of groups, each of the plurality of groups includes a predetermined plural number of sub-pixels, and the control section assigns each of bits included in the bit map data to one of the plurality of groups and displays the graphic by controlling sub-pixels included in the one of the plurality of groups based on information about bits located in the vicinity of the bit assigned to the one of the plurality of groups.

4 Claims, 43 Drawing Sheets

FIG.5

Brightness table 92

| | | Brightness level | | |
|---|---|---|---|---|
| | | R | G | B |
| Color element level | 7 | 0 | 0 | 0 |
| | 6 | 36 | 36 | 36 |
| | 5 | 73 | 73 | 73 |
| | 4 | 109 | 109 | 109 |
| | 3 | 146 | 146 | 146 |
| | 2 | 182 | 182 | 182 |
| | 1 | 219 | 219 | 219 |
| | 0 | 255 | 255 | 255 |

FIG. 6

Brightness table 94

|  | Brightness level | | |
|---|---|---|---|
|  | R | G | B |
| Color element level 7 | 0 | 0 | 0 |
| 6 | 30 | 30 | 30 |
| 5 | 60 | 60 | 60 |
| 4 | 100 | 100 | 100 |
| 3 | 150 | 150 | 150 |
| 2 | 185 | 185 | 185 |
| 1 | 220 | 220 | 220 |
| 0 | 255 | 255 | 255 |

FIG. 7

Brightness table 96

|  | Brightness level | | |
|---|---|---|---|
|  | R | G | B |
| Color element level 7 | 0 | 0 | 0 |
| 6 | 36 | 36 | 105 |
| 5 | 73 | 73 | 130 |
| 4 | 109 | 109 | 155 |
| 3 | 146 | 146 | 180 |
| 2 | 182 | 182 | 205 |
| 1 | 219 | 219 | 230 |
| 0 | 255 | 255 | 255 |

FIG. 9

Correction pattern table 2060

| Correction pattern 1 | Color element level | Sub-pixel 1 | 5 |
|---|---|---|---|
| | | Sub-pixel 2 | 2 |
| | | Sub-pixel 3 | 1 |

FIG.20

Correction pattern table 2170

| | |
|---|---|
| Superfine Correction pattern 1 | 5 |
| | 2 |
| | 1 |
| Fine Correction pattern 2 | 6 |
| | 3 |
| | 1 |
| Medium Correction pattern 3 | 5 |
| | 3 |
| | 2 |
| | 1 |
| Bold Correction pattern 4 | 6 |
| | 4 |
| | 2 |
| | 1 |
| Superbold Correction pattern 5 | 6 |
| | 4 |
| | 3 |
| | 2 |
| | 1 |

FIG.21

Correction pattern table 2180

| ~20 dots<br>Correction<br>pattern 1 | 5 |
| | 2 |
| | 1 |
| 21~32 dots<br>Correction<br>pattern 2 | 6 |
| | 4 |
| | 2 |
| | 1 |
| 33~48 dots<br>Correction<br>pattern 3 | 6 |
| | 4 |
| | 3 |
| | 2 |
| | 1 |

FIG.22

Correction pattern table 2270

| Normal<br>Correction<br>pattern 1 | 5 |
| | 2 |
| | 1 |
| Complicated<br>Correction<br>pattern 2 | 5 |
| | 2 |

FIG.23A
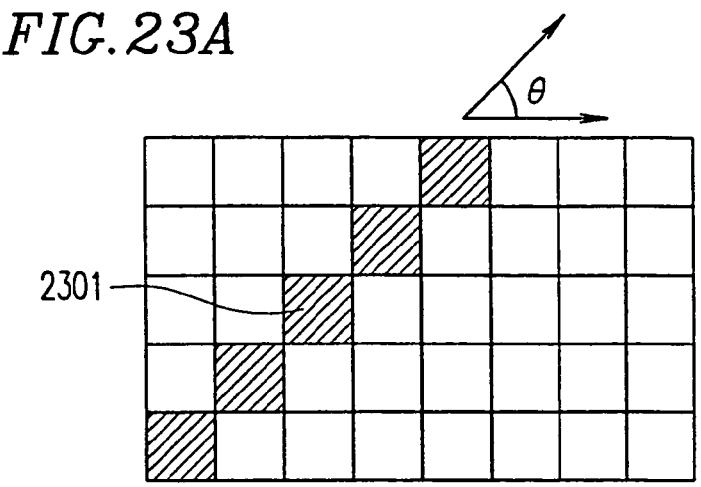
FIG.23B
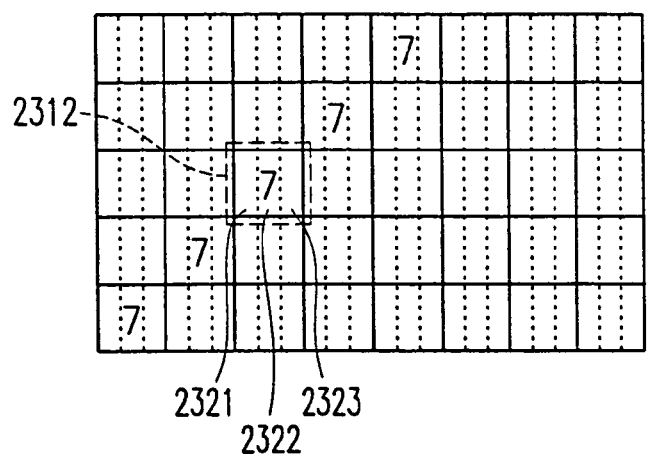
FIG.23C 2502  2501

| | | Brightness level | | |
|---|---|---|---|---|
| | | R | G | B |
| Color element level | 7 | 0 | 0 | 0 |
| | 6 | +2 | +2 | +14 |
| | 5 | +4 | +3 | +18 |
| | 4 | +7 | +5 | +25 |
| | 3 | +8 | +6 | +20 |
| | 2 | +9 | +7 | +15 |
| | 1 | +5 | +4 | +6 |
| | 0 | 0 | 0 | 0 |

FIG.37

Corrected brightness table 2892

| | Brightness level | | |
|---|---|---|---|
| | R | G | B |
| Color element level 7 | 0 | 0 | 0 |
| 6 | 38 | 38 | 50 |
| 5 | 77 | 76 | 91 |
| 4 | 116 | 114 | 134 |
| 3 | 154 | 152 | 166 |
| 2 | 191 | 189 | 197 |
| 1 | 224 | 223 | 225 |
| 0 | 255 | 255 | 255 |

| 0 | 0 | 1 | 0 | 0 |
|---|---|---|---|---|
| 0 | 1 | 0 | 1 | 0 |
| 1 | 0 | 0 | 0 | 1 |
| 1 | 0 | 0 | 0 | 1 |
| 1 | 0 | 0 | 0 | 1 |
| 1 | 1 | 1 | 1 | 1 |
| 1 | 0 | 0 | 0 | 1 |
| 1 | 0 | 0 | 0 | 1 |
| 1 | 0 | 0 | 0 | 1 |

GRAPHIC DISPLAY APPARATUS, CHARACTER DISPLAY APPARATUS, DISPLAY METHOD, RECORDING MEDIUM, AND PROGRAM

This application is a Divisional of application Ser. No. 09/864,217 filed on May 25, 2001 now U.S. Pat. No. 6,914,615, and for which priority is claimed under 35 U.S.C. § 120; and this application claims priority of Application No. 2000-157420 and 2001-140777 filed in Japan on May 26, 2000 and May 10, 2001, respectively, under 35 U.S.C. § 119; the entire contents of all are hereby incorporated by reference.

BACKGROUND OF THE INVENTION

1. Field of the Invention

The present invention relates to a graphic display apparatus and a graphic display method capable of displaying a graphic with a high definition using a color display device, and a recording medium for use with such apparatus and method.

2. Description of the Related Art

For example, in a known technique for displaying a graphic, such as a character, a pictorial symbol, etc., on a display apparatus, bit map data which is based on two binary values corresponding to black and white is displayed on a pixel by pixel basis. In this technique, one of a plurality of dots which form a graphic corresponds to one pixel. Pixels corresponding to black dote (portions which form the outline and inside of each graphic) are represented in black, and pixels corresponding to white dots are represented in white.

Further, a technique disclosed in Japanese Laid-Open Publication No. 3-201788 is known as a technique improved from a conventional technique for displaying bit map data on a pixel by pixel basis. According to this improved technique, in a color display apparatus which has sub-pixels corresponding to three color elements, R (red), G (green), and B (blue), the location of a black area can be adjusted at intervals of ⅓ of a pixel, and therefore, oblique lines included in a graphic can be smoothly displayed.

FIG. 39A shows an example of a character "A" of the English alphabet displayed on a display plane 900 of 5 pixels×9 pixels according to the conventional technique for displaying bit map data which is based on two binary values corresponding to black and white on a pixel by pixel basis. In FIG. 39A, each hatched box represents a pixel displayed in black and each open box represents a pixel displayed in white.

FIG. 39B shows bitmap data 904 of the character "A" of the English alphabet displayed on a display plane 900. In FIG. 39B, each bit labeled with "1" corresponds to a black area, and each bit labeled with "0" corresponds to a white area.

In this display technique, a substantial degree of jaggedness occurs along oblique lines of the character "A" as shown in FIG. 39A. Therefore, the oblique lines of the character "A" cannot be viewed by a human eye as smooth oblique lines. In this conventional technique for displaying bit map data which is based on two binary values corresponding to black and white on a pixel by pixel basis, the location of a black area can only be adjusted at intervals of a single pixel. Thus, a character displayed according to this conventional technique cannot be seen by a human eye as a well-defined character because jaggedness occurs along oblique lines or curves of the character. Particularly, when a character is displayed with a small number of dots, a greater degree of jaggedness is observed.

FIG. 40A shows an example of a character "A" of the English alphabet displayed on a display plane 910 of a color display device according to the technique disclosedin Japanese Laid-Open Publication No. 3-201788, which is a technique improved from a conventional technique for displaying bit map data on a pixel by pixel basis.

The display plane 910 has a plurality of pixels 912. Each of the plurality of pixels 912 includes horizontally-arranged sub-pixels 914R, 914G, and 914B. The sub-pixels 914R, 914G, and 914B correspond to the three color elements, R (red), G (green), and B (blue), respectively.

According to this improved conventional technique, binary bit map data which form a character is provided for each of planes, R-plane, G-plane, and B-plane, and when a set of three adjacent sub-pixels are turned off, an area corresponding to the set of three adjacent sub-pixels is displayed in black. Herein, the "plane" means a group of sub-pixels corresponding to any one of the three color elements, R, G, and B. The arrangement order of three sub-pixels may be any of (R. G, B), (G, B, R), and (B, R, G). Thus, the location of a black area represented by a set of three sub-pixels can be adjusted at intervals of a ⅓ pixel, and therefore, oblique lines included in a character can be smoothly displayed. For example, oblique lines included in the character "A" of FIG. 40A result in a smaller degree of jaggedness and are displayed more smoothly as compared with those included in the character "A" of FIG. 39A.

However, this improved conventional technique requires a larger amount of data for displaying a character having a same size, for example, requires a memory three times larger than that required in the conventional technique for displaying bit map data on a pixel by pixel basis. This is because binary bit map data which form a character must be prepared for each of the planes (R-plane, G-plane, and B-plane).

FIG. 40B shows bit map data 916 according to the above improved conventional technique. The bit map data 916 includes bit map data 916R for the R-plane, bit map data 916G for the G-plane, and bit map data 916B for the B-plane. As shown, the bit map data 916 has a data amount three times larger than that of the bit map data 904 (FIG. 39B) of the conventional technique for displaying bit map data on a pixel by pixel basis.

Furthermore, according to the above-described improved conventional technique, the arrangement order of sub-pixels to be turned off is not constant, i.e., may be any of (R, G, B), (G, B. R), and (B, R, G), and color mixture is insufficient at an interface between a region of sub-pixels to be turned on (white area) and a region of sub-pixels to be turned off (black area). As a result, a noticeable color noise occurs at the interface therebetween. Furthermore, a data structure of the bit map data is different from those employed widely in the conventional techniques, and therefore, this data structure cannot be widely applied to various conventional information display apparatuses.

SUMMARY OF THE INVENTION

According to one aspect of the present inventions a graphic display apparatus for displaying a graphic which is represented by binary bit map data includes: a display device including a plurality of sub-pixels; and a control section for controlling the display device, wherein the plurality of sub-pixels form a plurality of groups, each of the plurality of groups includes a predetermined plural number of sub-pixels, and the control section assigns each of bits included in the bit map data to one of the plurality of groups and displays the graphic by controlling sub-pixels included in the one of the plurality of groups based on information about bits located in the vicinity of the bit assigned to the one of the plurality of groups.

In one embodiment of the present invention, the control section defines a basic portion of the graphic to be displayed on the display device based on the information about the bits located in the vicinity of the bit assigned to the one of the plurality of groups.

In another embodiment of the present invention, the control section controls the sub-pixels included in the one of the plurality of groups based on information about continuity of the bits located in the vicinity of the bit corresponding to the one of the plurality of groups.

In still another embodiment of the present invention, one of at least one color element is pre-assigned to each of the plurality of sub-pixels, and the intensity of each of the at least one color element is represented stepwise through a plurality of color element levels; each of the plurality of sub-pixels has one of the plurality of color element levels; and the control section sets a color element level of at least one particular sub-pixel corresponding to a basic portion of the graphic to be displayed on the display device to a maximum or semi-maximum color element level, and sets a color element level of at least one sub-pixel adjacent to the at least one particular sub-pixel corresponding to the basic portion of the graphic to a color element level different from the maximum or semi-maximum color element level.

In still another embodiment of the present invention, the control section adjusts a width of a line of the graphic to be displayed on the display device by controlling the number of sub-pixels corresponding to the basic portion of the graphic.

In still another embodiment of the present invention, the control section adjusts a width of a line of the graphic to be displayed on the display device by controlling the color element level of a sub-pixel adjacent to the at least one particular sub-pixel corresponding to the basic portion of the graphic.

In still another embodiment of the present invention, each of the plurality of sub-pixels is controlled by converting the color element level to a brightness level according to a predetermined table; and the control section generates the predetermined table according to a characteristic of the display device.

In still another embodiment of the present invention, the control section compares a characteristic of a reference display device and the characteristic of the display device and generates the predetermined table according to a difference in the characteristics.

According to another embodiment of the present invention, a character display apparatus for displaying a character which is represented by binary bit map data includes: a display device including a plurality of sub-pixels; and a control section for controlling the display device, wherein the plurality of sub-pixels form a plurality of groups, each of the plurality of groups includes a predetermined plural number of sub-pixels, the control section assigns each of bits included in the bit map data to one of the plurality of groups, and according to additional information provided to at least one, of the bits included in the bit map data, the control section switches a mode for controlling sub-pixels included in a group to which the bit provided with the additional information is assigned between the following two different modes: (1) the sub-pixels are controlled based on information about bits located in the vicinity of the bit provided with the additional information; and (2) the sub-pixels are controlled based on a pattern designated by the additional information.

According to still another embodiment of the present invention, a character display apparatus includes: a display device including a plurality of sub-pixels; a control section for controlling the display device; and a storage section for storing basic portion data which defines a basic portion of a character on a sub-pixel by sub-pixel basis, wherein one of a plurality of color elements is pre-assigned to each of the plurality of sub-pixels, the intensity of each of the plurality of color elements is represented stepwise through a plurality of color element levels, each of the plurality of sub-pixels has one of the plurality of color element levels, and the control section: reads the basic portion data from the storage section: sets a color element level of at least one particular sub-pixel corresponding to the basic portion of the character to a predetermined color element level based on the basic portion data; and sets a color element level of at least one sub-pixel adjacent to the at least one particular sub-pixel corresponding to the basic portion of the character to a color element level different from the predetermined color element level.

According to still another embodiment of the present invention, a graphic display method for displaying a graphic which is represented by binary bit map data on a display device including a plurality of sub-pixels, wherein: the plurality of sub-pixels form a plurality of groups; each of the plurality of groups includes a predetermined plural number of sub-pixels; and the method comprises steps of: (a), assigning each of bits included in the bit map data to one of the plurality of groups; and (b) displaying the graphic on the display device by controlling sub-pixels included in one of the plurality of groups based on information about bits located in the vicinity of the bit assigned to the one of the plurality of the groups.

According to still another embodiment of the present invention, a character display method for displaying a graphic which is represented by binary bit map data on a display device including a plurality of sub-pixels, wherein: the plurality of sub-pixels form a plurality of groups; each of the plurality of groups includes a predetermined plural number of sub-pixels; and the method comprises steps of: (a) assigning each of bits included in the bit map data to one of the plurality of groups; and (b) according to additional information provided to at least one of the bits included in the bit map data, switching a mode for controlling sub-pixels included in a group to which the bit provided with the additional information is assigned between the following two different modest (b-1) the sub-pixels are controlled based on information about bits located in the vicinity of the bit provided with the additional information; and (b-2) the sub-pixels are controlled based on a pattern designated by the additional information.

According to still another embodiment of the present invention, a character display method for displaying a character on a display device including a plurality of sub-pixels, wherein: one of a plurality of color elements is pre-assigned to each of the plurality of sub-pixels; the intensity of each of the plurality of color elements is represented stepwise through a plurality of color element levels; each of the plurality of sub-pixels has one of the plurality of color element levels; and the method comprises steps of: (a) reading from a storage device, basic portion data which defines a basic portion of the character on a sub-pixel by sub-pixel basis; (b) setting a color element level of at least one particular sub-pixel corresponding to the basic portion of the character to a predetermined color element level based on the basic portion data; and (c) setting a color element level of at least one sub-pixel adjacent to the at least one particular sub-pixel corresponding to the basic portion of the character to a color element level different from the predetermined color element level.

According to still another embodiment of the present invention, a recording medium which can be read by an information display apparatus incorporating a display device including a plurality of sub-pixels, wherein: the recording medium contains a program for allowing the information display apparatus to execute a graphic display process; the plurality of sub-pixels form a plurality of groups; each of the plurality of groups includes a predetermined plural number of sub-pixels; and the graphic display process comprises steps of: (a) assigning each of bits included in binary bit map data to one of the plurality of groups; and (b) displaying a graphic on the display device by controlling sub-pixels included in one of the plurality of groups based on information about bits located in the vicinity of the bit assigned to the one of the plurality of the groups.

According to still another embodiment of the present invention, a recording medium which can be read by an information display apparatus incorporating a display device including a plurality of sub-pixels, wherein the recording medium contains a program for allowing the information display apparatus to execute a character display process; the plurality of sub-pixels form a plurality of groups; each of the plurality of groups includes a predetermined plural number of sub-pixels; and the character display process comprises steps of: (a) assigning each of bits included in binary bit map data to one of the plurality of groups; and (b) according to additional information provided to at least one of the bits included in the bit map data, switching a mode for controlling sub-pixels included in a group to which the bit provided with the additional information is assigned between the following two different modes: (b-1) the sub-pixels are controlled based on information about bits located in the vicinity of the bit provided with the additional information and (b-2) the sub-pixels are controlled based on a pattern determined by the additional information.

According to still another embodiment of the present invention, a recording medium which can be read by an information display apparatus incorporating a display device including a plurality of sub-pixels and a storage section for storing basic portion data for defining a basic portion of a character on a sub-pixel by sub-pixel basis, wherein: the recording medium contains a program for allowing the information display apparatus to execute a character display process: one of a plurality of color elements is pre-assigned to each of the plurality of sub-pixels: the intensity of each of the plurality of color elements is represented stepwise through a plurality of color element levels; each of the plurality of sub-pixels has one of the plurality of color element levels; and the character display process comprises steps of: (a) reading from the storage section the basic portion data which defines the basic portion of the character on a sub-pixel by sub-pixel basis; (b) setting a color element level of at least one particular sub-pixel corresponding to the basic portion of the character to a predetermined color element level based on the basic portion data; and (c) setting a color element level of at least one sub-pixel adjacent to the at least one particular sub-pixel corresponding to the basic portion of the character to a color element level different from the predetermined color element level.

According to still another embodiment of the present invention, a program for allowing an information display apparatus incorporating a display device including a plurality of sub-pixels to execute a graphic display process, wherein: the plurality of sub-pixels form a plurality of groups; each of the plurality of groups includes a predetermined plural number of sub-pixels; and the graphic display process comprises steps of: (a) assigning each of bits included in binary bit map data to one of the plurality of groups; and (b) displaying a graphic on the display device by controlling sub-pixels included in one of the plurality of groups based on information about bits located in the vicinity of the bit assigned to the one of the plurality of the groups.

According to still another embodiment of the present invention, a program for allowing an information display apparatus incorporating a display device including a plurality of sub-pixels to execute a character display process, wherein: the plurality of sub-pixels form a plurality of groups, each of the plurality of groups includes a predetermined plural number of sub-pixels; and the character display process comprises steps of: (a) assigning each of bits included in binary bit map data to one of the plurality of groups; and (b) according to additional information provided to at least one of the bits included in the bit map data, switching a mode for controlling sub-pixels included in a group to which the bit provided with the additional information is assigned between the following two different modes: (b-1) the sub-pixels are controlled based on information about bits located in the vicinity of the bit provided with the additional information; and (b-2) the sub-pixels are controlled based on a pattern determined by the additional information.

According to still another embodiment of the present invention, a program for allowing an information display apparatus incorporating a display device including a plurality of sub-pixels and a storage section for storing basic portion data for defining a basic portion of a character on a sub-pixel by sub-pixel basis to execute a character display process, wherein: one of a plurality of color elements is pre-assigned to each of the plurality of sub-pixels; the intensity of each of the plurality of color elements is represented stepwise through a plurality of color element levels; each of the plurality of sub-pixels has one of the plurality of color element levels; and the character display process comprises steps of: (a) reading from the storage section the basic portion data which defines the basic portion of the character on a sub-pixel by sub-pixel basis; (b) setting a color element level of at least one particular sub-pixel corresponding to the basic portion of the character to a predetermined color element level based on the basic portion data; and (c) setting a color element level of at least one sub-pixel adjacent to the at least one particular sub-pixel corresponding to the basic portion of the character to a color element level different from the predetermined color element level.

Hereinafter, functions of the present invention will be described.

According to the present invention, each of the bits included in bit map data which represents a graphic is assigned to a group including any plural number of sub-pixels, and each sub-pixel included in the group is separately controlled stepwise based on information about bits located in the vicinity of the bit corresponding to the group. Although the resolution of the bit map data corresponds to the size of each group of sub-pixels, the resolution for displaying the graphic corresponds to the size of each sub-pixel. Thus, the graphic can be displayed with a definition higher than that of the bit map data which represents the graphic. Furthermore, the bit map data used in the present invention is binary bit map data which is the same as a conventionally-employed dot font. Thus, the amount of data required for displaying the graphic is reduced.

Furthermore, according to the present invention, additional information is provided to at least one of the bits included in bit map data which represents a character, and a mode for controlling sub-pixels included in a group corresponding to the bit provided with the additional information is switched according to the additional information between the following two different modes: (1) the sub-pixels are controlled based on information about bits located in the vicinity of the bit provided with the additional information; and (2) the sub-pixels are controlled based on a pattern determined by the additional information. When a portion of a character whose sub-pixels are controlled based on information about vicinal bits is displayed in an undesirable shape, the sub-pixels are controlled based on a pattern determined by the additional information. With such an arrangement, the character represented by the bit map data can be displayed with a high definition and a high quality, and the amount of data required for displaying the character is reduced.

Further still, according to the present invention, the color element level of at least one particular sub-pixel corresponding to a basic portion of a character is set to a predetermined color element level based on basic portion data, and the color element level of at least one sub-pixel located adjacent to the at least one particular sub-pixel corresponding to the basic portion of the character is set to a color element level different from the predetermined color element level. The intensity of each of a plurality of color elements is represented stepwise through a plurality of color element levels, and thus, the color element levels of adjacent sub-pixels can be set such that the color element levels gradually increases/decreases from sub-pixel to sub-pixel. With such an arrangement, occurrence of a color noise can be suppressed. The basic portion data defines the basic portion of the character on a sub-pixel by sub-pixel basis, and therefore, the character can be displayed with a high definition and a high quality.

Thus, the invention described herein makes possible the advantages of (1) providing a graphic display apparatus and a graphic display method capable of displaying a graphic based on bit map data with a high definition using a reduced amount of data, and a recording medium and a program for use with such apparatus and method; (2) providing a character display apparatus and a character display method capable of displaying a character based on bit map data with a high definition and a high quality using a reduced amount of data, and a recording medium and a program for use with such apparatus and method; and (3) providing a character display apparatus and a character display method capable of displaying a character with no color noise, a high definition, and a high quality, and a recording medium and a program for use with such apparatus and method.

These and other advantages of the present invention will become apparent to those stilled in the art upon reading and understanding the following detailed description with reference to the accompanying figures.

BRIEF DESCRIPTION OF THE DRAWINGS

FIGS. 5, 6, and 7 illustrate brightness tables 92, 94, and 96, each of which defines the relationship between the color element level of a sub-pixel (level 7 to level 0) and the brightness level of the sub-pixel.

FIG. 9 illustrates a correction pattern table 2060 as an example of a correction pattern table 5b stored in an auxiliary storage apparatus 40.

FIG. 10 illustrates a procedure for processing the display program 41a.

FIG. 20 shows a correction pattern table 2170 which is a variation of a correction pattern table 5b.

FIG. 21 shows a correction pattern table 2180 which is a variation of the correction pattern table 5b.

FIG. 22 shows a correction pattern table 2270 which is a variation of the correction pattern table 5b.

FIG. 23A shows bit map data which represents a line of tan θ=1.

FIG. 23B shows sub-pixels which are defined as sub-pixels for the basic portion of the line of tan θ=1 shown in FIG. 23A.

FIG. 23C shows an exemplary color element level arrangement of sub-pixels in the vicinity of the sub-pixels for the basic portion of the line of tan θ=1 shown in FIG. 23A.

FIG. 26C shows an exemplary color element level arrangement of sub-pixels in the vicinity of the sub-pixels for the basic portion of the line of tan θ=2 shown in FIG. 25A.

FIG. 26C shows an exemplary color element level arrangement of sub-pixels in the vicinity of the sub-pixels for the basic portion of the line of tan θ=4 shown in FIG. 26A.

FIG. 36 shows correction amounts for the reference brightness table.

FIG. 37 shows a corrected brightness table 2892 obtained by correcting the reference brightness table.

DESCRIPTION OF THE PREFERRED EMBODIMENTS

First, the graphic display principle of the present invention will be described. The graphic display principle is commonly used in all embodiments to be described below. In this specification, a "graphic" includes a character, a pictorial symbol, etc. In the case where a graphic is considered as a group of dots, a two-dimensional matrix of information corresponding to the respective dots (e.g., whether the dot is a white dot or black dot) is called "bit map data". Bit map data for a character is specifically called a "dot font". In this specification, "bit map datau includes a dot font.

Figure 1:
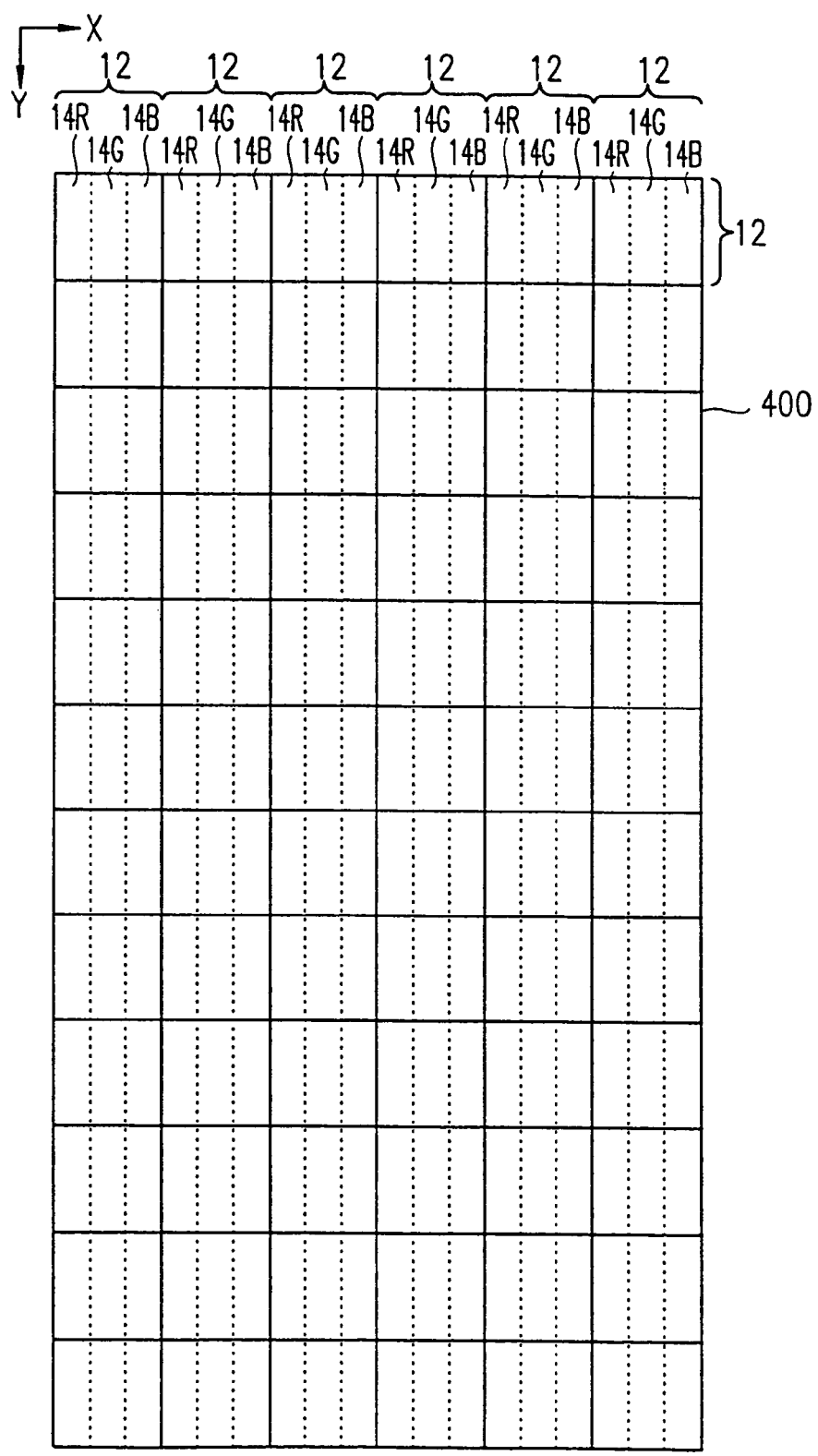
FIG. 1 schematically illustrates a display plane 400 of a display device 3 which can be used with the graphic display apparatus of the present invention.

FIG. 1 schematically illustrates a display plane 400 of a display device 3 (FIGS. 8A, 8B, 8C, and 8D) which can be used with the graphic display apparatus of the present invention. The display device 3 includes a plurality of pixels 12 which are arranged along the X and Y directions. Each of the pixels 12 includes a plurality of sub-pixels which are arranged along the X direction. In the example illustrated in FIG. 1, each pixel 12 includes three sub-pixels 14R, 14G and 14B.

The sub-pixel 14R is pre-assigned to a color element R so as to output color R (red). The sub-pixel 14G is pre-assigned to a color element G so as to output color G (green). The sub-pixel 14B is pre-assigned to a color element B so as to output color B (blue).

The brightness of each of the sub-pixels 14R, 14G and 14B is represented by a value ranging from 0 to 255, for example. When each of the sub-pixels 14R, 14G and 14B may independently take a value ranging from 0 to 255, it is possible to display about 16,700,000 (=256×256×256) different colors.

In the above-described technique for displaying bit map data on a pixel by pixel basis, one bit of the bit map data is associated with a pixel including sub-pixels (R, G, B), and each sub-pixel included in the pixel is on/off-controlled based on only information for that bit ("1" or "0").

Also in the improved conventional technique disclosed in Japanese Laid-Open Publication No. 3-201788, one bit of bit map data is associated with a sub-pixel, and each sub-pixel is on/off-controlled based on only information for that bit.

On the contrary, according to the present invention, one bit of bit map data is associated with a pixel, and each sub-pixel included in the pixel is controlled with consideration for information of the bits around that bit. Furthermore, each sub-pixel is controlled separately and gradually over a plurality of levels rather than on/off-control.

Thus, the present invention independently controls the color elements (R, G, B) which respectively correspond to the sub-pixels 14R, 14G and 14B included in one pixel 12, while appropriately controlling the color element level of a sub-pixel adjacent to a sub-pixel corresponding to the basic portion of the graphic. In this way, not only the outline of the graphic but also the graphic itself can be displayed in a virtual black color (i.e. without a color noise) with a high definition (i.e., with a high resolution). The term "virtual black color" as used herein refers to a color which is not black in a chromatically strict sense but which can be observed by a human eye to be black.

The structure of bit map data used in the present invention is the same as that used in the conventional technique for displaying bit map data on a pixel by pixel basis. Thus, bit map data can be stored with a relatively small memory capacity. Furthermore, the present invention can be readily applied to conventionally-employed information display apparatuses.

The present invention is not limited to those applications where a black graphic is displayed. Rather, the display principle of the present invention can be used to display a graphic in an achromatic color. For example, when the display principle of the present invention is used to display a graphic in a gray color, effects similar to those described above can be obtained. When displaying a gray graphic, the relationship between the color element level and the brightness level as defined in a brightness table 92 of FIG. 5 can be changed so that color element levels 7-0 correspond to a range of brightness levels from 128 to 255, for example. Furthermore, a graphic can be displayed in a specific color by modifying the brightness table.

Figure 2:
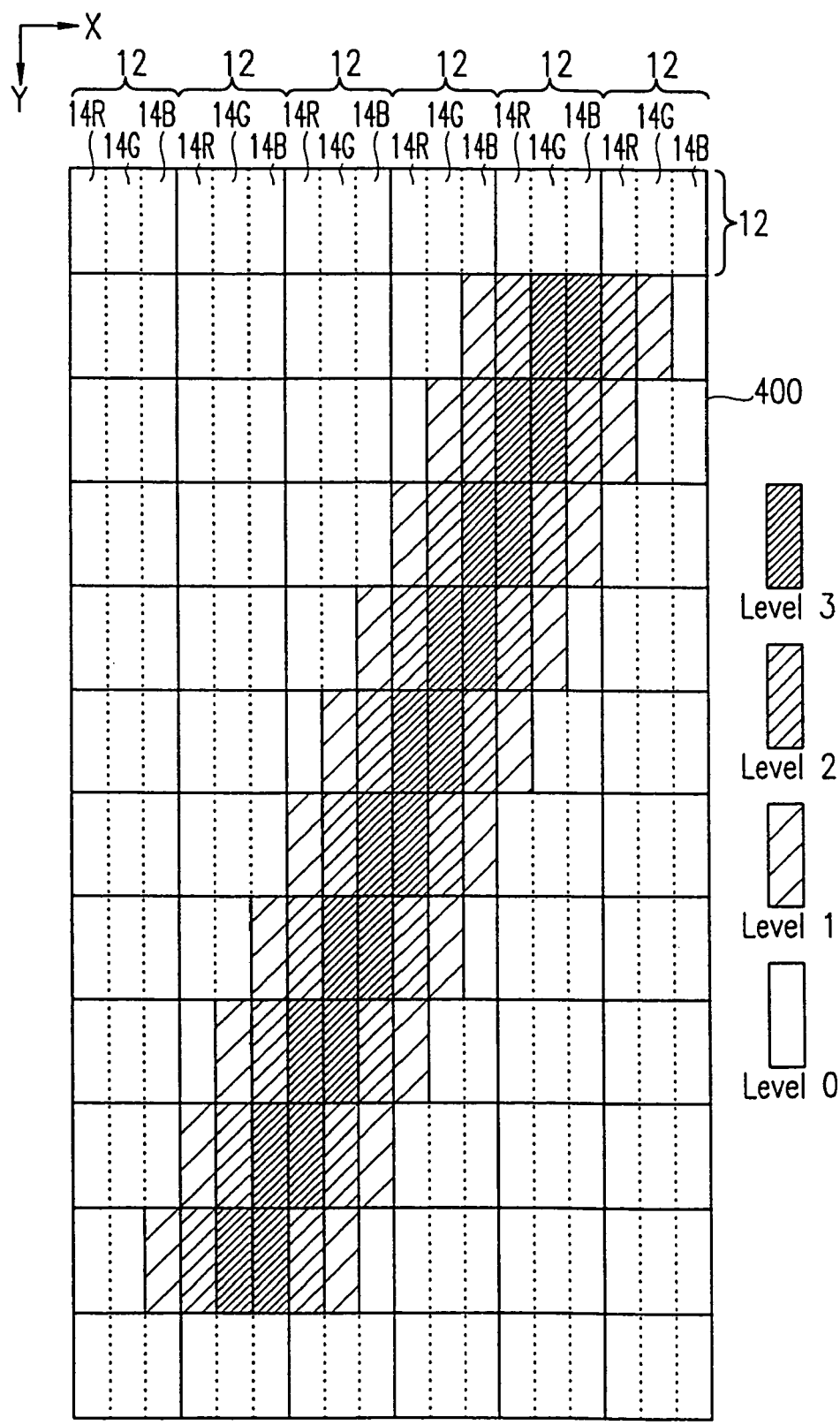
FIG. 2 illustrates an oblique line being displayed on the 6×12-pixel display plane 400 of the display device 3.

FIG. 2 illustrates an oblique line being displayed on the 6×12-pixel display plane 400 of the display device 3. In the example illustrated in FIG. 2, the color element level of each of the sub-pixels 14R, 14G and 14B is controlled through four different levels, i.e., level 3 to level 0. In FIG. 2, each level 3 box represents a sub-pixel whose brightness level is 0, each level 2 box represents a sub-pixel whose brightness level is 80, each level 1 box represents a sub-pixel whose brightness level is 180, and each level 0 box represents a sub-pixel whose brightness level is 255.

The color element level of each sub-pixel corresponding to the basic portion of the graphic is set to level 3 (the maximum color element level). The color element level of each sub-pixel which is adjacent to a sub-pixel corresponding to the basic portion of the graphic is set to level 2 or level 1. The basic portion" refers to a portion corresponding to a core of a graphic.

Figure 3:
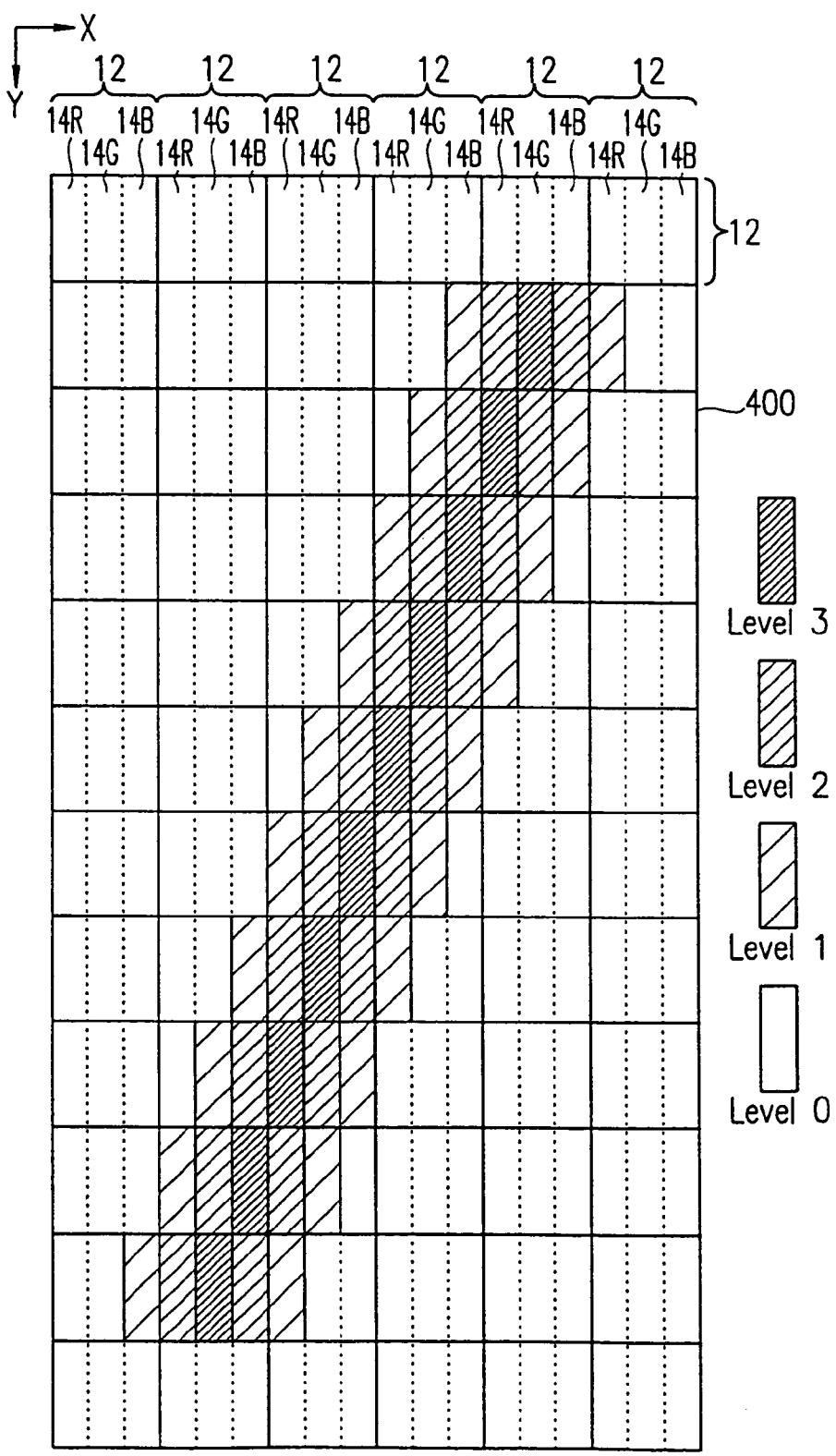
FIG. 3 illustrates an oblique line being displayed on the display plane 400 of the display device 3 to be narrower than that illustrated in FIG. 2.

FIG. 3 illustrates an oblique line being displayed on the display plane 400 of the display device 3 to be narrower than that illustrated in FIG. 2. Such a display can be achieved by changing the width of the basic portion of the graphic (i.e., the width of the line corresponding to level 3) from a 2 sub-pixel width to a 1 sub-pixel width.

Figure 4:
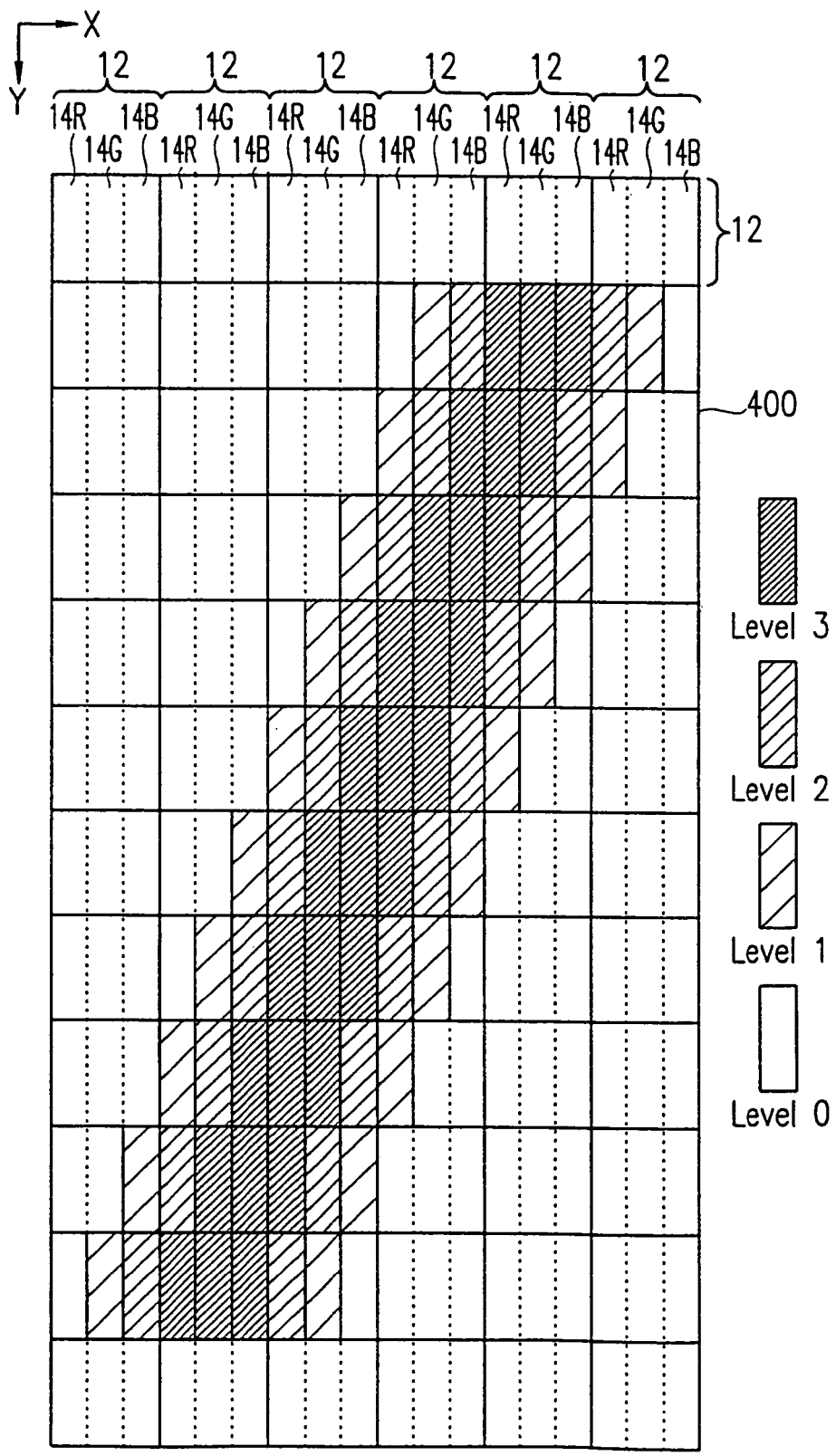
FIG. 4 illustrates an oblique line being displayed on the display plane 400 of the display device 3 to be wider than that illustrated in FIG. 2.

FIG. 4 illustrates an oblique line being displayed on the display plane 400 of the display device 3 to be wider than that illustrated in FIG. 2. Such a display can be achieved by changing the width of the basic portion of the graphic (i.e. the width of the line corresponding to level 3) from a 2 sub-pixel width to a 3 sub-pixel width.

Thus, by adjusting the width of the basic portion of a graphic on a sub-pixel by sub-pixel basis, it is possible to perform a finer control on the width of the graphic.

In the example Illustrated in FIGS. 2 and 4, the color element level of each sub-pixel is controlled through four levels, i.e., level 3 to level 0. By increasing the number of color element levels of a sub-pixel, colors of the graphic other than black can be made less conspicuous to a human eye.

FIG. 5 illustrates the brightness table 92 which defines the relationship between the color element level of a sub-pixel (level 7 to level 0) and the brightness level of the sub-pixel. By storing the brightness table 92 in a memory device, the color element level of each sub-pixel can easily be converted to a brightness level. In the brightness table 92, the eight color element levels (level 7 to level 0) are assigned over the range of brightness levels of 0 to 255 at substantially regular intervals.

FIG. 6 illustrates another brightness table 94 which defines the relationship between the color element level of a sub-pixel (level 7 to level 0) and the brightness level of the sub-pixel. In the brightness table 94, brightness levels corresponding to color element levels 7 to 4 are shifted toward the brightness level of 0, and other brightness levels corresponding to color element levels 3 to 0 are shifted toward the brightness level of 255. When the brightness table 94 of FIG. 6 is used, the apparent width of each line included in a graphic can be reduced from that obtained when the brightness table 92 of FIG. 5 is used.

FIG. 7 illustrates still another brightness table 96 which defines the relationship between the color element level of a sub-pixel (level 7 to level 0) and the brightness level of the sub-pixel. The brightness table 96 is particularly suitable when the display device 3 is a color liquid crystal display device. It is possible with the brightness table 96 to correct the brightness of the sub-pixel of the color element B, thereby preventing the sub-pixel from being perceived darker than other color elements when the brightness level of a sub-pixel of a color element B is relatively low. Thus, a brightness table suited for the display characteristic of the display device 3 can be employed so as to make colors of the graphic other than black less conspicuous to a human eye.

The display device 3 may be a stripe-type color liquid crystal display device. Alternatively, the display device 3 may be a delta-type color liquid crystal display device. Even with a delta-type color liquid crystal display device, effects similar to those provided by a stripe-type color liquid crystal display device can be obtained by independently controlling R, G, B sub-pixels which correspond to one pixel. The color liquid crystal display device may be a transmission type liquid crystal display device, which is widely used in personal computers, or the like, as well as a reflection type or rear projection type liquid crystal display device. However, the display device 3 is not limited to those color liquid crystal display devices. The display device 3 may be any color display apparatus including a plurality of pixels which are arranged along the X and Y directions (so-called "X-Y matrix display apparatus").

Moreover, the number of sub-pixels included in each pixel 12 is not limited to three. The pixel 12 may include one or more sub-pixels arranged in a predetermined direction. For example, when N color elements are used to represent a color, each pixel 12 may include N sub-pixels.

The order of arrangement of the sub-pixels 14R, 14G and 14B is not limited to that illustrated in FIG. 1. For example, the sub-pixels may be arranged in the order of B, G, R along the X direction. Moreover, the direction of arrangement of the sub-pixels 14R, 14G and 14B is not limited to that illustrated in FIG. 1. The sub-pixels 14R, 14G and 14B may be arranged in any direction.

Furthermore, the group of color elements for use with the present invention is not limited to R (red), G (green), B (blue). Alternatively, the color elements may be C (cyan), Y (yellow), M (magenta).

Hereinafter, embodiments of the present invention will be described with reference to the drawings.

Embodiment 1

Figure 8A:
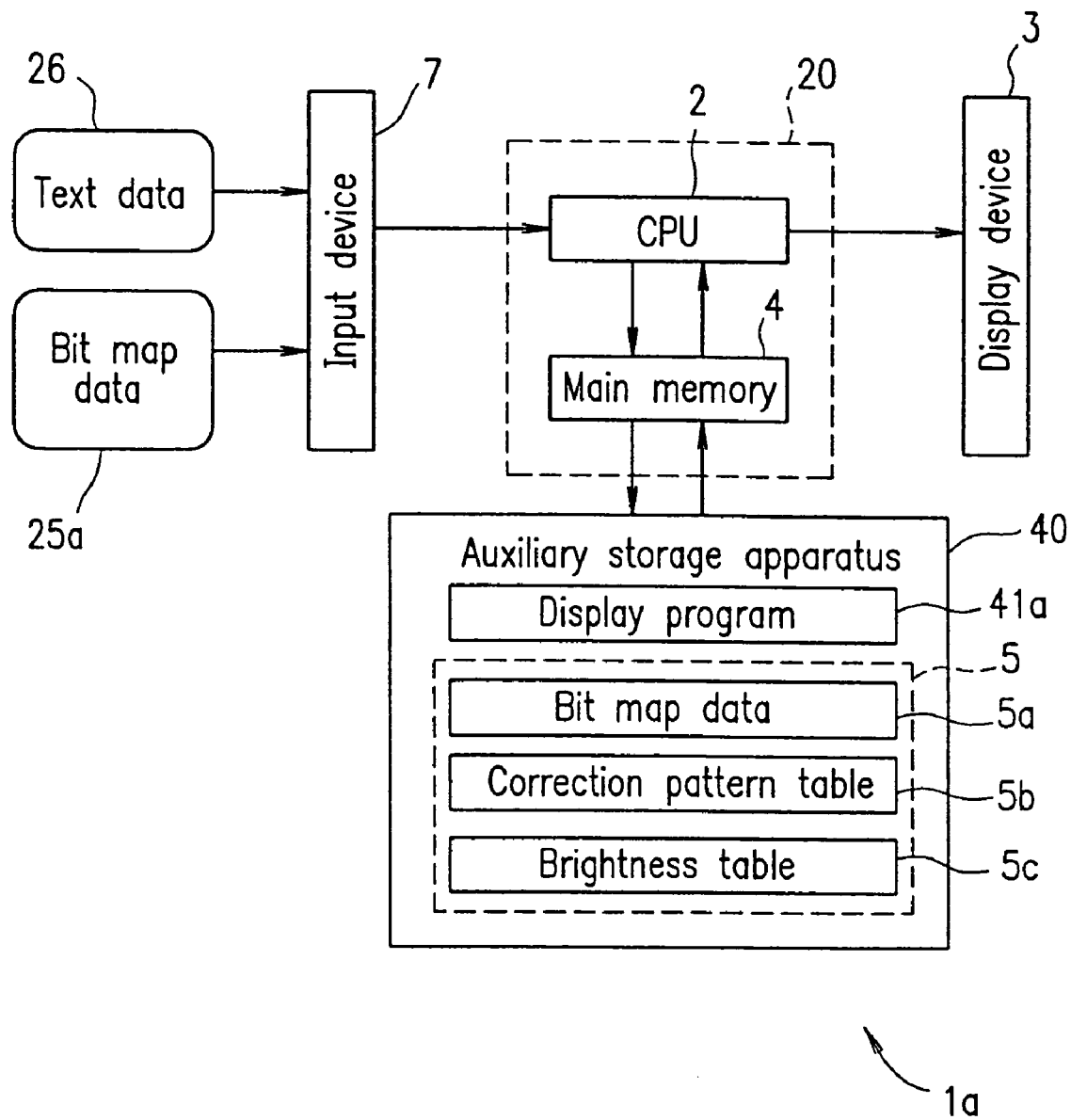
FIG. 8A illustrates a structure of a graphic display apparatus 1a according to embodiment 1 of the present invention.

FIG. 8A illustrates a structure of a graphic display apparatus 1a according to embodiment 1 of the present invention. The graphic display apparatus 1a may be, for example, a personal computer. Such a personal computer may be of any type such as a desk top type or lap top type computer. Alternatively, the graphic display apparatus 1a may be a word processor.

Moreover, the graphic display apparatus 1a may alternatively be any information display apparatus such as an electronic apparatus or information apparatus incorporating a color display device. For example, the graphic display apparatus 1a may be an electronic apparatus incorporating a color liquid crystal display device, a portable information terminal which is a portable information tool, a portable phone including a PHS, a general-purpose communication apparatus such as a telephone/FAX, or the like.

The graphic display apparatus 1a includes the display device 3 capable of performing a color display, and a control section 20 for independently controlling a plurality of color elements respectively corresponding to a plurality of sub-pixels included in the display device 3. The control section 20 is connected to the display device 3, an input device 7, and an auxiliary storage apparatus 40.

The input device 7 is used to input a graphic to be displayed on the display device 3. For example, bit map data representing a graphic may be bit map data 5a stored in the auxiliary storage apparatus 40 or bit map data 25a input through the input device 7. In the case where the graphic to be displayed on the display device 3 is previously determined, the bit map data 5a stored in the auxiliary storage apparatus 40 can be used. The bit map data 5a is, for example, a dot font for a character. When a character is displayed on the display device 3, text data 26 including a character code, a character size, etc., is input to the control section 20 through the input device 7. The control section 20 searches for character data of the character to be displayed on the display device 3 through the bit map data (dot fonts) 5a stored in the auxiliary storage apparatus 40. In this case, for example, a keyboard or the like is used as the input device 7. In the case where the graphic display apparatus 1a is a portable phone, for example, the text data 26 may be input using numeric keys or a jog-dial.

In the case where bit map data of the graphic to be displayed on the display device 3 is not stored in the auxiliary storage apparatus 40, the bit map data 25a is input through the input device 7. In this case, a scanner, a mouse, etc., may be preferably used. The auxiliary storage apparatus 40 may not have bit map data 25a, and in such a case, all of bit map data including a dot font may be input through the input device 7.

Furthermore, the text data 26 and the bit map data 25a may be input to the control section 20 through a communication line. In this case, an interface circuit for the communication line such as a modem or the like may be used as the input device 7. For example, the graphic display apparatus 1a is capable of displaying a text of an electronic mail according to a graphic display method of the present invention.

The control section 20 includes a CPU 2 and the main memory 4.

The CPU 2 controls and monitors the entire graphic display apparatus 1a, and also executes the graphic display program 41a stored in the auxiliary storage apparatus 40.

The main memory 4 temporarily stores data which has been input through the input device 7, data to be displayed on the display device 3, or data which is required to execute the graphic display program 41a. The main memory 4 is accessed by the CPU 2.

The CPU 2 controls sub-pixels of the display device 3 by executing the graphic display program 41a based on various data stored in the main memory 4 so as to display a graphic on the display device 3. The timing is at which the graphic is displayed on the display device 3 is controlled by the CPU 2.

The auxiliary storage apparatus 40 stores a display program 41a and data 5 which is required to execute the display program 41a. The data 5 includes bit map data 5a which represents the shape of the graphic, a correction pattern table 5b for correcting the color element level in a stepwise fashion in order to suppress color noise, and a brightness table 5c for converting the color element level to the brightness level.

The bit map data 5a and the bit map data 25a received by the input device 7 are binary data where one of a plurality of dots which form a graphic is represented by one bit.

The brightness table 5a may be, for example, the brightness table 92 (FIG. 5), the brightness table 94 (FIG. 6), or the brightness table 96 (FIG. 7). The auxiliary storage apparatus 40 may be any type of storage apparatus capable of storing the display program 41a and the data 5. Any type of recording medium may be used in the auxiliary storage apparatus 40 for storing the display program 41a and the data 5. For example, a hard disk, CD-ROM, MO, floppy disk, MD, DVD, IC card, optical card, or the like, may suitably be used as a recording medium.

The present invention is not limited to applications where the display program 41a and the data 5 are stored on a recording medium in the auxiliary storage apparatus 40. For example, the display program 41a and the data 5 may alternatively be stored in a main memory 4 in a ROM (not shown). Such a ROM may be, for example, a mask ROM, EPROM, EEPROM, flash ROM, or the like. In such a ROM-based system, it is possible to realize various types of processing only by switching a ROM to another. The ROM-based system may suitably be used, for example, with a portable terminal apparatus or a portable phone.

The display program 41a and the data 5 may be wholly or partially downloaded to the graphic display apparatus 1a via any communication line.

A display programs 41b (FIG. 8B), a display program 41a (FIG. 8C), a display program B 6a (FIG. 8D), and a brightness table generation program 6b (FIG. 8D), which will be described later, may be handled in a manner similar to that for the display program 41a.

FIG. 9 illustrates a correction pattern table 2060 as an example of the correction pattern table 5b (FIG. 8A) stored in the auxiliary storage apparatus 40. The correction pattern table 2060 defines a correction pattern 1. The correction pattern 1 indicates that the color element levels of sub-pixels arranged in the vicinity of a sub-pixel corresponding to the basic portion of the graphic (hereinafter, referred to as "vicinal sub-pixel") are set to "5", "2" and "1" in this order from the sub-pixel closest to the basic portion of the graphic to the farthest one from the basic portion of the graphic.

Such a correction pattern is represented as a "correction pattern (5, 2, 1)" for illustration. Thus, correction pattern 1 is used to determine the color element level of each sub-pixel which is arranged in the vicinity of a sub-pixel corresponding to the basic portion of the graphic.

The number of vicinal sub-pixels whose color element level is determined by the correction pattern is not limited to 3. The correction pattern can be used to determine the color element level of each of any number (1 or more) of vicinal sub-pixels.

Figure 10:
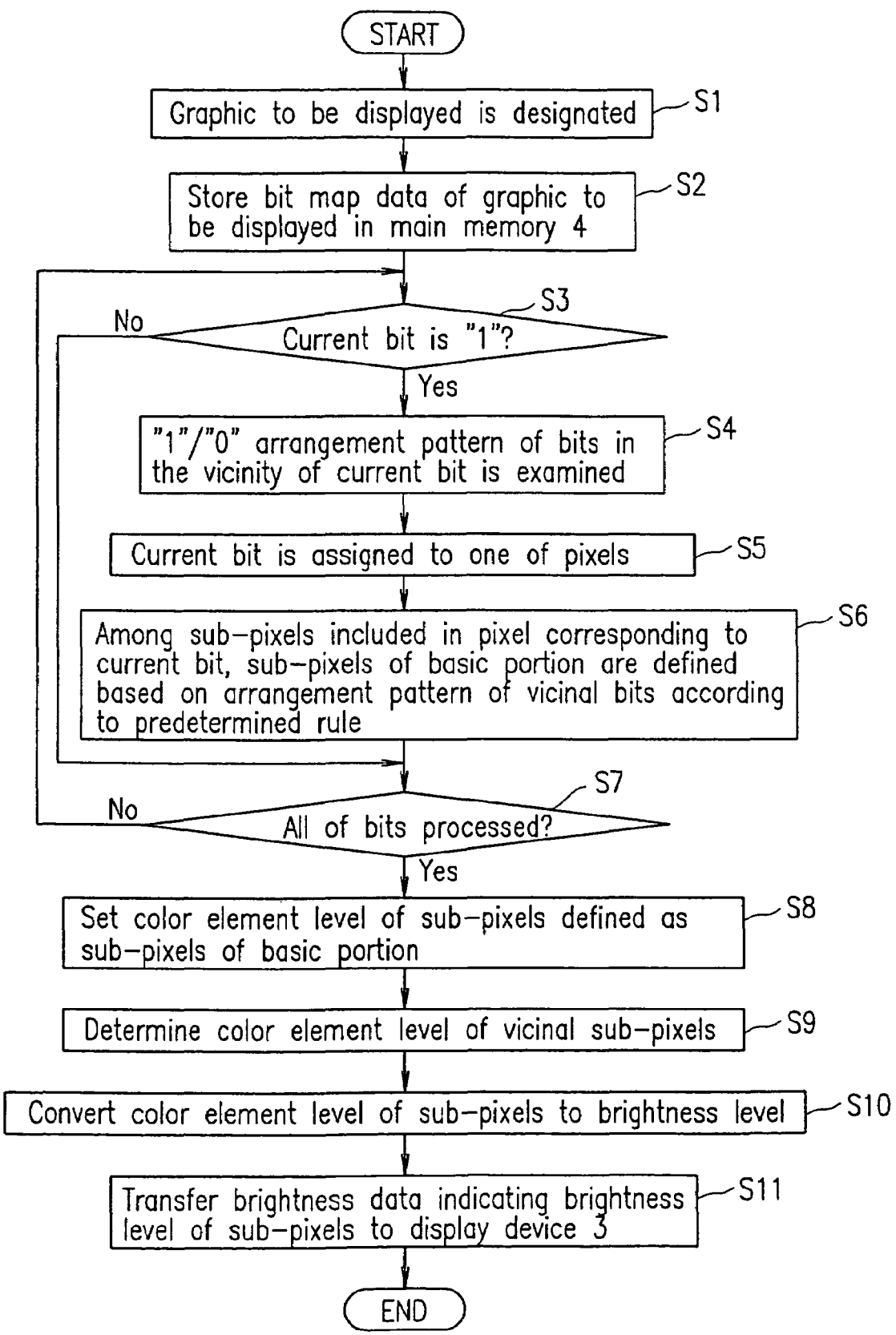

FIG. 10 illustrates a procedure for processing the display program 41a. The display program 41a is executed by the CPU 2. Bach step in the procedure for processing the display program 41a will now be described.

Step S1: A graphic to be displayed on the display device 3 is designated. As described above with reference to FIG. 8A, this designation is achieved by inputting the text data 26 or the bit map data 25a to the control section 20 through the input device 7.

Step S2: Bit map data of the graphic designated at Step S1 is stored in the main memory 4. This bit map data is the bit map data 5a stored in the auxiliary storage apparatus 40 or the bit map data 25a input through the input device 7.

Step S3: It is determined whether or not each of bits which form the bit map data is "1". If "Yes", the process proceeds to Step S4. If "No", the process proceeds to Step S7.

Step S4: A "1"/"0" arrangement pattern of bits located in the vicinity of a current bit is examined.

Step S5: The current bit is assigned to one of the pixels. This assignment is achieved based on where on the display plane 400 (FIG. 1) of the display device 3 the graphic should be positioned. For example, in the case where the graphic is positioned at the upper left corner of the display plane 400, a bit located at the upper left corner of the bit map data is assigned to a pixel located at the upper left corner of the display plane 400 among the plurality of pixels 12 included in the display plane 400. Similarly, a bit arranged adjacent to the right side of the bit located at the upper left corner of the bit map data is assigned to a pixel arranged adjacent to the right side of the pixel located at the upper left corner of the display plane 400.

Step S6: Among sub-pixels included in the pixel corresponding to the current bit, a sub-pixel for a basic portion (a sub-pixel corresponding to a basic portion of the graphic) is defined based on the "1"/"0" arrangement pattern of the bits located in the vicinity of the current bit. This determination of a sub-pixel for a basic portion is achieved according to a predetermined basic portion definition rule. This basic portion definition rule will be described later with reference to FIGS. 13A, 13B, 14A, 14B, 15A, 15B, 16A, and 16B.

Step S7: It is determined whether steps S3–S6 have been performed for all of the bits which form the bit map data. If "Yes", the process proceeds to step S8. If "No", the process returns to step S3.

Step S8: The color element level of the sub-pixel defined as a sub-pixel for the basic portion at Step S6 is set to the maximum color element level. For example, where the color element level of a sub-pixel is represented through eight levels, i.e., level 7 to level 0, the color element level of the sub-pixel defined as a sub-pixel for the basic portion is set to level 7.

Step S9: The color element level of each sub-pixel arranged in the vicinity of the sub-pixel defined as a sub-pixel for the basic portion is set to one of seven levels, i.e., level 6 to level 0. Such a determination of the color element level is achieved by using, for example, the correction pattern table 5b stored in the auxiliary storage apparatus 40.

Step S10: The color element level of each sub-pixel is converted to a brightness level. Such a conversion is performed by using, for example, the brightness table 5c stored in the auxiliary storage apparatus 40.

Step S11: Brightness data indicating the brightness level of each sub-pixel is transferred to the display device 3. Thus, the brightness level of the display device 3 is controlled on a sub-pixel by sub-pixel basis.

Figure 11:
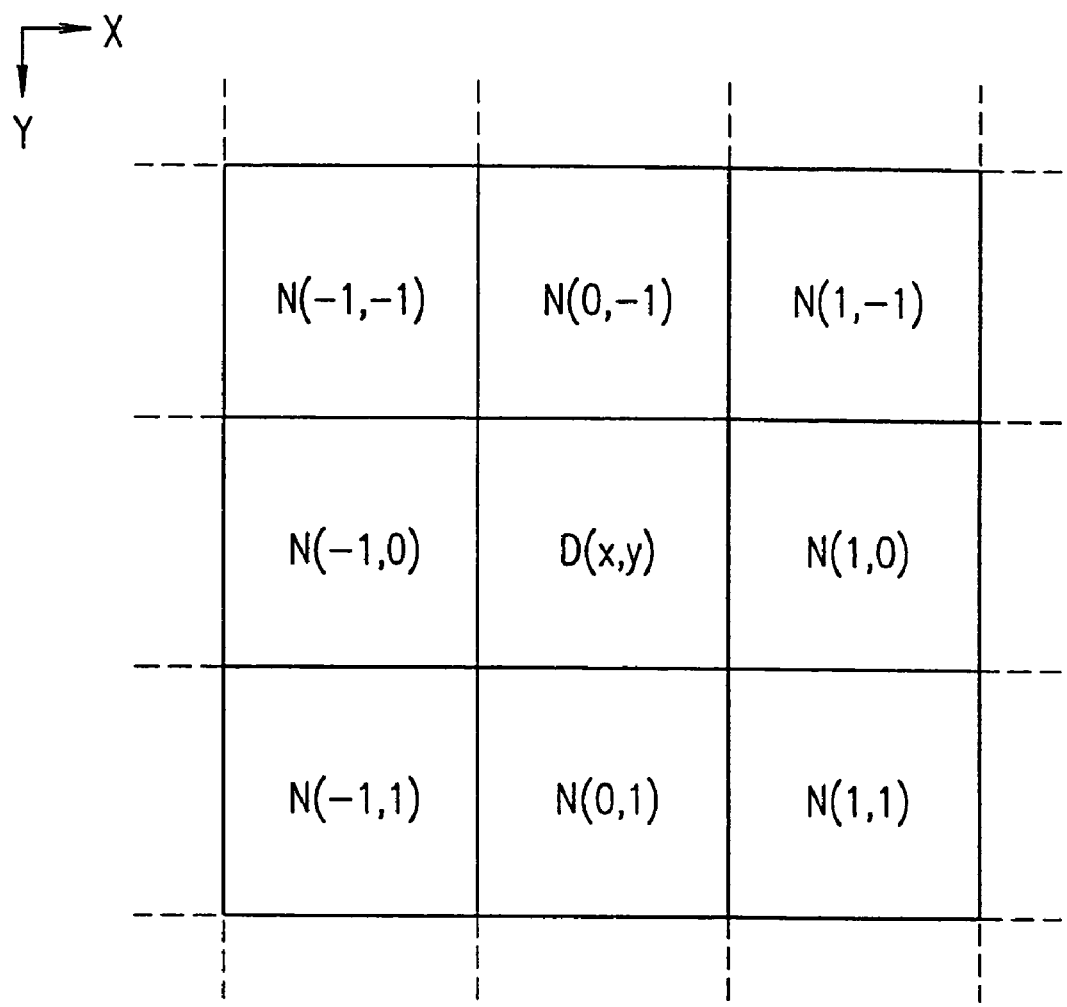
FIG. 11 shows a portion of bit map data which represents a graphic.

FIG. 11 shows a portion of bit map data which represents a graphic. $D(x,y)$ is a current bit. In this example, a bit in the vicinity of the current bit, $D(x+a,y+b)$, is represented as $N(a,b)$. FIG. 11 shows eight vicinal bits which are vertically, horizontally, or diagonally adjacent to the current bit $D(x,y)$, i.e., $N(-1,-1)$, $N(0,-1)$, $N(1,-1)$, $N(-1,0)$, $N(1,0)$, $N(-1,1)$, $N(0,1)$, and $N(1,1)$. These eight vicinal bits are referred to as "eight neighborhoods". It should be noted that bit map data used in the present invention is binary data, i.e., each of bits which form the bit map data has a value of "1" or "0", A bit having a value of "1" corresponds to a black area of a graphic. A bit having a value of "0" corresponds to a white area of the graphic. The bits $N(a,b)$ and $D(x,y)$ each have a value of "1" or "0".

Figure 12:
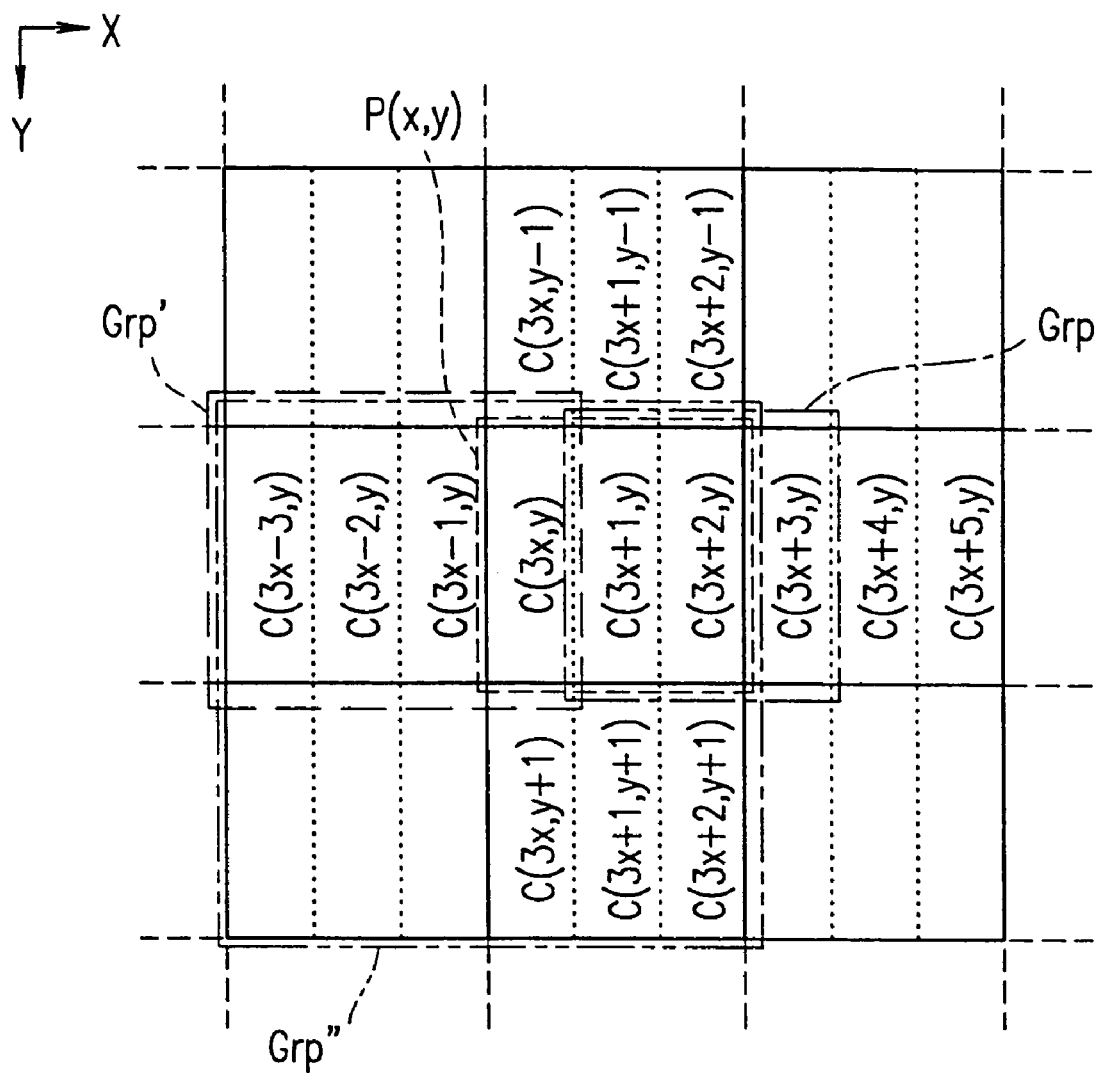
FIG. 12 shows a portion of a display plane of the display device 3.

FIG. 12 shows a portion of a display plane of the display device 3. $P(x,y)$ is a pixel on the display plane. The bit $D(x,y)$ of FIG. 11 is assigned to the pixel $P(x,y)$ when a graphic represented by a bit map data is displayed on the display device 3. The pixel $P(x,Y)$ includes three sub-pixels, $C(3x,y)$, $C(3x+1,y)$, and $C(3x+2,y)$. When the bit $D(x,y)$ has a value of "1", among the three sub-pixels, $C(3x,y)$, $C(3x+1,y)$, and $C(3x+2,y)$, a sub-pixel for the basic portion is defined according to the basic portion definition rule. When the bit $D(x,y)$ has a value of "0", none of the three sub-pixels is defined as a sub-pixel for the basic portion.

According to the basic portion definition rule, whether or not each of the three sub-pixels included in the pixel $P(x,y)$ is defined as a sub-pixel for the basic portion depends on the "0"/"1" arrangement of the bits $N(a,b)$ in the vicinity of the bit $D(x,y)$ corresponding to the pixel $P(x,y)$. The basic portion definition rule is now described. In a description below, it is assumed that the bit $D(x,y)$ has a value of "1".

Figure 13A:
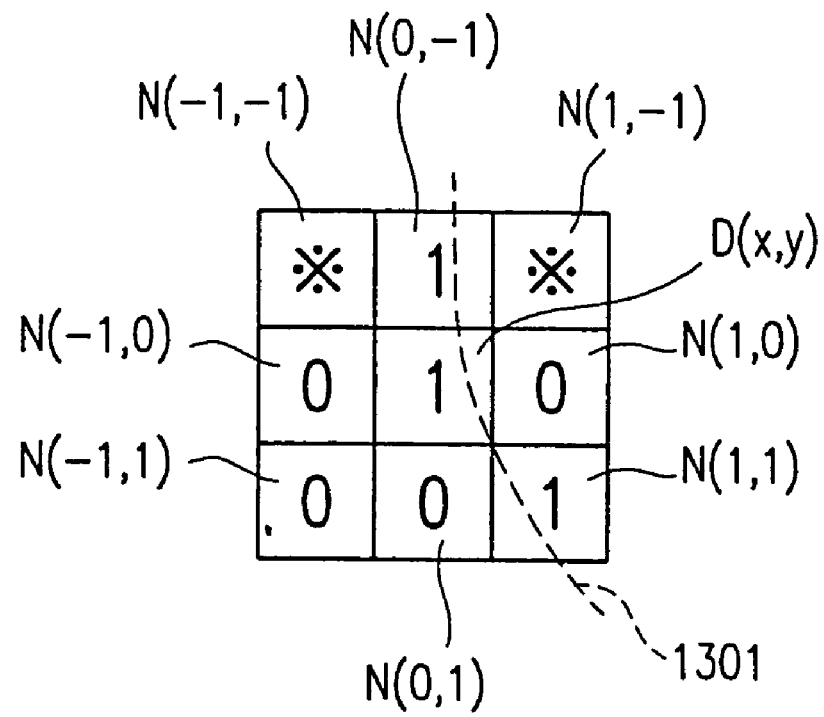
FIG. 13A shows an example of eight neighborhoods around the current bit D(x,y) in the bit map data.

FIG. 13A shows an example of eight neighborhoods around the current bit $D(x,y)$ in the bit map data. In the following description, a bit $N(a,b)$ which has a value of "1" is represented as "$N(a,b)=1$". For example, in FIG. 13A, $N(0,-1)=N(1,1)=1$, and $N(1,0)=N(0,1)=N(-1,1)=N(-1,0)=0$. In FIG. 13A, bits $N(-1,-1)$ and $N(1,-1)$ indicated by "X" each have any value of "0" and "1". Similarly in FIGS. 14A, 15A, and 16A, a bit indicated by "X" has any value of "0" and "1". These bits are not considered in the basic portion definition rule.

Figure 13B:
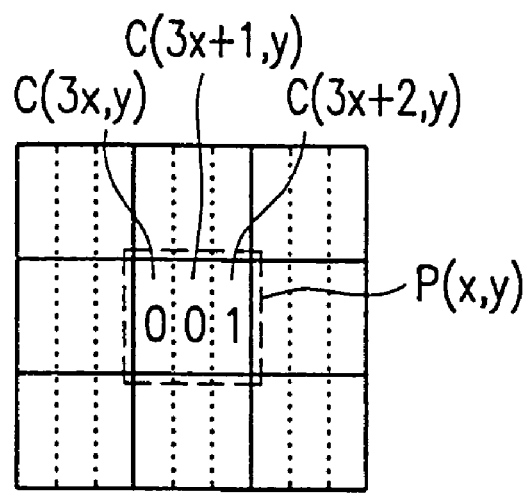
FIG. 13B shows sub-pixels defined as sub-pixels for the basic portion based on a basic portion definition rule when the eight neighborhood bits around the bit D(x,y) have values shown in FIG. 13A.

FIG. 13B shows sub-pixels defined as sub-pixels for the basic portion based on the basic portion definition rule when the eight neighborhood bits around the bit $D(x,y)$ have values shown in FIG. 13A. A pixel $P(x,y)$ on the display screen which corresponds to the bit $D(x,y)$ includes three sub-pixels, $C(3x,y)$, $C(3x+1,y)$, and $C(3x+2,y)$. Among these sub-pixels shown in FIG. 13B, a sub-pixel labeled with "1" is defined as a sub-pixel for the basic portion, and sub-pixels labeled with "0" are not defined as a sub-pixel for the basic portion. That is, the sub-pixel $C(3x+2,y)$ is defined as a sub-pixel for the basic portion, and the sub-pixels $C(3x,y)$ and $C(3x+1,y)$ are not defined as a sub-pixel for the basic portion.

The basic portion definition rule described with reference to FIGS. 13A and 13B can be represented by using logical expressions.

In the following description, when logical values A and B are given, for example, "A*B" denotes a logical AND of the logical values A and B, "A" denotes a logical NOT of the logical value A. When this rule is applied, in the case where the eight neighborhood bits around the bit D(x,y) have the values shown in FIG. 13A, logical expression (1) is satisfied:

N(0,−1)*!N(−1,0)*!N(1,0)*!N(−1,1)*!N(0,1)*N(1,1) =1       (1)

Furthermore, the above process in which the sub-pixel C(3x+2,y) is defined as a sub-pixel for the basic portion and the sub-pixels C(3x,y) and C(3x+1,y) are not defined as a sub-pixel for the basic portion can be represented by expressions (2):

C(3x,y)=0, C(3x+1,y)=0, C(3x+2,y)=1       (2)

The "basic portion" refers to a portion corresponding to a core of a graphic. When the graphic to be displayed is a character, the basic portion corresponds to a central portion of each stroke included in the character. Since the bit map data does not include information about the strokes, the basic portion must be defined by an estimation. The basic portion cannot be estimated from information about the current bit D(x,y) but can be estimated from information about the bits located in the vicinity of the current bit D(x,y). For example, from the bit map data shown in FIG. 13A, it is estimated that the stroke is a curve which passes through a region corresponding to the bits N(0,−1), D(x,y), and N(1,1) (shown by a broken line 1301 in FIG. 13A). As indicated by the broken line, this curve is considered to pass through the right side of the region corresponding to the bit D(x,y). Thus, referring to FIG. 13B, the is sub-pixel C(3x+2,y) included in the right side of the pixel P(x,y) corresponding to the bit D(x,y) is defined as a sub-pixel of the basic portion. The basic portion is defined on a sub-pixel by sub-pixel basis. Thus, the basic portion of the graphic can be defined with a higher definition than the bit map data of a graphic which has a pixel-based resolution. As a result, the graphic can be displayed with a high definition.

The basic portion definition rule is generated based on the above estimation. The generated basic portion definition rule is represented by the above logical expressions, and used at Step S6 in the process shown in FIG. 10.

Figure 14A:
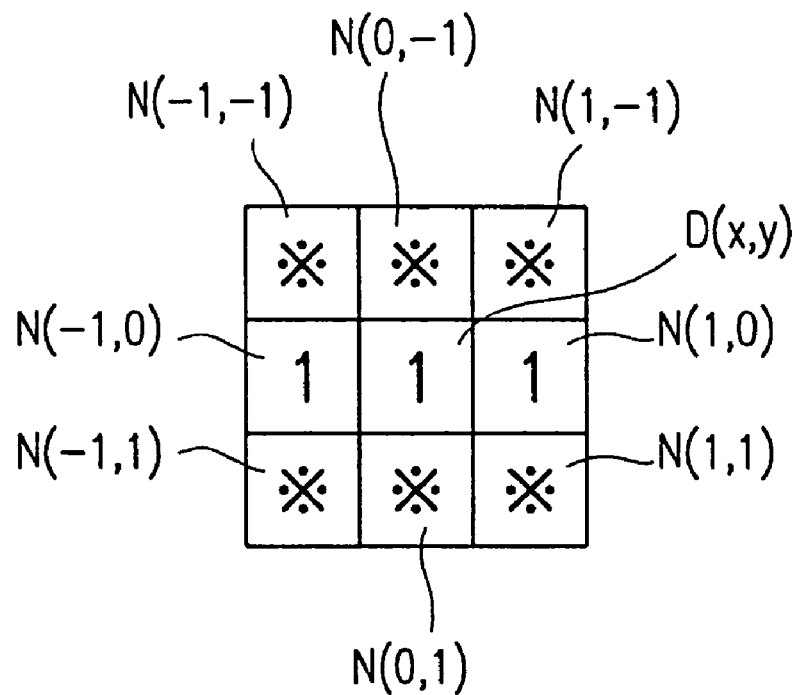
FIG. 14A shows another example of eight neighborhoods around the current bit D(x,y) in the bit map data.

FIG. 14A shows another example of eight neighborhoods around the current bit D(x,y) in the bit map data.

Figure 14B:
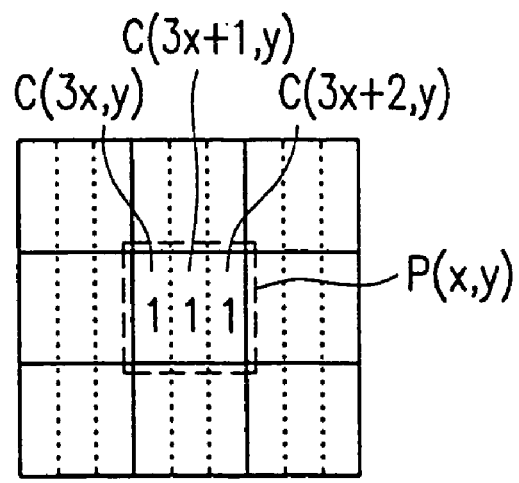
FIG. 14B shows sub-pixels defined as sub-pixels for the basic portion based on a basic portion definition rule when the eight neighborhood bits around the bit D(x,y) have values shown in FIG. 14A.

FIG. 14B shows sub-pixels defined as sub-pixels for the basic portion based on the basic portion definition rule when the eight neighborhood bits around the bit D(x,y) have values shown in FIG. 14A. The basic portion definition rule represented by FIGS. 14A and 14B can be represented by using the following logical expressions:

When N(−1,0)*N(1,0)=1, C(3x,y)=1, C(3x+1,y)=1, C(3x+2,y)=1

Figure 15A:
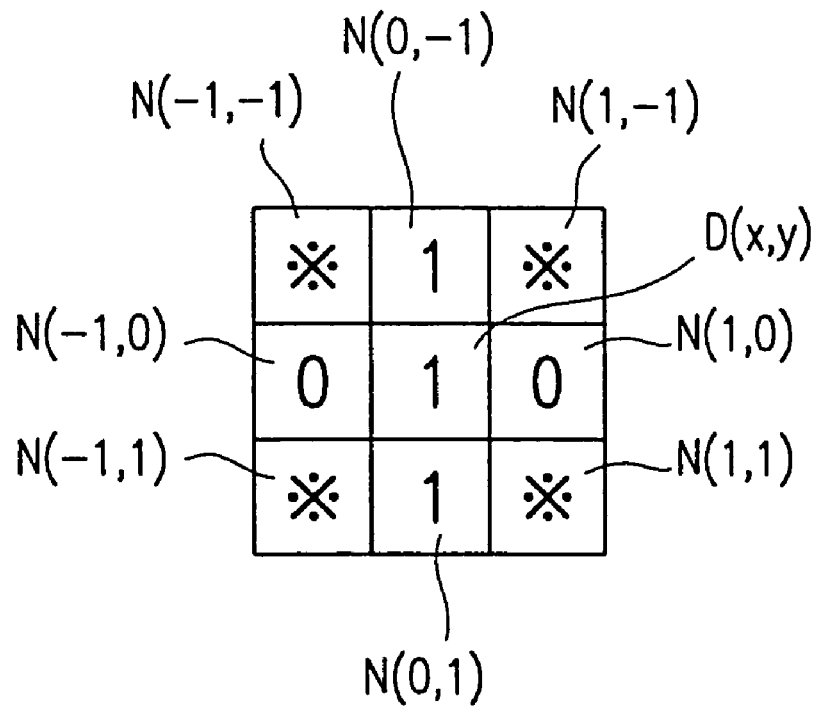
FIG. 15A shows still another example of eight neighborhoods around the current bit D(x,y) in the bit map data.

FIG. 15A shows still another example of eight neighborhoods around the current bit D(x,y) in the bit map data.

Figure 15B:
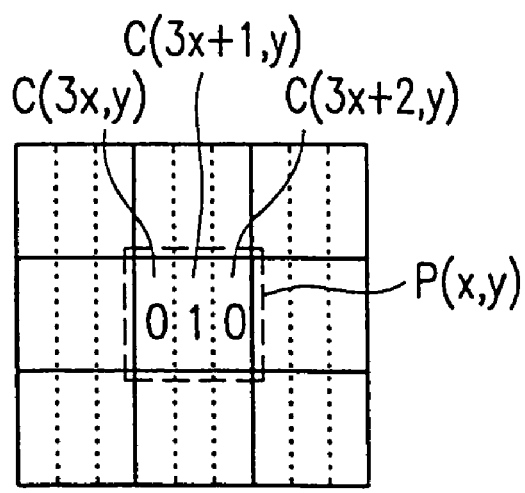
FIG. 15B shows sub-pixels defined as sub-pixels for the basic portion based on a basic portion definition rule when the eight neighborhood bits around the bit D(x,y) have values shown in FIG. 15A.

FIG. 15B shows sub-pixels defined as sub-pixels for the basic portion based on the basic portion definition rule when the eight neighborhood bits around the bit D(x,y) have values shown in FIG. 15A. The basic portion definition rule represented by FIGS. 15A and 15B can be represented by using the following logical expressions:

When N(0,−1)*!N(−1,0)*!N(1,0)*N(0,1)=1, C(3x,y) =0, C(3x+1,y)=1, C(3x+2,y)=0

Figure 16A:
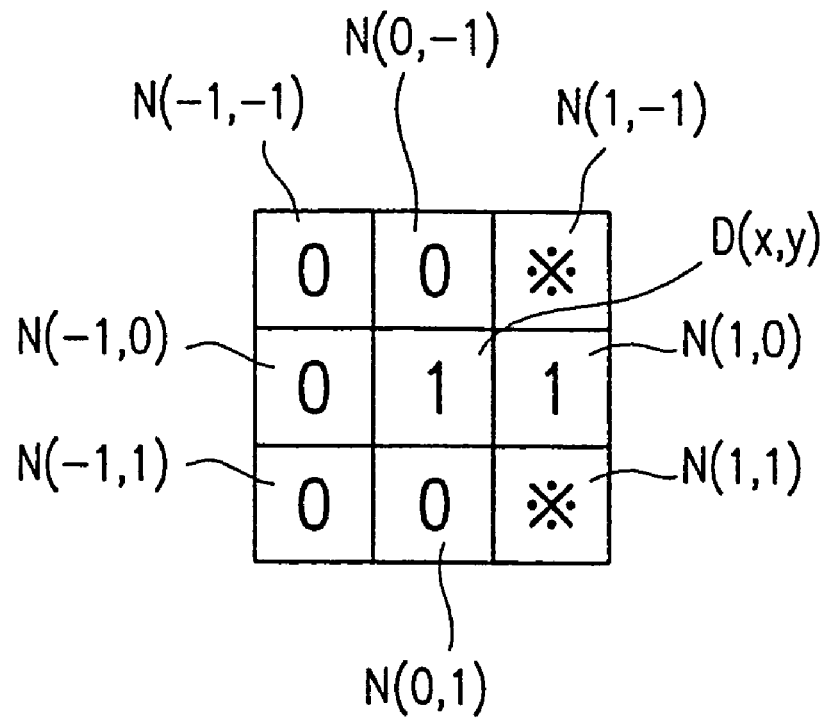
FIG. 16A shows still another example of eight neighborhoods around the current bit D(x,y) in the bit map data.

FIG. 16A shows still another example of eight neighborhoods around the current bit D(x,y) in the bit map data.

Figure 16B:
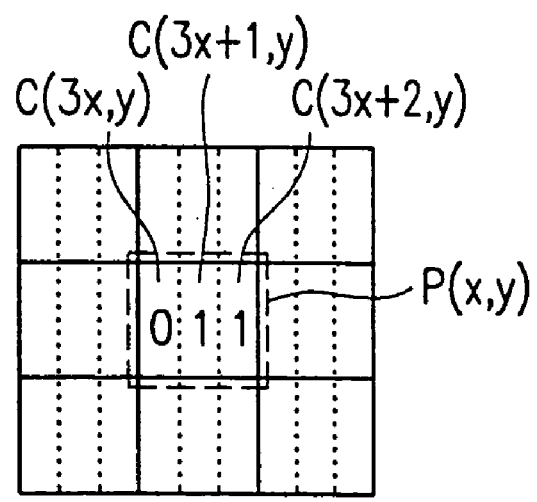
FIG. 16B shows sub-pixels defined as sub-pixels for the basic portion based on a basic portion definition rule when the eight neighborhood bits around the bit D(x,y) have values shown in FIG. 16A.

FIG. 16B shows sub-pixels defined as sub-pixels for the basic portion based on the basic portion definition rule when the eight neighborhood bits around the bit D(x,y) have values shown in FIG. 16A. The basic portion definition rule represented by FIGS. 16A and 16B can be represented by using the following logical expressions:

When !N(−1,−1)*!N(0,−1)*!N(−1,0)*N(1,0) *!N(−1, 1)*!N(0,1)=1, C(3x,y)=0, C(3x+1,y)=1, C(3x+2, y)=1

Thus, such a basic portion definition rule as described above is provided for the "1"/"0" arrangement pattern of the eight dots in the vicinity of the current bit D(x,y). Based on the basic portion definition rule, the basic portion of the graphic to be displayed on the display device 3 can be defined on a sub-pixel by sub-pixel basis.

Figure 17:
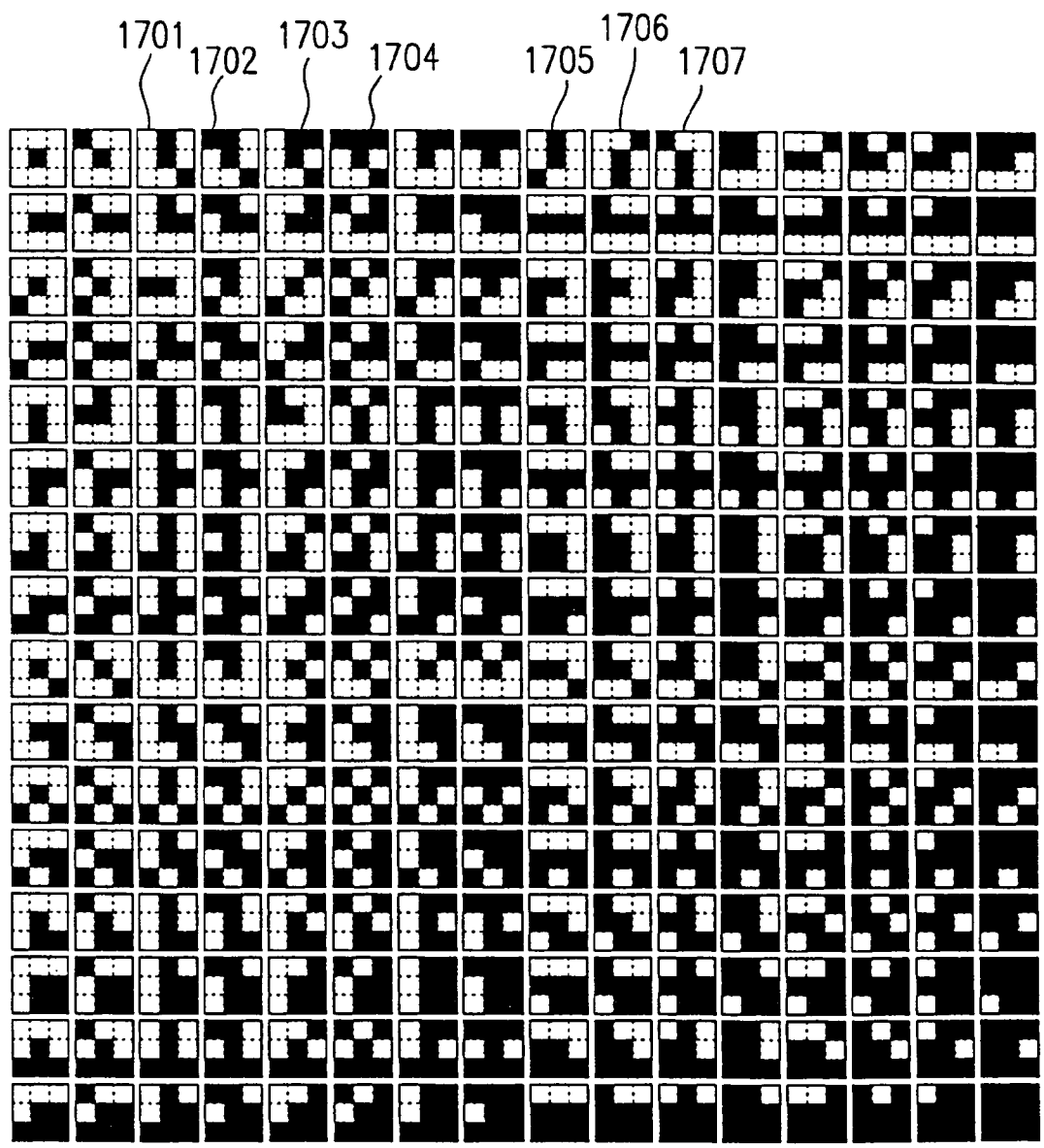
FIG. 17 shows all of exemplary "1"/"0" arrangement patterns of the eight neighborhood dots around the current bit D(x,y).

FIG. 17 shows all "1"/"0" arrangement patterns of the eight neighborhood dots around the current bit D(x,y). Each box shown in FIG. 17 includes the current bit D(x,y) and the eight neighborhood dots therearound. Each box is divided into nine regions. Each black region corresponds to a bit having a value of "1", and each white region corresponds to a bit having a value of "0". FIG. 17 shows 256 boxes. This is because each neighborhood dot has a value of "1"/"0", and accordingly, the number of the "1"/"0" arrangement patterns results in $2^8$=256 patterns. However, the number of basic portion definition rules is not necessarily required to be the same as the number of the "1"/"0" arrangement patterns, i.e., 256. As previously described, in FIGS. 13A, 14A; 15A, and 16A, bits indicated by "✕" each have any value of "0" and "1" and are not considered in the basic portion definition rule. Since the basic portion definition rule includes bits which are not considered therein, one basic portion definition rule can cover a plurality of "1"/"0" arrangement patterns among those shown in FIG. 17. For example, the basic portion definition rule represented by FIGS. 13A and 13B covers the "1"/"0" arrangement patterns shown in the boxes 1701, 1702, 1703, and 1704 of FIG. 17. Thus, when the basic portion definition rule includes a bit which takes any value of "1" or "0", the number of the basic portion definition rules required for the present invention can be reduced.

Boxes 1705 and 1706 are both reflected images of the box 1701. The basic portion definition rules which are applied to the boxes 1705 and 1706 can be readily deduced from the basic portion definition rule represented by FIGS. 13A and 13B. Furthermore, a box 1707 is a 180°-rotated image of the box 1701. The basic portion definition rule which is applied to the box 1707 can also be readily deduced from the basic portion definition rule represented by FIGS. 13A and 13B.

The basic portion definition rule may be described in the form of a group of logical expressions as described above or in the form of table data.

The present invention can employ as the bit map data, for example, a dot font which has been used in the conventional technique.

Figure 18:
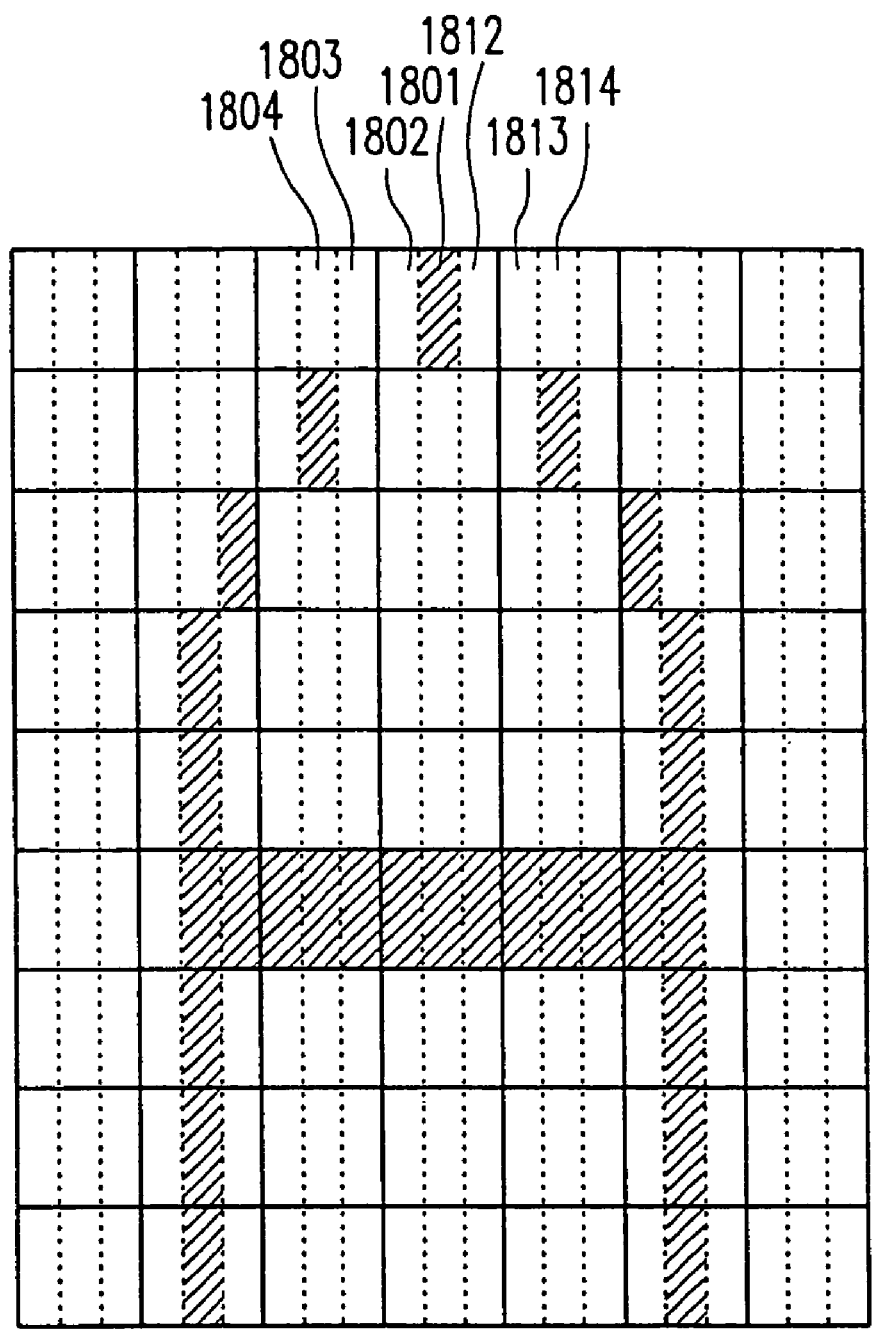
FIG. 18 shows a result of application of basic portion definition rules to a conventional dot font shown in FIG. 39B.
Figures 39A, 39B:
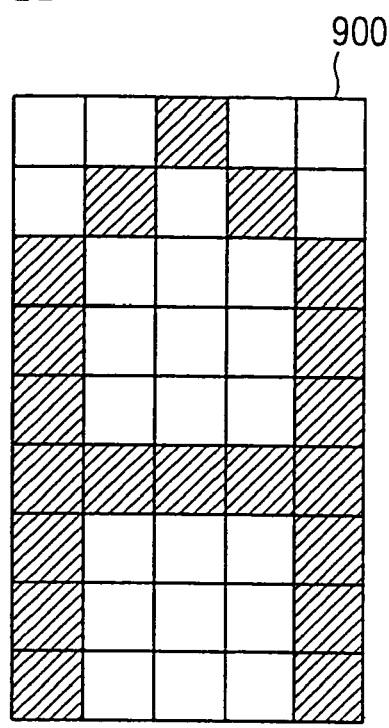
FIG. 39A shows an example of a character "A" of the English alphabet displayed on a display plane 900 of 5 pixels×9 pixels according to a conventional technique for displaying bit map data which is based on two binary values corresponding to black and white on a pixel by pixel basis.
FIG. 39B shows bit map data 904 of the character "A" of the English alphabet displayed on a display plane 900.
Figure 40A:
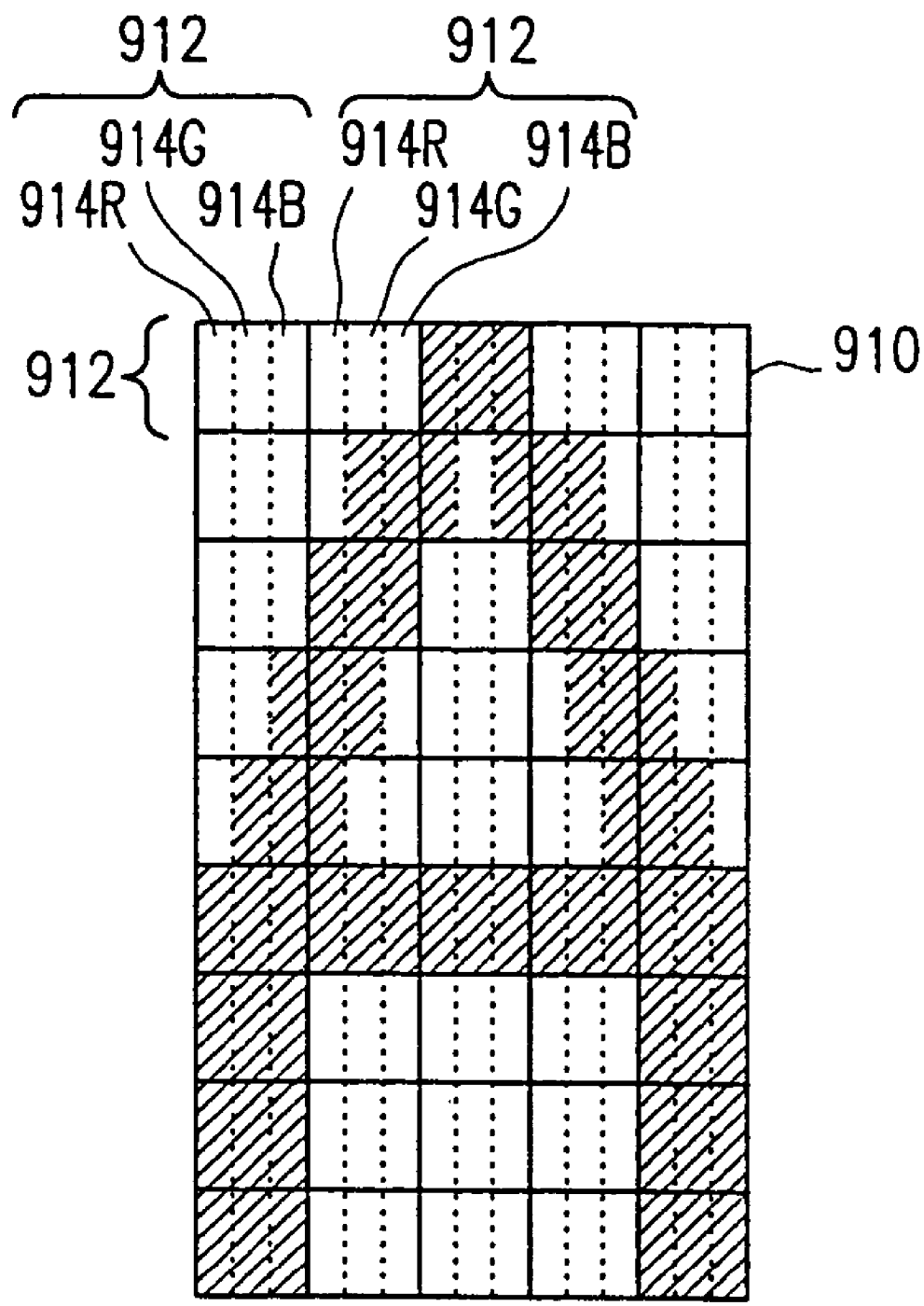
FIG. 40A shows an example of a character "A" of the English alphabet displayed on a display plane 910 of a color display device according to a technique improved from a conventional technique for displaying bit map data on a pixel by pixel basis.
Figure 40B:
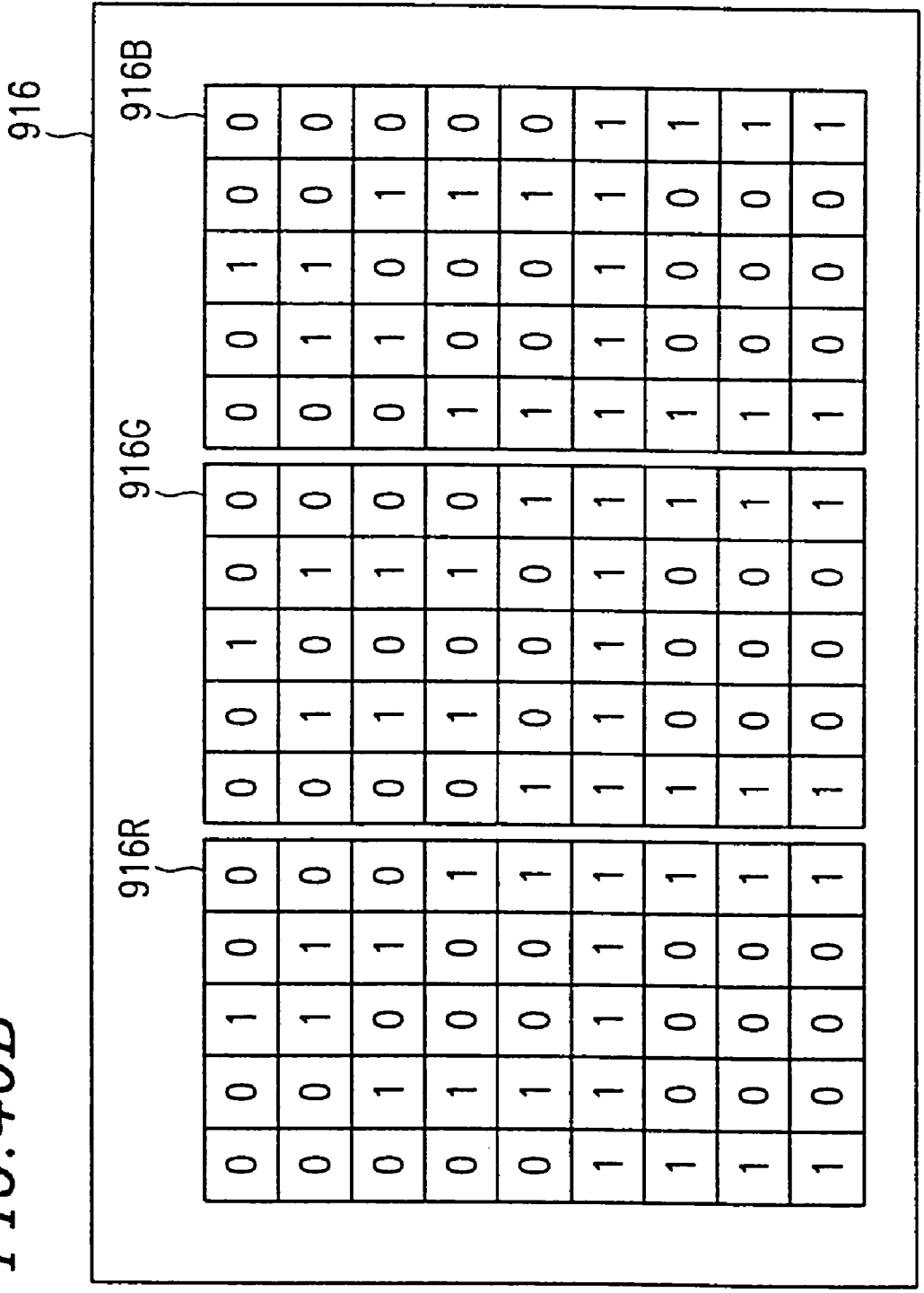
FIG. 40B shows bit map data 916 according to the above improved conventional technique.

FIG. 18 shows a result of an application of the above basic portion definition rules to the bit map data (dot font) for the character "A" of the English alphabet shown in FIG. 39B. In FIG. 18, hatched regions denote sub-pixels which are defined as sub-pixels for the basic portion.

The color element level of each of the sub-pixels which have been defined as sub-pixels for the basic portions is set to the maximum color element level (color element level 7) by the display program 41a (Step S7 in FIG. 10). Alternatively, the color element level of each of the sub-pixels which have been defined as sub-pixels for the basic portions may be set to a semi-maximum color element level (e.g., color element level 6). In this case, the entire graphic can be displayed in a lighter color.

The color element level of each of the sub-pixels in the vicinity of the sub-pixels which have been defined as sub-pixels for the basic portions is determined using, for example, the correction pattern table 5b stored in the auxiliary storage apparatus 40. How to determine the color element level of each of the vicinal sub-pixels when the correction pattern table 2060 shown in FIG. 9 is used as the correction pattern table 5b is now described below.

The correction pattern table 2060 (FIG. 9) defines a correction pattern 1. Referring to FIG. 18, the color element level of sub-pixel 1802 which is arranged adjacent to the left side of sub-pixel 1801 which has been defined as a sub-pixel for the basic portion is set to a color element level which corresponds to "sub-pixel 1" of the correction pattern 1, i.e., level 5. The color element level of sub-pixel 1803 is set to a color element level which corresponds to "Sub-pixel 2" of the correction pattern 1, i.e., level 2. The color element level of sub-pixel 1804 is set to a color element level which corresponds to "Sub-pixel 3" of the correction pattern 1, i.e., level 1. The color element levels of sub-pixels 1812, 1813, and 1814 which are arranged adjacent to the right side of sub-pixel 1801 are determined in a similar manner. Thus, by changing the color element level of each vicinal sub-pixel stepwise by using the correction pattern in the above-described manner, occurrence of a color noise can be suppressed in a portion where the difference in brightness between the adjacent sub-pixels is large.

Figure 19:
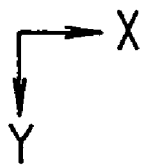
FIG. 19 shows an example of color element level determination.

FIG. 19 shows an example of color element level determination. In the example illustrated in FIG. 19, the color element level of each of the sub-pixels for the basic portion (hatched sub-pixels of FIG. 18) is set to level 7, and the color element level of each of the sub-pixels in the vicinity of the sub-pixels for the basic portion is determined by using the correction pattern table 2060. Each numeric value shown in FIG. 19 denotes the color element level of each sub-pixel.

In this way, the color element level of each of the sub-pixels in the vicinity of at least one specific sub-pixel corresponding to the basic portion of the graphic is controlled.

A sub-pixel located in the vicinity of a sub-pixel corresponding to the basic portion may not be included in a pixel in which the sub-pixel corresponding to the basic portion is included. In the example illustrated in FIG. 19, a part of sub-pixels included in pixels 3193 and 3194 adjacent to a pixel 3192 which includes a sub-pixel 3191 corresponding to the basic portion are considered as vicinal sub-pixels of the sub-pixel 3191 and set to color element level 2 or color element level 1.

Other correction patterns may be employed in place of the correction pattern 1 defined by the correction pattern table 2060 in accordance with various purposes.

Hereinafter, variations of the correction pattern table are illustrated.

FIG. 20 shows a correction pattern table 2170 which is a variation of the correction pattern table 5b. The correction pattern table 2170 defines correction patterns 1–5. The correction patterns 1–5 are selectively used in accordance with the width of lines of a graphic to be displayed, whereby the width of the lines of the graphic can be adjusted.

For example, at Step S1 in FIG. 10, line width information which represents the width of the lines of the graphic is input to the control section 20 through the input device 7. Thereafter, at Step S9 in FIG. 10, one of the correction patterns 1–5 of the correction pattern table 2170 is selected in accordance with the line width information about the input graphic, and the color element level of sub-pixels adjacent to a sub-pixel corresponding to the basic portion is determined based on the selected correction pattern. When the correction pattern 5 is selected, the lines of the graphic are displayed so as to have a greater width as compared when the correction pattern 1 is selected. In this way, the line width of the graphic can be adjusted by changing the correction patterns, i.e., controlling the color element level of sub-pixels in the vicinity of a sub-pixel corresponding to the basic portion of the graphic. Such an adjustment of the line width is useful especially when a character is emphatically displayed.

Alternatively, the adjustment of the line width can be achieved by increasing/decreasing the number of sub-pixels which are defined as sub-pixels for the basic portion.

FIG. 21 shows a correction pattern table 2180 which is a variation of the correction pattern table 5b. When the same correction pattern is used for displaying different sizes of graphics, lines of a larger-sized graphic looks narrower than those of a small-sized graphic. Thus, by changing correction patterns in accordance with the sizes of the graphics, variation in the apparent width of lines of the graphics, which may be caused due to the difference in size between the graphics, can be suppressed.

In the example illustrated in FIG. 21, three different correction patterns (correction patterns 1–3) are provided respectively for a graphic size range of 20 dots or less, a graphic size range of 21–32 dots, and a graphic size range of 33–48 dots. Thus, by selecting a correction pattern appropriate for the graphic size, it is possible to suppress variations in the apparent width of lines of the graphic. The variations in the apparent width of lines of the graphic may be further suppressed by dividing the graphic size range into a larger number of smaller ranges. For example, the size of a graphic is typically represented by the width or height of the graphic.

The correction patterns defined by the correction pattern table 2180 are used at, for example, Step S9 of FIG. 10.

FIG. 22 shows a correction pattern table 2270 which is a variation of the correction pattern table 5b. The correction pattern table 2270 defines a correction pattern 1 and a correction pattern 2. The correction pattern 1 and the correction pattern 2 are selectively used in accordance with the degree of complexity of a graphic. With such an arrangement, when a complicated graphic (e.g., a Chinese character having many strokes) is displayed, it is possible to prevent the entirety of the displayed graphic from appearing to be blackish. The complexity of the graphic an be determined by obtaining the ratio of the number of bits having a value of "1" to the number of bits having a value of "0". For example, the ratio of the number of bits having a value of "1" exceeds a predetermined ratio, the graphic is considered as a complicated graphic. The correction pattern 2 is applied to such a complicated graphic. Alternatively, the complexity of the graphic may be determined based on an arrangement of bits having a value of "1" and bits having a value of "0".

In the above description, sub-pixels for the basic portion within a pixel P(x,y) are defined based on information about eight neighborhood bits around a bit D(x,y) corresponding to the pixel P(x,y). However, the sub-pixels for the basic portion within the pixel P(x,y) may be defined based on information other than the information about the eight neighborhood bits around the bit D(x,y).

In this way, Step S7 and Steps S8–11 of FIG. 10, as a whole, function as a step of displaying a graphic on the display device 3 by controlling the sub-pixels C(3x,y), C(3x+1,y), and C(3x+2,y) included in the pixel P(x,y) (FIG. 12) based on information about whether each of bits located in the vicinity of the bit D(x,y) corresponding to one of the plurality of pixels 12 (FIG. 1) has a value of "1" or "0".

Alternatively, according to the present invention, a sub-pixel for the basic portion of a graphic may be defined in accordance with the inclination angle of a line included in the graphic. Furthermore, correction patterns may be selectively used in accordance with the inclination angle. These are described below. In the example described below, R-, G-, B-sub-pixels Included in a pixel are arranged in a horizontal direction. That is, a pixel includes a left-side sub-pixel, a middle sub-pixel, and a right-side sub-pixel.

FIG. 23A shows bit map data which represents a line of tan θ=1. In FIG. 23A, each hatched box represents a bit having a value of "1", and each open box represents a bit having a value of "0". Herein, "tan θ" represents the inclination angle of a line included in a graphic. The inclination angle of a line included in a graphic can be obtained by detecting continuity of "1"-bits around a current bit.

FIG. 23B shows sub-pixels which are defined as sub-pixels for the basic portion of the line of tan θ=1 shown in FIG. 23A. In FIG. 23B, sub-pixels labeled with "7" (color element level) denote sub-pixels for the basic portion of the line. When tan θ=1, among sub-pixels included in a pixel corresponding to a bit having a value of "1", a middle sub-pixel is defined as a sub-pixel for the basic portion. For example, among sub-pixels 2321, 2322, and 2323 included in a pixel 2312 corresponding to a bit 2301 having a value of "1" shown in FIG. 23A, a middle sub-pixel 2322 is defined as a sub-pixel for the basic portion.

FIG. 23C shows an exemplary color element level arrangement of sub-pixels in the vicinity of the sub-pixels for the basic portion of the line of tan θ=1 shown in FIG. 23A. As shown in FIG. 23C, when tan θ=1, the color element levels of the vicinal sub-pixels are determined using, for example, a correction pattern (5,3,2,1).

Figure 24A:
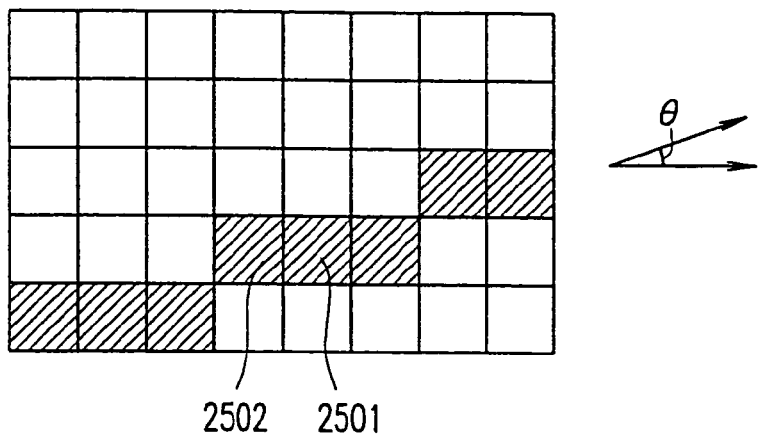
FIG. 24A shows bit map data which represents a line of tan θ=⅓.

FIG. 24A shows bit map data which represents a line of tan θ=⅓. In FIG. 24A, each hatched box represents a bit having a value of "1", and each open box represents a bit having a value of "0".

Figure 24B:
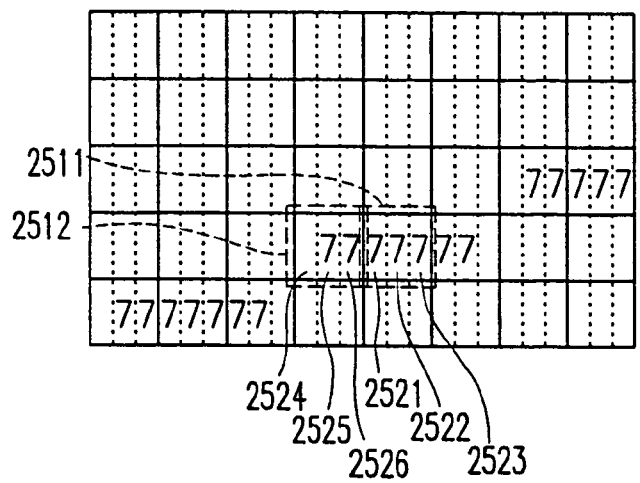
FIG. 24B shows sub-pixels defined as sub-pixels for the basic portion of the line of tan θ=⅓ shown in FIG. 24A.

FIG. 24B shows sub-pixels which are defined as sub-pixels for the basic portion of the line of tan θ=⅓ shown in FIG. 24A. In FIG. 24B, sub-pixels labeled with "7" (color element level) denote sub-pixels for the basic portion of the line. When tan θ=⅓, among sub-pixels included in a pixel corresponding to a current bit having a value of "1", a middle sub-pixel is defined as a sub-pixel for the basic portion. Furthermore, when bits having a value of "1" are arranged adjacent to the right side and/or the left side of the current bit, among the sub-pixels included in the pixel corresponding to the current bit, the left-side sub-pixel and/or the right-side sub-pixel are also defined as sub-pixels for the basic portion of the line. For example, among sub-pixels 2521, 2522, and 2523 included in a pixel 2511 corresponding to a bit 2501 having a value of "1" shown in FIG. 24A, a middle sub-pixel 2522 is defined as a sub-pixel for the basic portion. Furthermore, a left-side sub-pixel 2521 and a right-side sub-pixel 2523 are also defined as sub-pixels for the basic portion of the line. Moreover, among sub-pixels 2524, 2525, and 2526 included in a pixel 2512 corresponding to a bit 2502 having a value of "1" shown in FIG. 24A, a middle sub-pixel 2525 and a right-side sub-pixel 2526 are defined as sub-pixels for the basic portion.

Figure 24C:
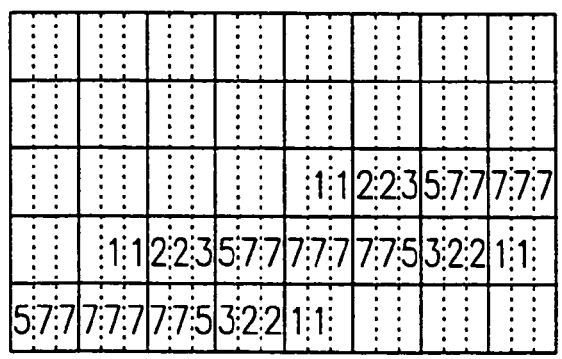
FIG. 24C shows an exemplary color element level arrangement of sub-pixels in the vicinity of the sub-pixels for the basic portion of the line of tan θ=⅓ shown in FIG. 24A.

FIG. 24C shows an exemplary color element level arrangement of sub-pixels in the vicinity of the sub-pixels for the basic portion of the line of tan θ=⅓ shown in FIG. 24A. As shown in FIG. 24C, when tan θ=⅓, the color element levels of the vicinal sub-pixels are determined using, for example, a correction pattern (5,3,2,2,1,1). This correction pattern is different from the correction pattern (5,3,2,1) which is used when tan θ=1 (see FIG. 23C). Generally, when a line is displayed in a display device, as the value of tan θ for the line decreases, the jaggedness becomes more conspicuously. According to the present invention, by selecting a correction pattern appropriate for the value of tan θ, it is possible to reduce the degree of the jaggedness so as to be less conspicuous to a human eye even when the value of tan θ is small. That is, the line can be displayed so as to appear smooth.

On the other hand, when the value of tan θ is greater than 1, it is sometimes preferable that a different correction pattern be applied to a portion of a line in accordance with a position of a sub-pixel which is defined as a sub-pixel for the basic portion of the line. Such a case is described below.

Figure 25A:
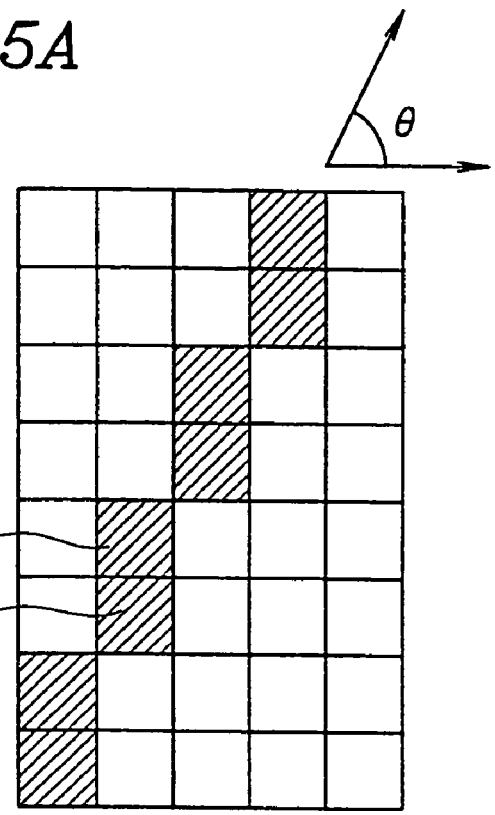
FIG. 25A shows bit map data which represents a line of tan θ=2.

FIG. 25A shows bit map data which represents a line of tan θ=2. In FIG. 25A, each hatched box represents a bit having a value of "1", and each open box represents a bit having a value of "0".

Figure 25B:
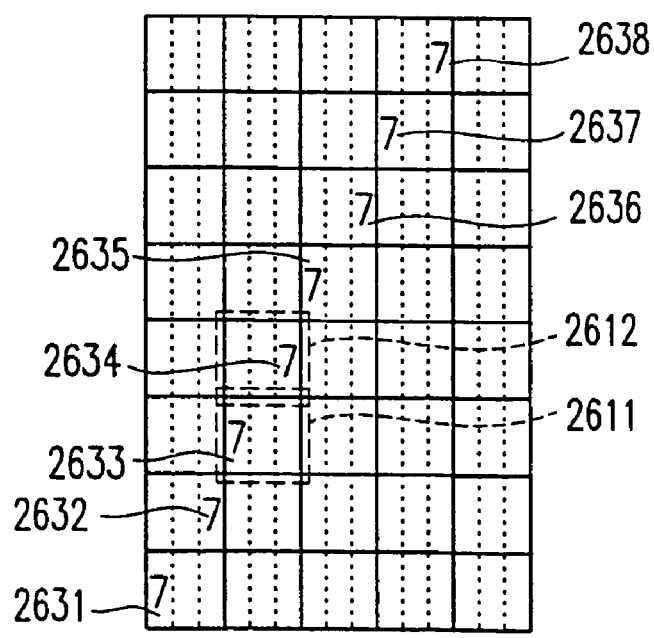
FIG. 25B shows sub-pixels defined as sub-pixels for the basic portion of the line of tan θ=2 shown in FIG. 25A.

FIG. 25B shows sub-pixels which are defined as sub-pixels for the basic portion of the line of tan θ=2 shown in FIG. 25A. In FIG. 25B, sub-pixels labeled with "7" (color element level) denote sub-pixels for the basic portion of the line. An oblique line shown in FIG. 25A extends from the lower left corner toward the upper right corner. Two vertically-adjacent "1"-bits 2601 and 2602 (FIG. 25A) correspond to pixels 2611 and 2612 (FIG. 25B), respectively. From among these two pixels, in the lower pixel 2611, the left-side sub-pixel 2633 is defined as a sub-pixel for the basic portion; and in the upper pixel 2612, the right-side sub-pixel 2634 is defined as a sub-pixel for the basic portion. Sub-pixels 2631–2638 shown in FIG. 25B are defined as sub-pixels for the basic portion in this manner. As seen from FIG. 25B, central points of these sub-pixels for the basic portion do not stand in a line but in a zigzag arrangement.

Figure 25C:
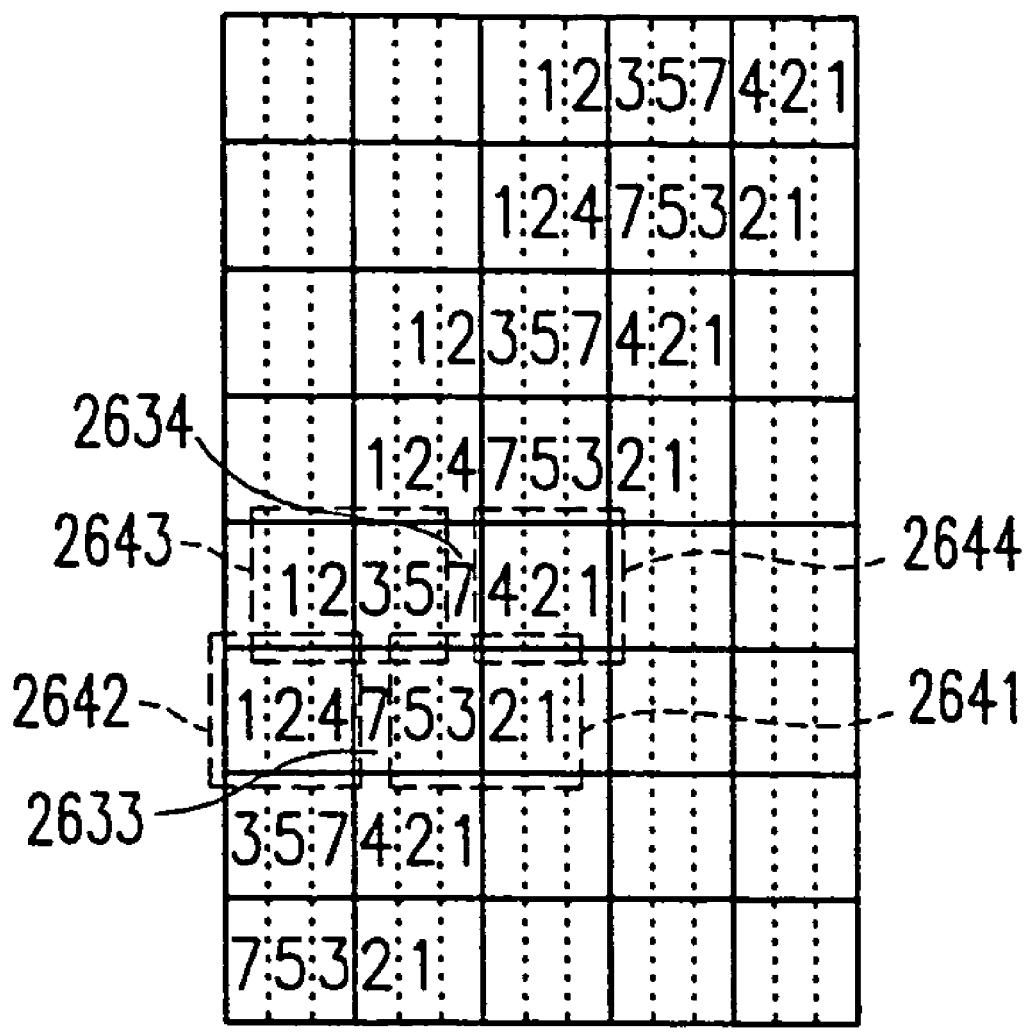

FIG. 25C shows an exemplary color element level arrangement of sub-pixels in the vicinity of the sub-pixels for the basic portion of the line of tan θ=2 shown in FIG. 25A. As shown in FIG. 25C, when tan θ=2, different correction patterns are used for the right side and the left side of the sub-pixel for the basic portion. Specifically, a correction pattern (5,3,2,1) is applied to a neighborhood 2641 which is adjacent to the right side of the sub-pixel 2633 and a neighborhood 2643 which is adjacent to the left side of the sub-pixel 2634; and a correction pattern (4,2,1) is applied to a neighborhood 2642 which is adjacent to the left side of the sub-pixel 2633 and a neighborhood 2644 which is adjacent to the right side of the sub-pixel 2634. In this way, different correction patterns are applied to the right-side neighborhood and the left-side neighborhood, whereby an oblique line can be prevented from being perceived as a zigzag line (which may be caused due to the zigzag arrangement of sub-pixels for the basic portion). That is, an oblique line can be displayed as a smooth straight line.

Figure 26A:
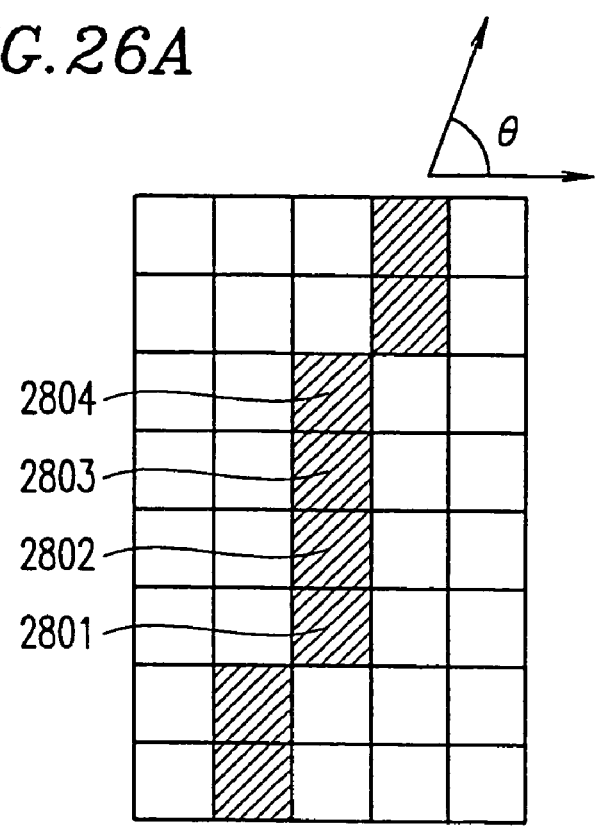
FIG. 26A shows bit map data which represents a line of tan θ=4.

FIG. 26A shows bit map data which represents a line of tan θ=4. In FIG. 26A, each hatched box represents a bit having a value of "1", and each open box represents a bit having a value of "0".

Figure 26B:
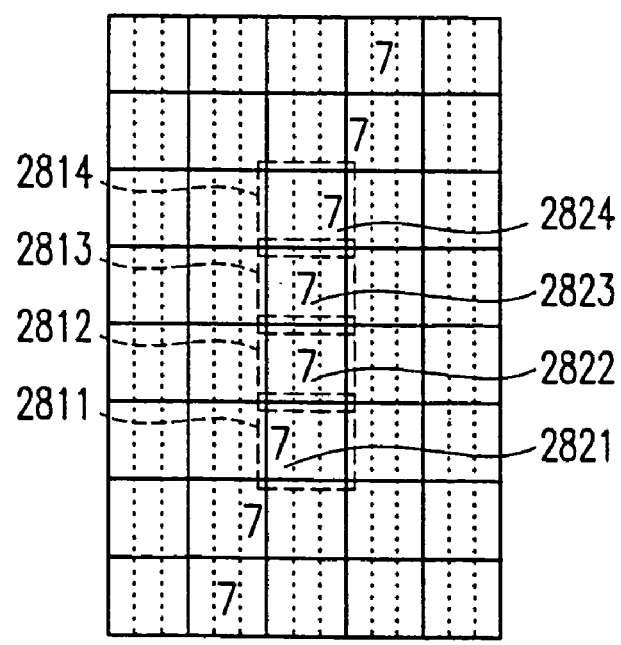
FIG. 26B shows sub-pixels which are defined as sub-pixels for the basic portion of the line of tan θ=4 shown in FIG. 26A.

FIG. 26B shows sub-pixels which are defined as sub-pixels for the basic portion of the line of tan θ=4 shown in FIG. 26A. In FIG. 26B, sub-pixels labeled with "7" (color element level) denote sub-pixels for the basic portion of the line. An oblique line shown in FIG. 26A extends from the lower left corner toward the upper right corner. Four vertically-adjacent "1"-bits 2801–2804 (FIG. 26A) correspond to pixels 2811 and 2814 (FIG. 26B), respectively. From among these four pixels, in the lowermost pixel 2811, the left-side sub-pixel 2821 is defined as a sub-pixel for the basic portion; in the middle pixels 2812 and 2813, the middle sub-pixels 2822 and 2823 are defined as sub-pixels for the basic portion; and in the uppermost pixel 2814, the right-side sub-pixel 2824 is defined as a sub-pixel for the basic portion.

Figure 26C:
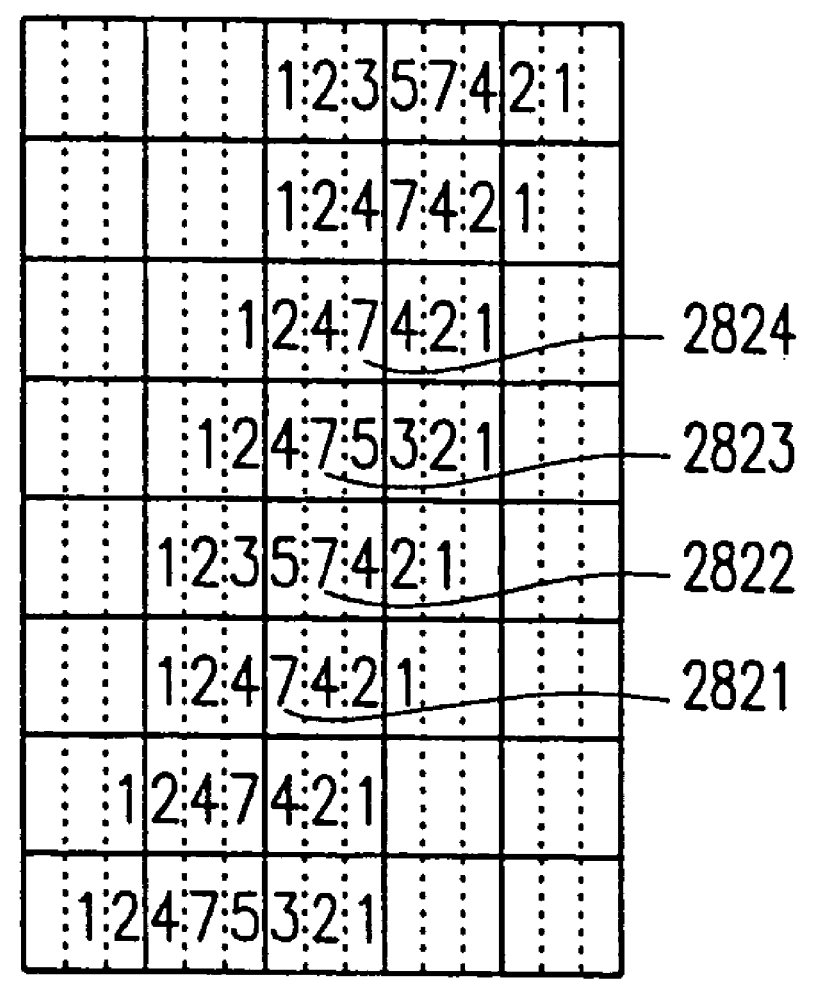

FIG. 26C shows an exemplary color element level arrangement of sub-pixels in the vicinity of the sub-pixels for the basic portion of the line of tan θ=4 shown in FIG. 26A. As shown in FIG. 26C, a correction pattern (4,2,1) is applied to neighborhoods which are adjacent to the left and right sides of the sub-pixels 2821 and 2824; a correction pattern (5,3,2,1) is applied to a neighborhood which is adjacent to the left side of the sub-pixel 2822 and a neighborhood which is adjacent to the right side of the sub-pixel 2823; and a correction pattern (4,2,1) is applied to a neighborhood which is adjacent to the right side of the sub-pixel 2822 and a neighborhood which is adjacent to the left side of the sub-pixel 2823. The correction pattern (4,2,1) is is applied to neighborhoods which are adjacent to the left and right sides of the sub-pixels 2824 and 2821.

As described above, correction patterns are changed in accordance with a position of each sub-pixel which is defined as a sub-pixel for the basic portion of an oblique line, whereby the oblique line can be displayed as a smooth straight line.

As described above with reference to FIGS. 23A, 23B, and 23C through 26A, 26B, and 26C, according to the method for controlling sub-pixels based on the continuity of bits, an oblique line can be displayed on the display device 3 as a smooth straight line. Thus, this method is useful especially when a graphic including many oblique lines is displayed on the display device 3. The process for defining sub-pixels for the basic portion of the graphic based on the continuity of bits is performed, for example, at Step S6 of FIG. 10. Furthermore, the process for changing correction patterns in accordance with a position of each sub-pixel which is defined as a sub-pixel for the basic portion is performed, for example, at Step S9 of FIG. 10.

In the examples described above, bits of bit map data which represent a graphic correspond to pixels on a display plane. For example, the bit D(x,y) of FIG. 11 corresponds to the pixel P(x,y) of FIG. 12. A single pixel can be considered as a group of a plurality of sub-pixels. For example, the pixel P(x,y) is considered as a group of sub-pixels C(3x,y), C(3x+1,y), and C(3x+2,y). In the present invention, although each bit of bit map data corresponds to a group of three sub-pixels, these sub-pixels are not necessarily included in one pixel. For example, the bit D(x,y) shown in FIG. 11 may correspond to a group Grp of sub-pixels shown in FIG. 12, Furthermore, the number of sub-pixels included in one group is not necessarily equal to the number of sub-pixels included in one pixel. For example, when one pixel includes three sub-pixels, one bit of the bit map data may correspond to a group Grp' of four sub-pixels, Furthermore, the present invention is not limited to a group of sub-pixels which are arranged only along the X-direction. For example, as shown in a group Grp" of sub-pixels in FIG. 12, one bit of the bit map data may correspond to a group of sub-pixels which are arranged along the X- and Y-directions. Thus, also when a bit corresponds to a group of any predetermined number of sub-pixels, the present invention is applicable by using the basic portion definition rule in accordance with the number and arrangement of sub-pixels. Embodiments 2 and 4 (which will be described later) are also not limited to the arrangement where a bit corresponds to a pixel. A bit may correspond to a group of any predetermined number of sub-pixels.

Furthermore, in the above examples, each sub-pixel has one of a plurality of color elements; however, the present invention is not limited thereto. For example, the graphic display technique of the present invention is applicable even when each sub-pixel is set to any of gray-scale levels based on black or white. Alternatively, even when all of sub-pixels have a single color element, e.g., G (green), a graphic can be displayed with a high definition by utilizing lightness/darkness levels of the single color element.

Thus, according to the present invention, each bit of bit map data which represents a graphic corresponds to a group of any number (>1) of sub-pixels, and the sub-pixels included in the group are controlled based on information about bits around the bit corresponding to the group. With such a structure, the graphic can be displayed with a high definition, and the amount of data required for displaying the graphic can be reduced.

According to the present invention, a graphic can be displayed with a higher resolution than that of bit map data which represents the graphic. Thus, the present invention is useful even when the resolution of the bit map data is low. For example, a character represented by a dot font including a small number of dots (i.e., a small-sized character) can be displayed with high resolution. Therefore, the present invention is useful especially for an information display apparatus such as a portable information terminal, a portable phone including a PHS, or the like. This is because in the portable information display apparatus, the size of the display device is limited, and legibility undesirablly deteriorates when the size of a character to be displayed on the display device increases.

As described above, when a character is displayed by the graphic display apparatuses 1a according to embodiment 1 (FIG. 8A), i.e., when the graphic display apparatuses 1a is used as a character display apparatus, the character can be displayed with a high definition. However, the present inventors found through experimentations that a character is sometimes displayed such that a local portion of the character results in an undesirable shape.

An example of such a case where a local portion of a character is displayed in an undesirable shape by the graphic display apparatuses 1a according to embodiment 1 is now described with reference to FIGS. 27A and 27B.

Figure 27A:
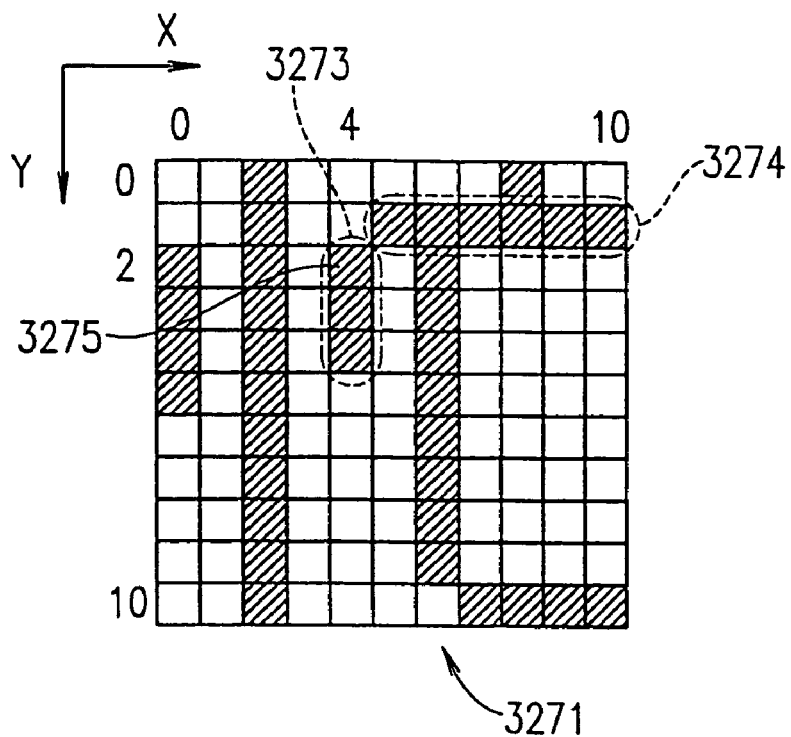
FIG. 27A shows bit map data (dot font) 3271 which represents a shape of a Chinese character "忙" having a character size of 11 dots×11 dots.

FIG. 27A shows bit map data (dot font) 3271 which represents a shape of a Chinese character "char" having a character size of 11 dots×11 dots. A portion 3273 is the third stroke of the Chinese character "char", and a portion 3274 is the fifth stroke of the Chinese character "char".

Figure 27B:
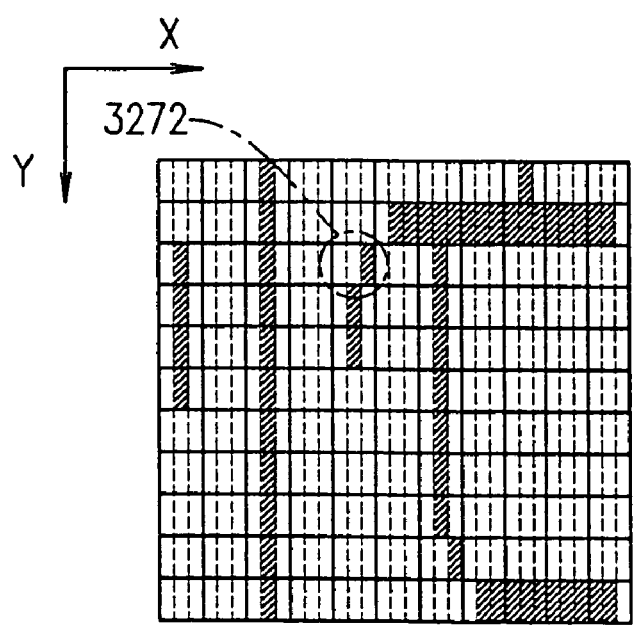
FIG. 27B shows a result of application of the basic portion definition rules to the bit map data 3271 shown in FIG. 27A.

FIG. 27B shows a result of application of the basic portion definition rules to the bit map data 3271 shown in FIG. 27B. In FIG. 27B, hatched regions denote sub-pixels which are defined as sub-pixels for the basic portion based on the basic portion definition rules which have been described above with reference to FIGS. 23A, 23B, and 23C through 26A, 26B, and 26C.

In the graphic display apparatuses 1a according to embodiment 1, for example in a similar manner to that described with reference to FIGS. 18 and 19, the color element level of each of the sub-pixels which have been defined as sub-pixels for the basic portions shown in FIG. 27B is set to the maximum color element level.

Then, the color element level of each of the sub-pixels in the vicinity of the sub-pixels which have been defined as sub-pixels for the basic portions is determined using the correction pattern table 5b. After such a determination, the character "忙" is displayed on the display device 3 (FIG. 8A). Thus, the arrangement of the sub-pixels for the basic portions is reflected in the quality of the character "忙" displayed on the display device 3.

An encircled portion 3272 of FIG. 27B is a local portion of the character "忙" which is displayed in an undesirable shape. In the encircled portion 3272, the upper end of the third stroke of the character "忙" which corresponds to the portion 3273 (FIG. 27A) is offset toward the right side thereof as compared with the other portion of the third stroke. Thus, when the character "忙" is displayed after the color element level of each of the vicinal sub-pixels is determined using the correction pattern table 5b, the upper end of the third stroke of the character "忙" (portion 3272) is undesirably distorted. As a result, the character "忙" is not displayed with a high definition.

The cause of such an undesirable shape of the local portion of the character "忙" is that the basic portion definition rules consider the third stroke 3273 (FIG. 27A) and the fifth stroke 3274 (FIG. 27A) adjacent thereto as a single stroke.

According to embodiment 2 of the present invention, a character display apparatus capable of displaying a character with a higher definition by correcting a local portion of a character which may result in an undesirable shape when employing the display method of embodiment 1 is provided. Such a character display apparatus is described below.

Embodiment 2

Figure 8B:
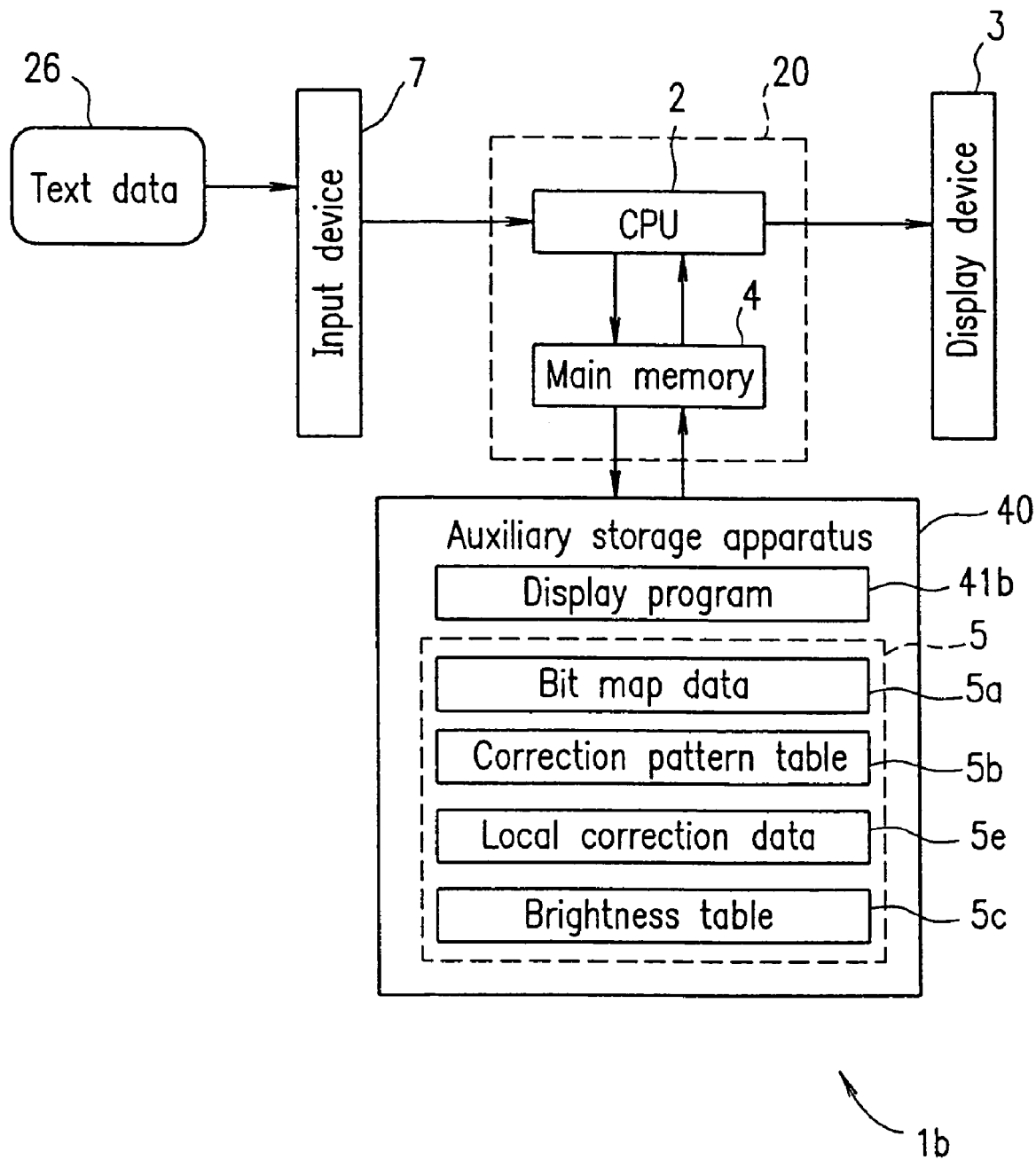
FIGS. 8B and 8C illustrate structures of character display apparatuses 1b and 1c according to embodiments 2 and 3 of the present invention.

FIG. 8B shows a structure of a character display apparatus 1b according to embodiment 2 of the present invention. In FIG. 8B, like elements are indicated by like reference numerals used in FIG. 8A, and detailed descriptions thereof are omitted.

The character display apparatus 1b may be, for example, a personal computer. Such a personal computer may be of any type such as a desk top type or lap top type computer. Alternatively, the character display apparatus 1b may be a word processor.

Moreover, the character display apparatus 1b may alternatively be any information display apparatus such as an electronic apparatus or information apparatus incorporating a color display device. For example, the character display apparatus 1b may be an electronic apparatus incorporating a color liquid crystal display device a portable information terminal which is a portable information tool, a portable phone including a PHS, a general-purpose communication apparatus such as a telephone/FAX, or the like.

In the character display apparatus 1b, bit map data 5a stored in the auxiliary storage apparatus 40 is a dot font for a character. When a character is displayed on the display device 3, text data 26 including a character code, a character size, etc., is input to the control section 20 through the input device 7. The control section 20 searches for data of the character to be displayed on the display device 3 through the bit map data (dot fonts) 5a stored in the auxiliary storage apparatus 40. In this case, for example, a keyboard or the like is used as the input device 7. In the case where the character display apparatus 1b is a portable phone, for example, the text data 26 may be input using numeric keys or a jog-dial.

The character display apparatus 1b includes a display program 41b in place of the display program 41a of the character display apparatus 1b (FIG. 8A). The character display apparatus 1b further includes local correction data 5e.

The local correction data 5e indicates whether or not there is a local portion of a character which is displayed in an undesirable shape when the basic portion definition rules are applied to the character. The local correction data 5e further indicates, if so, where such a local portion is, and how the local portion should be corrected so as to display the character with a higher quality.

Figure 28:
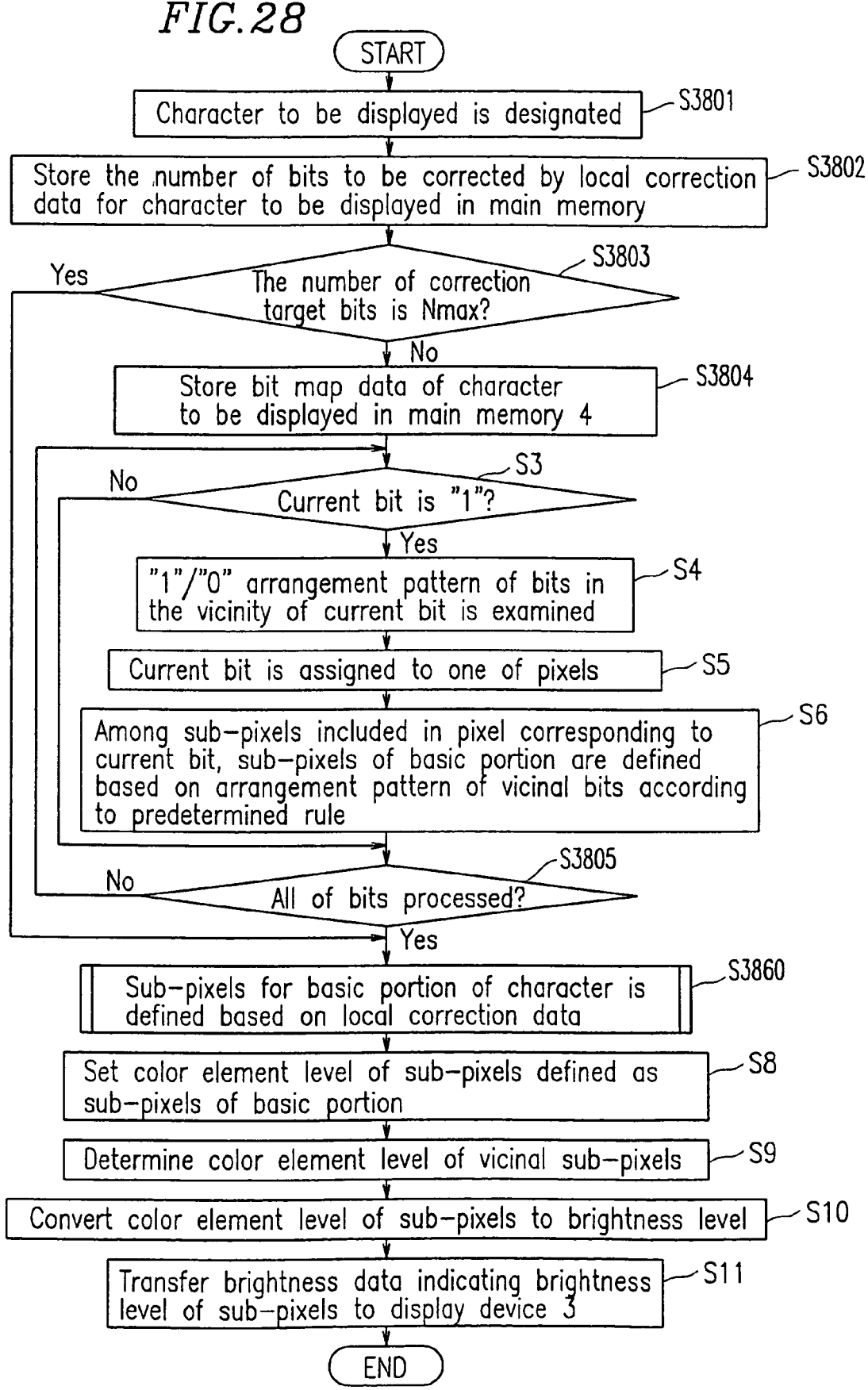
FIG. 28 is a flowchart illustrating a procedure for processing the display program 41b.

FIG. 28 illustrates a procedure for processing the display program 41b. The display program 41b is executed by the CPU 2. Each step in the procedure for processing the display program 41b will now be described. It should be noted that in FIG. 28, the same steps (Steps S3–S6 and Steps S8–S11) described in FIG. 10 are denoted by the same reference numerals, and the descriptions thereof are herein omitted.

Step S3801: A character to be displayed on the display device 3 is designated. As described above with reference to FIG. 8A, this designation is achieved by inputting the text data 26 to the control section 20 through the input device 7.

Step S3802: The number of bits to be corrected by the local correction data 5e for the character designated at Step S3801 is stored in the main memory 4. A structure of the local correction data 5e is described later with reference to FIGS. 29 through 31.

Step S3803: It is determined whether or not the number of bits to be corrected, stored in the main memory 4 at Step S3802, is equal to Nmax. Herein, among bits included in the bit map data of the character, a bit which causes the character to be displayed in an undesirable shape when applying the basic portion definition rules described with reference to FIGS. 13A and 13B through 16A and 16B, i.e., a bit to be corrected, is referred to as a "correction target bit". In the example illustrated in FIG. 27A, a bit 3275 is a correction target bit. Nmax denotes the total number of bits included in the bit map data for the character. Nmax is calculated from the size of the character which has been designated by the text data 26 at Step S3801. For example, when the size of the designated character is 11 dots×11 dots, Nmax=11×=121.

Step S3804: The bit map data 5a of the character which has been designated at Step S3801 is stored in the main memory 4.

Step S3805: It is determined whether steps S3–S6 have been performed for all of the bits which form the bit map data 5a. If "Yes", the process proceeds to step S3860. If "No", the process returns to step S3. At Step S3805, it may be determined whether steps S3–S6 have been performed for all of the bits which form the bit map data 5a except for the correction target bit.

At the time when the result of Step S3805 is determined to be "Yes", a sub-pixel for the basic portion of the character has been defined for all of pixels corresponding to the bits included in the bit map data 5a except for the correction target bit.

Step S3860: A sub-pixel for the basic portion of the character is defined based on the local correction data 5e. Details of Step S3860 will be described later with reference to FIG. 32. By executing Step S3860, with respect to a pixel corresponding to each correction target bit, a sub-pixel for the basic portion of the character is defined. Thus, at the time when Step S3860 is completed, a sub-pixel for the basic portion of the character has been defined for all of pixels corresponding to the bits included in the bit map data 5a.

A data structure of the local correction data 5e is now described with reference to FIGS. 29 through 31. The data structure of the local correction data 5e varies among three data structure patterns in accordance with the number of correction target bits among Nmax bits included in the bit map data of the character.

Figure 29:
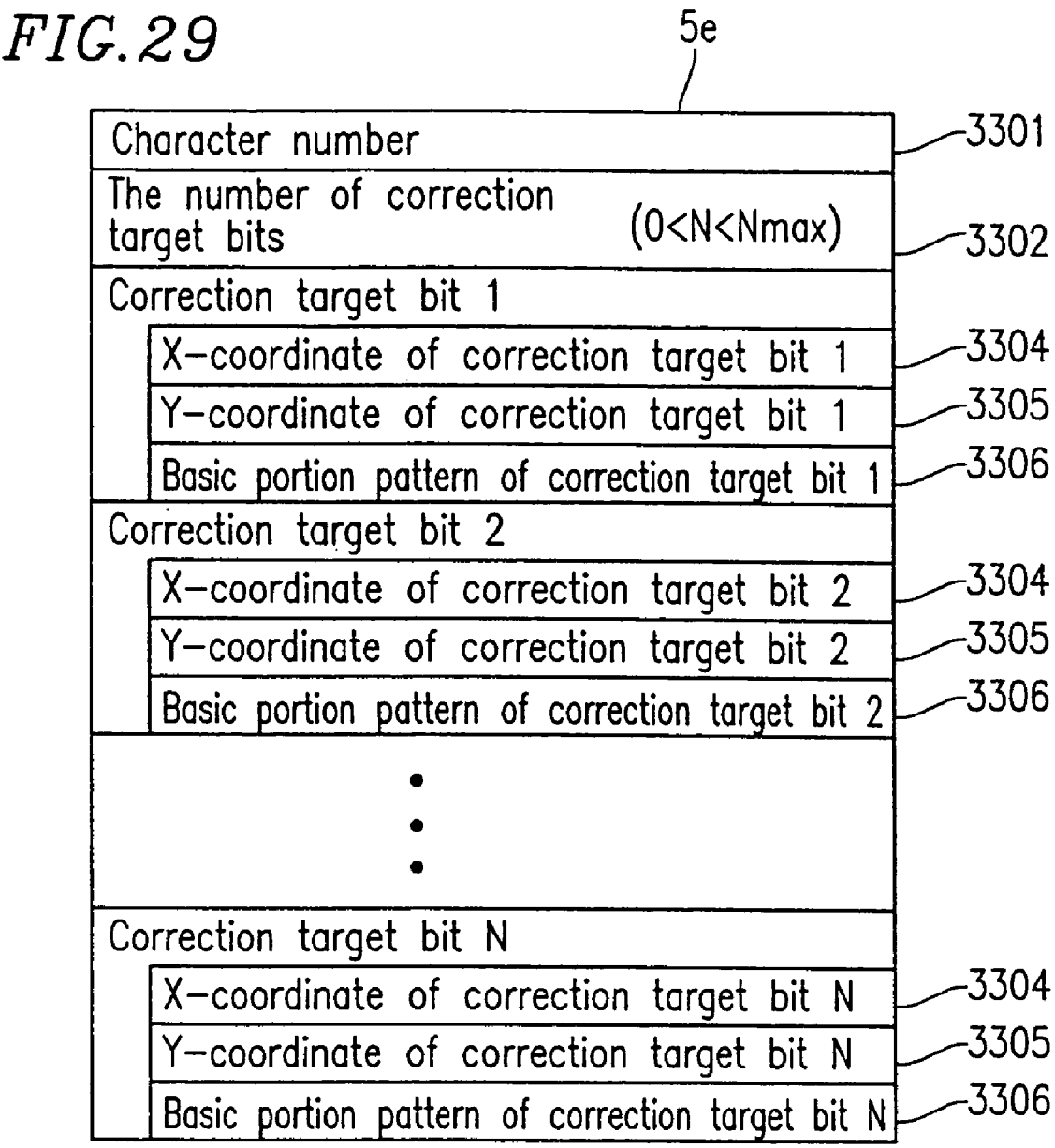
FIG. 29 shows a data structure of local correction data 5e when the number of correction target bits, N, is greater than 0 and smaller than Nmax.

FIG. 29 shows a data structure of the local correction data 5e when the number of correction target bits, N, is greater than 0 and smaller than NMax. The local correction data 5e includes a character number 3301, the number of correction target bits, 3302, an X-coordinate 3304 and Y-coordinate 3305 of each correction target bit, and A basic portion pattern 3306 of the correction target bit. The character number 3301 is, for example, a character code which represents a type of the character. The X-coordinate 3304 and Y-coordinate 3305 of the correction target bit represent a position of the correction target bit in the bit map data which represents the shape of the character. The basic portion pattern 3306 of the correction target bit represents sub-pixels to be defined as sub-pixels for the basic portion of the character among sub-pixels included in a pixel corresponding to the correction target bit. For example, when a pixel includes three sub-pixels arranged along a horizontal direction (a left-side sub-pixel, a middle sub-pixel, and a right-side sub-pixel), and the middle sub-pixel is defined as a sub-pixel for the basic portion, the basic portion pattern 3306 can be represented as (0,1,0).

The local correction data Se includes N sets of an X-coordinate 3304 and Y-coordinate 3305 of a correction target bit, and a basic portion pattern 3306 of the correction target bit.

In this way, the local correction data se designates N correction target bits and determines how sub-pixels for the basic portion is defined for each of the N correction target bit.

Figure 30:
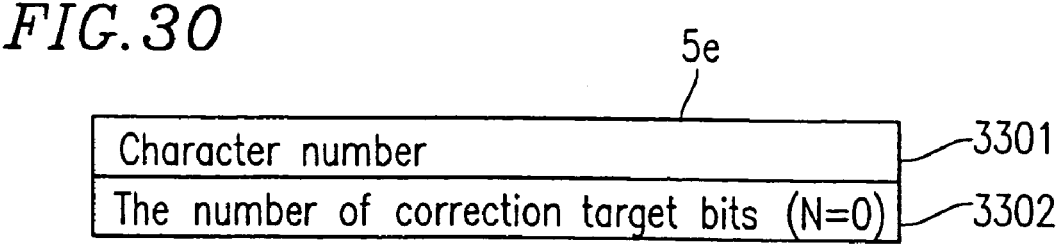
FIG. 30 shows a data structure of the local correction data 5e when the number of correction target bits, N, is equal to 0.

FIG. 30 shows a data structure of the local correction data 5e when the number of correction target bits, N, is equal to 0. In FIG. 30, like elements are indicated by like reference numerals used in FIG. 29, and detailed descriptions thereof are omitted. When N is 0, the local correction data 5e does not include an X-coordinate 3304 and Y-coordinate 3305 of a correction target bit, and a basic portion pattern 3306 of the correction target bit, which have been described with reference to FIG. 29.

Figure 31:
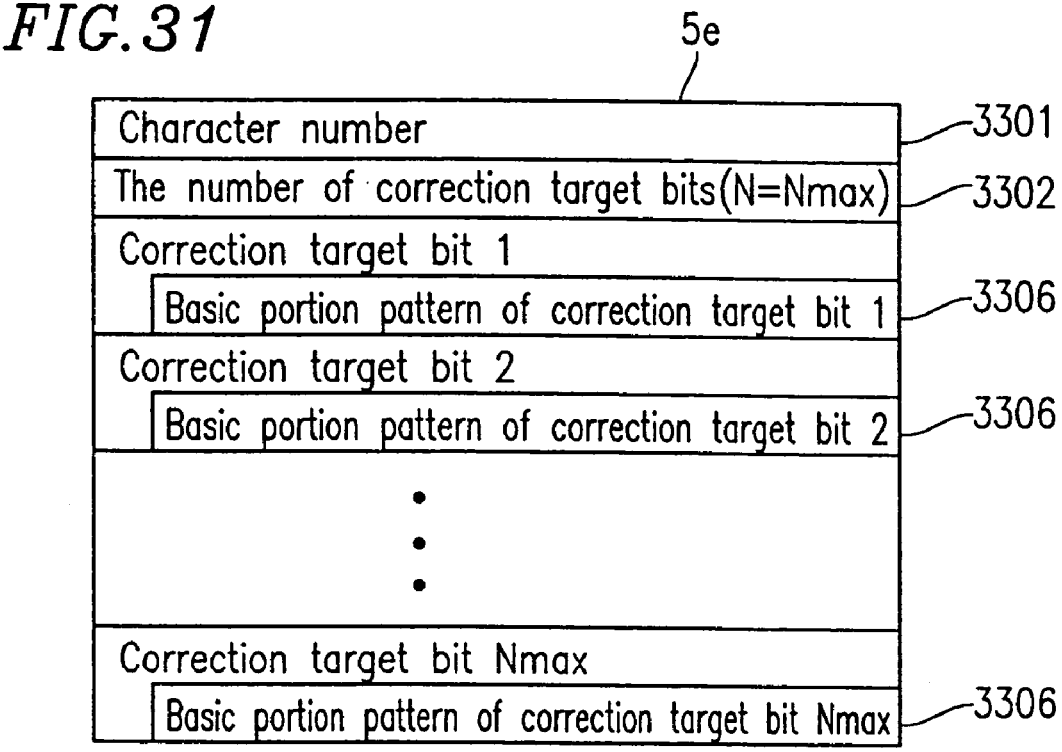
FIG. 31 shows a data structure of the local correction data 5e when the number of correction target bits, N, is equal to Nmax.

FIG. 31 shows a data structure of the local correction data 5e when the number of correction target bits, N, is equal to Nmax. In FIG. 31, like elements are indicated by like reference numerals used in FIG. 29, and detailed descriptions thereof are omitted. Herein, N=Nmax means that all of the Nmax bits included in the bit map data of the character are correction target bits. In this case, if an arrangement order of the correction target bits has been previously determined, X-coordinates 3304 and Y-coordinates 3305, which will be described with reference to FIG. 29, can be omitted. For example, the arrangement order can be previously determined such that a correction target bit 1 of FIG. 31 has an X-coordinate 0 and Y-coordinate 0, and a correction target bit 2 of FIG. 31 has an X-coordinate 1 and Y-coordinate 0. Thus, when the values of X-coordinate and Y-coordinate are designated, a basic portion pattern of a correction target bit located at the designated X-coordinate and Y-coordinate (the n-th correction target bit ($1 \leq n \leq Nmax$)) can be obtained.

Figure 32:
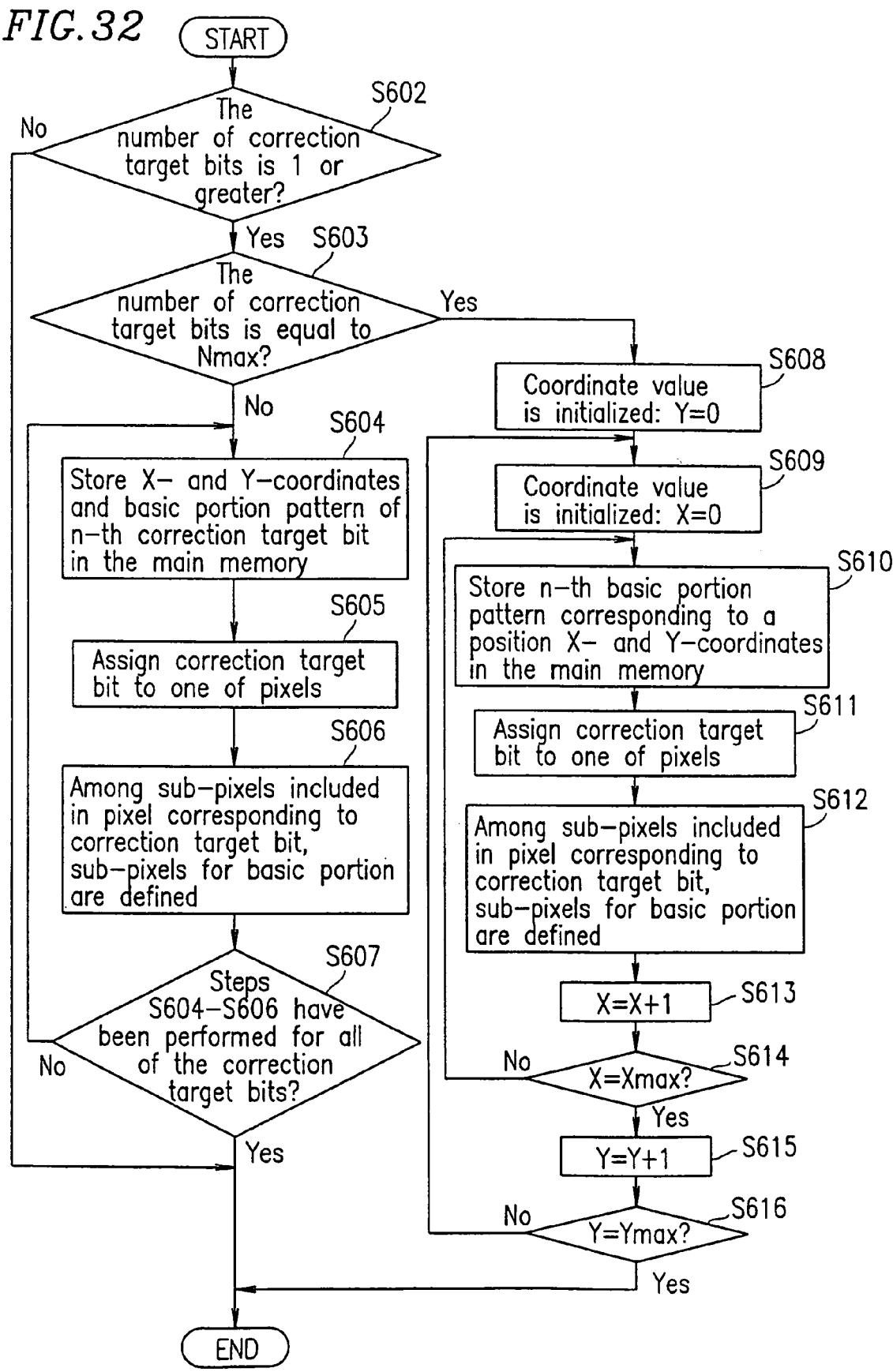
FIG. 32 is a flowchart showing a detailed procedure for defining a sub-pixel for the basic portion of the character based on the local correction data 5e.

FIG. 32 shows a detailed procedure for defining a sub-pixel for the basic portion of the character based on the local correction data 5e (Step 3860 of FIG. 28). Each step in the procedure of FIG. 32 will now be described.

Step S602: It is determined whether or not the number of correction target bits, N, is 1 or greater. If "Yes", the process proceeds to step S603. If "No", the process ends. This "No" at Step S602 means that the local correction data 59 has the data structure shown in FIG. 30. In this case, it is not necessary to define sub-pixels for the basic portion of the character based on the local correction data 5e.

Step S603: It is determined whether or not the number of correction target bits, N, is equal to Nmax. If "Yes", the process proceeds to step S608. This "Yes" at Step S603 means that the local correction data 5e has the data structure shown in FIG. 31.

If "No" at Step S603, the process proceeds to step S604. This "No" at Step S603 means that the local correction data 5e has the data structure shown in FIG. 29.

Step S604: An X-coordinate 3304 and Y-coordinate 3305 and a basic portion pattern 3306 of the n-th correction target bit (FIG. 29) are stored in the main memory 4. Herein, n is a natural number between 1 and N.

Step S605: The correction target bit is assigned to one of the pixels. This assignment is achieved in a similar manner to that of Step S5 included in the procedure described with reference to FIG. 10.

Step S606: Among sub-pixels included in a pixel corresponding to the correction target bit, sub-pixels for the basic portion are defined. This determination is achieved based on the basic portion pattern 3306 stored in the main memory 4 at Step S604.

Step S607: It is determined whether steps S604–S606 have been performed for all of the correction target bits. If "Yes", the process ends. If "No", the process returns to step S604, and then, steps S604–S606 are performed for other correction target bits.

Step S608: The coordinate value Y is initialized to 0.

Step S609: The coordinate value X is initialized to 0.

Step S610: The basic portion pattern 3306 (FIG. 31) of the n-th correction target bit located at a position represented by the coordinate value X and coordinate value Y Is stored in the main memory 4.

Step S611: The correction target bit is assigned to one of the pixels. This assignment is achieved in a similar manner to that performed in Step S605.

Step S612: Among sub-pixels included in a pixel corresponding to the correction target bit, a sub-pixel for the basic portion is defined. This determination is achieved based on the basic portion pattern 3306 stored in the main memory 4 at Step S610.

Step S613: The coordinate value X is incremented by 1.

Step S614: It is determined whether or not X=Xmax. Herein, Xmax denotes the maximum value of the X-coordinate in the bit map data of the character. If "Yes" at Step S614, the process proceeds to Step S615. If "No" at Step S614, the process returns to step S610.

Step S615: The coordinate value Y is incremented by 1.

Step S616: It is determined whether or not Y=Ymax. Herein, Ymax denotes the maximum value of the Y-coordinate in the bit map data of the character. If "Yes" at Step S616, the process ends. If "No" at Step S616, the process returns to step S609.

Figure 33:
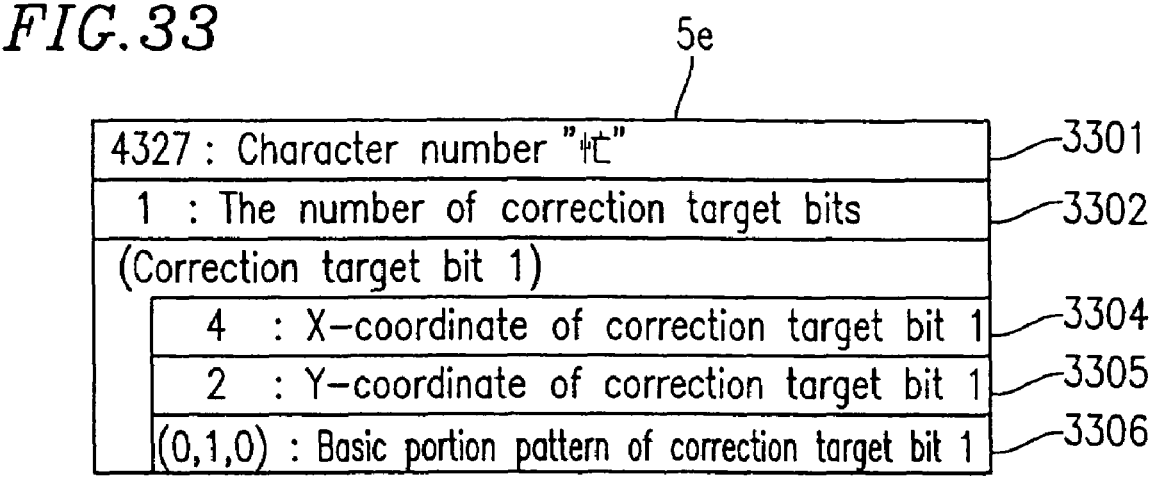
FIG. 33 shows an example of local correction data 5e of a Chinese character "忙".

FIG. 33 shows an example of a local correction data 5e of a Chinese character "化". The character number 3301 indicates that a character code of the character "化" is "4327". The number of correction target bits, 3302, indicates that the number of correction target bits included in bit map data which represents the character "化" is "1". The X-coordinate 3304 and Y-coordinate 3305 indicate that the correction target bit is at a position (4,2) in the bit map data. This correction target bit corresponds to the bit 3275 shown in FIG. 27A. The basic portion pattern 3306 indicates that when the correction target bit is assigned to a pixel, among three sub-pixels arranged along the horizontal direction (X-direction) in the pixel, a middle sub-pixel should be defined as a sub-pixel for the basic portion of the character.

Figure 34:
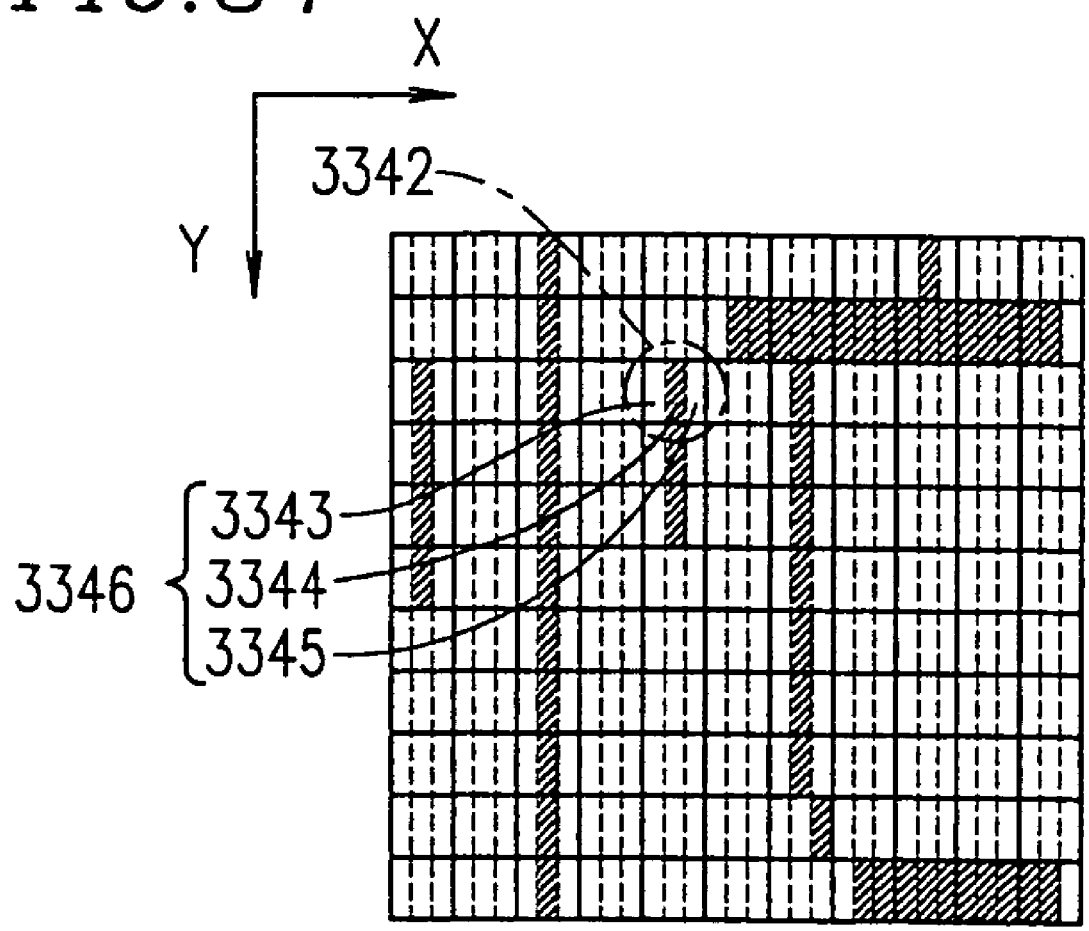
FIG. 34 shows the basic portions of the character "忙" which have been defined by executing Steps S3801 to S3860 in the procedure shown in FIG. 28 with the bit map data 3271 (FIG. 27A) and the local correction data 5e (FIG. 33).

FIG. 34 shows the basic portions of the character which have been defined by executing Steps S3801 to S3860 in the procedure shown in FIG. 28 with the bit map data 3231 (FIG. 27A) and the local correction data Se (FIG. 33).

The upper end portion of the third stroke of the character "忙", which is the encircled portion 3342 of FIG. 34, is arranged on a line on which the other portions of the third stroke are arranged. This is because among sub-pixels 3343–3345 included in the pixel 3346 (FIG. 34) which corresponds to the correction target bit 3275 (FIG. 27A), the middle sub-pixel 3344 is defined as a sub-pixel for the basic portion of the character.

In view of the quality of a character, it is desirable to define the basic portion of the character as shown in. FIG. 34 as compared with the example shown in FIG. 27B.

After the basic portion of the character has been defined as shown in FIG. 34, Stops S8–S11 in the procedure of FIG. 28 are executed. As a result, the character "忙" can be displayed with a high quality (i.e., displayed in a desirable shape).

The designation of the correction target bits to be corrected by the local correction data 5e and the selection of a method for defining sub-pixels for the basic portion for each of the correction target bits are performed in advance for bit map data of each character while considering the quality of the character to be displayed by the character display apparatuses 1b. The correction target bits are required to be designated only in a portion where the character is displayed in an undesirable shape when the basic portion definition rules described with reference to FIGS. 13A and 13B through 16A and 16B are applied. Although, the data amount required for displaying a character is increased due to the presence of the local correction data 5e, the increased amount is small. Thus, according to embodiment 2 of the present invention, a character display apparatuses 1b in which a character which is represented by bit map data can be displayed with a high definition and a high quality and the data amount required for displaying the character is small is achieved.

Thus, in the character display apparatuses 1b (FIG. 8B) according to embodiment 2 of the present invention, sub-pixels included in a pixel (i.e., a group of sub-pixels) corresponding to a bit which is not a correction target bit are controlled based on information about bits located around the bit through Steps S6 and S8–S11 shown in FIG. 28 (Process (1)). Meanwhile, sub-pixels included in a pixel corresponding to a correction target bit are controlled based on the basic portion pattern 3306 of the local correction data 5e through Steps S3860–S11 shown in FIG. 28 (Process (2)) With such processes, the character can be display on the display device 3 with a high definition and with a high quality.

Whether the character display apparatuses 1b performs determination of the basic portion of the character based on information about vicinal bits around each of the bits included in the bit map data or based on the basic portion pattern defined by the local correction data depends on the local correction data. Thus, the local correction data can be recognized as additional information which is prepared for each of the bits included in the bit map data and which indicates how to defines the basic portion for the bit. Therefore, it is recognized that a bit which is not designated as a correction target bit in the local correction data is provided with additional information which represents "the basic portion is defined based on information about bits located around the bit", and a bit which is designated as a correction target bit in the local correction data is provided with additional information which represents "the basic portion in defined based on the basic portion pattern" and which designates the basic portion pattern. Thus, the character display apparatuses 1b selectively performs Process (1) or Process (2) in accordance with the information provided to each of the bits included in the bit map data.

The entirety of a character may not be displayed according to the display principle described in embodiment 2 of the present invention. In the case where at least a portion of the character is displayed according to the display principle described in embodiment 2 of the present invention, and the other portion is displayed according to any conventional technique, the at least a portion of the character can be displayed with a high definition and with a high quality. Thus, the above additional information is only required to be provided to one of the bit map data which represents the shape of the character.

Correction target bits included in bit map data which represents a character may have a value of "1" or "0". Which sub-pixels are defined as sub-pixels for the basic portion among sub-pixels included in a pixel corresponding to the correction target bit depends only on the basic portion pattern of the correction target bit, that is, whether the value of the correction target bit is "1" or "0". Thus, when all of the bits included in the bit map data which represents the shape of the character are correction target bits, i.e., when the local correction data has a data structure shown in FIG. 31, the basic portion of the character is defined based only on the local correction data without depending on the bit map data which represents the shape of the character, whereby the character is displayed with a high quality.

In embodiment 3 of the present invention which will be described below, a character display apparatus capable of displaying a character with a high quality when all of the bits included in the bit map data which represents the shape of the character are correction target bits is described.

Embodiment 3

Figure 8C:
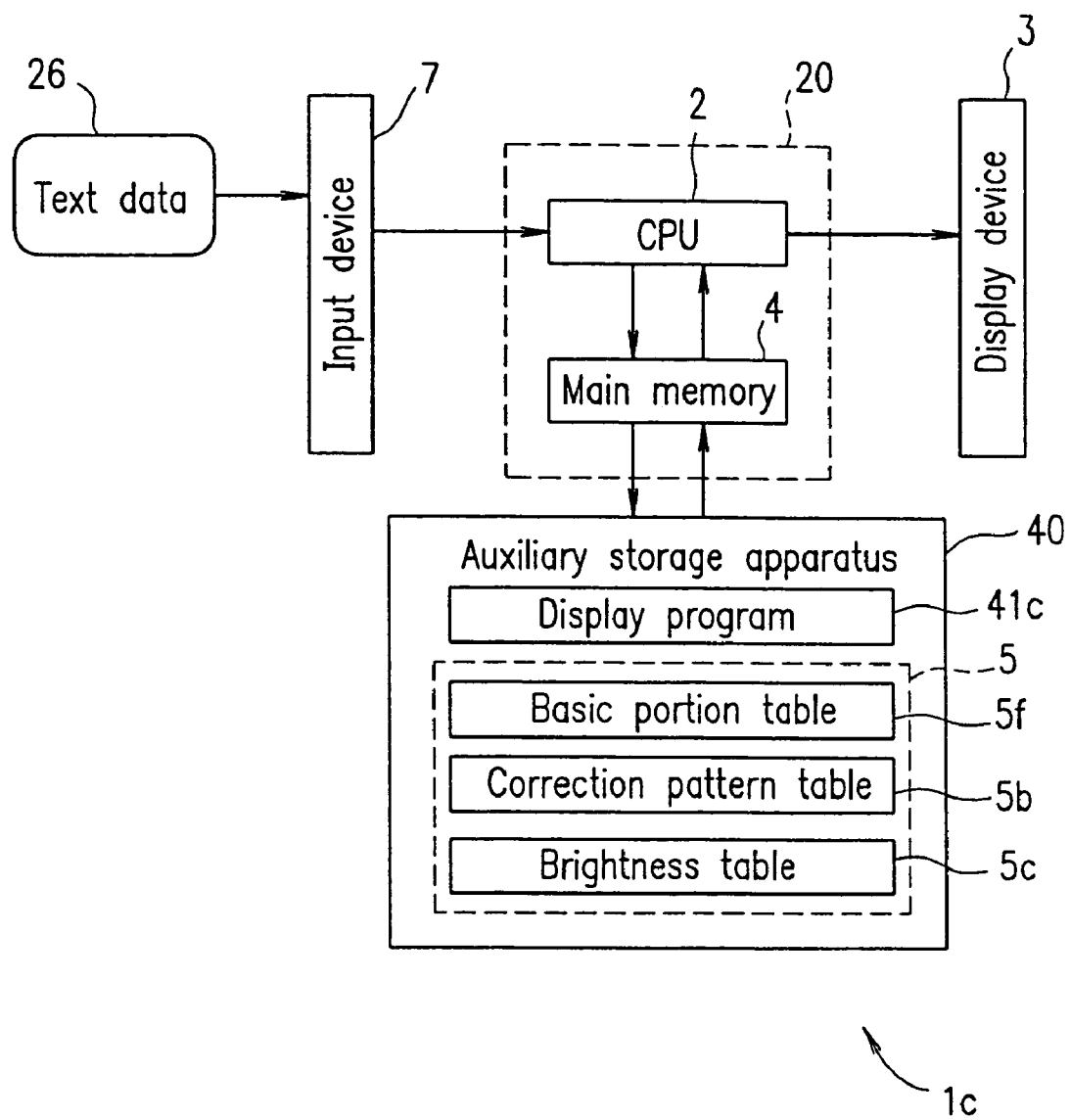

FIG. 8C shows a structure of character display apparatus 1c according to embodiment 3 of the present invention. In FIG. 8C, like elements are indicated by like reference numerals used in FIG. 8B, and detailed descriptions thereof are omitted.

The character display apparatus 1c may be, for example, a personal computer. Such a personal computer may be of any type such as a desk top type or lap top type computer. Alternatively, the character display apparatus 1c may be a word processor.

Moreover, the character display apparatus 1c may alternatively be any information display apparatus such as an electronic apparatus or information apparatus incorporating a color display device. For example, the character display apparatus 1c may be an electronic apparatus incorporating a color liquid crystal display device, a portable information terminal which is a portable information tool, a portable phone including a PHS, a general-purpose communication apparatus such as a telephone/FAX or the like.

The character display apparatus 1c does not have the bit map data 5a shown in FIG. 8B. Furthermore, the character display apparatus 1c includes basic portion data 5f in place of the local correction data 5e shown in FIG. 8B.

The basic portion data 5f included in the auxiliary storage apparatus 40 has, for example, a similar data structure to that of the local correction data 5e shown in FIG. 31.

In the local correction data 5e shown in FIG. 31, the basic portion of a character is defined based on the basic portion pattern 3306 for all of the bit map data which represents the shape of the character. This basic portion is represented as, for example, (0,1,0), where each of the elements, "0", "1", and "0", corresponds to one sub-pixel. As described above, the element "1" corresponds to a sub-pixel for the basic portion of the character. In this way, the basic portion data 5f defines the basic portion of the character on a sub-pixel by sub-pixel basis.

The procedure for processing the display program 41c is the same as that for processing the display program 41b except that Steps S3803–S3805 of the procedure shown in FIG. 28 and Steps S602, S603, and S604–S607 of the procedure shown in FIG. 32 can be omitted.

The data structure of the basic portion data 5f is not limited to the same structure as that of the local correction data 5e shown in FIG. 31, but may be any data structure which defines the basic portion of the character on a sub-pixel by sub-pixel basis. For example, the basic portion data 5f may not have a basic portion pattern which defines sub-pixels for the basic portion of the character for each correction target bit (i.e., for each pixel). The basic portion data 5f may have a basic portion pattern which defines the basic portion of the entire character. In such a case, each element of the basic portion defined for the entire character is directly assigned to a sub-pixel of a display device in place of the processes performed at steps S611 and S612 shown in FIG. 32.

The basic portion data 5f may have a data structure with a data amount reduced according to a compression scheme such as a run-length compression scheme or the like. Especially, when the size of a character to be displayed based on the basic portion data 5f is large, an effect of reducing the data amount according to a compression scheme is increased.

As described above, the control section 20 of the character display apparatus 1c reads the basic portion data 5f from the auxiliary storage apparatus (storage) 40 at Step 610 of FIG. 32.

Furthermore, at Step S8 of FIG. 10, the control section 20 of the character display apparatus 1c sets the color element level of at least one specific sub-pixel corresponding to the basic portion of the character to a predetermined color element level (e.g., a maximum color element level).

Furthermore, at Step S9 of FIG. 10, the control section 20 of the character display apparatus 1c sets the color element level of a sub-pixel adjacent to at least one specific sub-pixel which corresponds to the basic portion of the character to a predetermined color element level (e.g. any color element level except for a maximum color element level).

Thus, a character can be displayed with a high definition, with a high quality, and without causing a color noise on the display device 3.

Embodiment 4

Figure 8D:
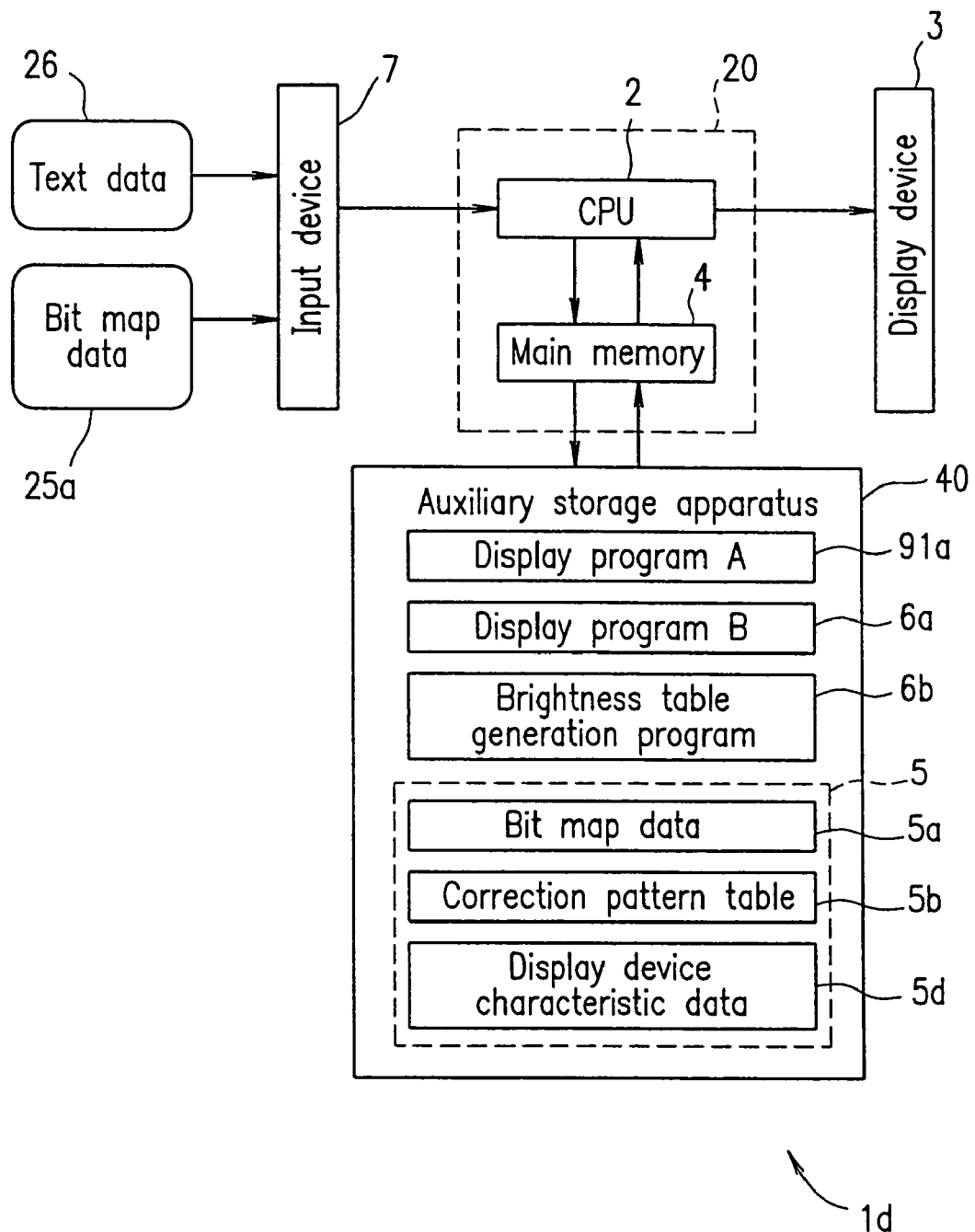
FIG. 8D illustrates a structure of a graphic display apparatus 1d according to embodiment 4 of the present invention.

FIG. 8D shows a structure of a graphic display apparatus 1d according to embodiment 4 of the present invention. In FIG. 5D, like elements are indicated by like reference numerals used in FIG. 8A, and detailed descriptions thereof are omitted.

Moreover, the graphic display apparatus 1d may be any information display apparatus such as an electronic apparatus or information apparatus incorporating a color display device.

A display program A 91a is used for displaying a graphic on the display device 3 according to a conventional technique for displaying a graphic represented by binary bit map data 5a or 25a on a pixel by pixel basis. A display program B 6a is used when a graphic represented by binary bit map data 5a or 25a is displayed on the display device 3 according to the graphic display method of the present invention. The procedure for displaying a graphic by the display program B 6a is the same as that described with reference to FIG. 10.

Alternatively, the procedure for displaying a graphic by the display program B 6a may be the same as that described with reference to FIG. 28. In such a case, the graphic display apparatus 1d may include the local correction data 5e shown in FIG. 8B or the basic portion data 5f shown in FIG. 8C.

Display device characteristic data 5d indicates input/output characteristics of the display device 3. For example, the display device characteristic data 5d may be, for example, a table or a function formula which represents the relationship between an input brightness level and an output brightness value for each color element.

A brightness table generation program 6b contains characteristic data of the reference display device (hereinafter, referred to as a "reference display device characteristic") and a corresponding brightness table which is used as a reference table (reference brightness table). The brightness table generation program 6b generates a brightness table suitable for the display device 3 according to a predetermined procedure while referring to the display device characteristic data 5d.

An operation of the brightness table generation program 6b is now described below.

Figure 35:
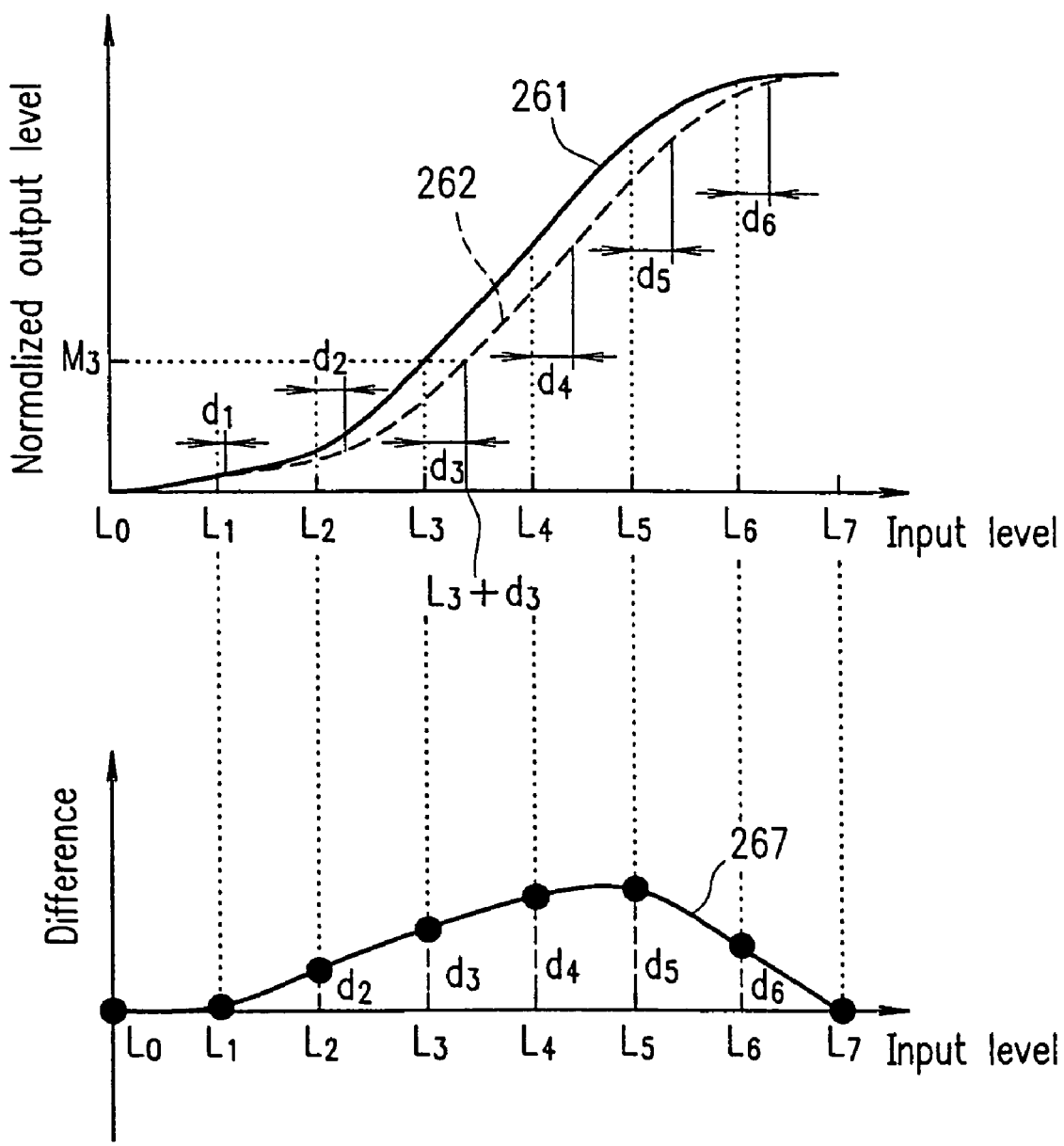
FIG. 35 shows a relationship between the reference display device characteristic and a characteristic of the display device 3.

FIG. 35 shows a relationship between the reference display device characteristic and a characteristic of the display device 3. A curve 261 denotes the reference display device characteristic and a curve 262 denotes the characteristic of the display device 3 (display device characteristic data 5d). An input level (horizontal axis) is, for example, the brightness level of a sub-pixel. A normalized output level (vertical axis) is, for example, a value obtained by normalizing an actual brightness value of a sub-pixel on the display device. The curves 261 and 262 respectively denote a reference display device characteristic and a characteristic of the display device 3 for a specific color element. Such a relationship between a reference display device characteristic and a characteristic of the display device 3 is obtained for each of color elements (R,G,B).

As shown by the curves 261 and 262, the characteristic of the display device 3 does not necessarily coincide with the reference display device characteristic. For example, an input level required for obtaining a desirable normalized output level $M_3$ in a display device, which is used as a reference display device, is $L_3$. However, an input level required for obtaining the normalized output level $M_3$ in the display device 3 is $L_3+d_3$. The value $d_3$ is a difference value in the input level $L_3$. Values $d_1$–$d_6$ shown in FIG. 35 are difference values in input levels $L_1$–$L_6$. As seen in FIG. 35, each of the difference values at input levels $L_0$ and $L_7$ is 0. A curve 267 denotes a relationship between the input level and the difference value. When it is assumed that the input levels $L_0$–$L_7$ are brightness levels corresponding to the color element levels 0–7 in a reference brightness table, the correction amount to be reflected in the reference brightness table is obtained for each color element from difference values shown by the curve 267. That is, in the example illustrated above, the brightness level $L_3$ which corresponds to the color element level 3 in the reference brightness table is corrected by the difference value $d_3$. In the corrected brightness table, the brightness level corresponding to the color element level 3 results in $L_3+d_3$.

FIG. 36 shows correction amounts for the reference brightness table. Values shown in table 2792 are correction amounts for the brightness levels and are difference value, shown by the curve 267 (FIG. 35), for each of color elements (R,G,B). However, when a difference value is greater than a difference of brightness levels corresponding to two adjacent color element levels defined in the reference brightness table, the correction amount for the brightness level may be restricted within the difference of the brightness levels. For example, in the case of employing a brightness table 92 shown in FIG. 5 as a reference brightness table, the difference between the brightness level (36) for color element level 6 in a color element R column and the brightness level (73) for color element level 5 in a color element R column is 37. Thus, the upper limit of the correction amount for the brightness level for color element level 6 in a color element R is limited to within 37. With such a structure, the correction amount for the brightness level can be set so as to be in accordance with the reference brightness table. It should be noted that the correction amounts shown in table 2792 are exemplary and can be varied according to the characteristic of the display device 3.

FIG. 37 shows a corrected brightness table 2892 which is obtained by correcting the reference brightness table. The corrected brightness table 2892 is obtained by adding, using the brightness table 92 shown in FIG. 5 as a reference brightness table, correction amounts shown in the table 2792 (FIG. 36) to the brightness levels defined in the brightness table 92.

Such a corrected brightness table is used when the display program B 6a converts the color element level to the brightness level, for example, at Step S10 in the procedure shown in FIG. 10.

Figure 38:
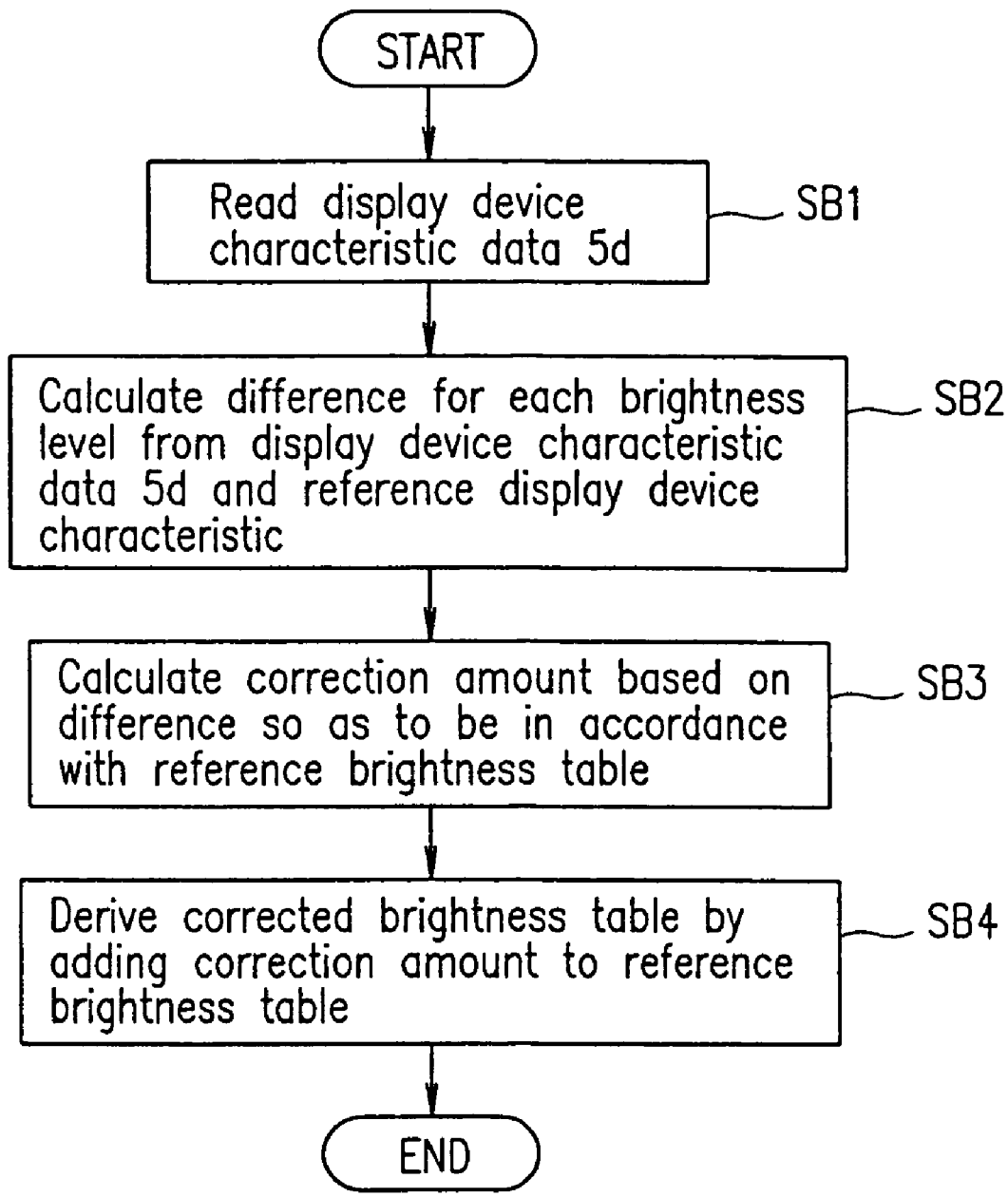
FIG. 38 illustrates a procedure for processing a brightness table generation program 6b.

FIG. 38 illustrates a procedure for processing the brightness table generation program 6b. The brightness table generation program 6b is executed by the CPU 2. Furthermore, the brightness table generation program 6b is executed, for example, when the display device 3 is replaced with another, and contents of the display device characteristic data 5d are changed accordingly. Each step in the procedure for processing the brightness table generation program 6b will now be described.

Step SB1: The contents of the display device characteristic data 5d are read into the main memory 4.

Step SB2: The display device characteristic read at Step SB1 and the reference display device characteristic are compared, whereby a difference value is calculated for each brightness level. Herein, each brightness level is a brightness level which is defined for each color element and each color element level in the reference brightness table. The comparison between the display device characteristic read at Step SB1 and the reference display device characteristic is performed for each of color elements (R,G,B). The reference display device characteristic and the reference brightness table are incorporated in the brightness table generation program 6b.

Step SB3: Correction values are calculated based on the difference value obtained at Step SB2 so as to be in accordance with the reference brightness table.

Step SB4: The correction amount calculated at Step SB3 is added to the reference brightness table, whereby a corrected brightness table is derived.

It should be noted that the reference display device characteristic and the characteristic of the display device 3 are not limited to the expression system of color elements R, G, and B. For example, a characteristic data may be displayed based on an expression system of color elements C(cyan), Y(yellow), and M(magenta). The characteristic data which has been displayed based on other expression system can be converted into the expression system of color elements R, G, and B using a predetermined function formula.

When content data such as electronic books or the like is displayed by the graphic display apparatus 1d, the display program A 91a may not only display a graphic on the display device 3 but also include basic functions for reading an electronic book such as a page layout, flipping of pages, bookmarks, etc. When a graphic is displayed, the display program A 91a checks whether or not there is a display program B 6a. If so, the above basic functions are realized by the display program A 91a, the function for displaying a graphic on the display device 3 is realized by the display program B 6a. If there is no display program B 6a, the above basic functions and the function for displaying the graphic on the display device 3 are realized by the display program A 91a. In this case, the graphic can be displayed using a conventional technique in which the graphic is controlled on a pixel by pixel basis. Such a control is executed by the control section 20.

When the graphic display apparatus 1d is structured as described above, the display program B 6a, the brightness table generation program 6b, and the correction pattern table 5b may not be stored in the auxiliary storage apparatus 40 but may be supplied from outside. In this case, the graphic display apparatus 1d includes only the display program A 91a, bit map data 5a, and the display device characteristic data 5d in the auxiliary storage apparatus 40, i.e., the graphic display apparatus 1d itself only includes the above basic functions and a function for displaying a graphic according to a conventional technique. When the display program B 6a, the brightness table generation program 6b, and the correction pattern table 5b are supplied as parts of the content data of the electronic book, for example, in the form of applets, the applets are utilized in the graphic display apparatus 1d as a program and data. Thus, the graphic display function capable of displaying a graphic with a high definition according to the present invention can be realized.

By supplying programs and data in the form of applets, the graphic display technique of the present invention can be applied to a conventional personal computer or a portable information terminal. Whether or not an applet is included as a part of content data is determined by the control section 20. With such an arrangement, for example, in the graphic display apparatus 1d, in addition to the basic functions, a function for displaying an electronic book which includes characters with a high definition is achieved. The electronic book displayed with characters with a high definition provides a function for reducing the eye strain of a reader. Especially when an electronic book is read in a size-limited portable information apparatus, a character displayed with a high definition is desirable.

The content data such as an electronic book which includes such applets is supplied from a recording medium such as a CD-ROM, a memory card, etc. The content data may be input to the graphic display apparatus 1d through a reading device (input device 7) for the recording medium or may be input to the graphic display apparatus 1d through a network communication path. The network communication path may be a telephone line or a wireless communication line. Furthermore, the applets may not be input as parts of the content data but may be input solely into the graphic display apparatus 1d.

According to the present invention, each of the bits included in bit map data which represents a graphic is assigned to a group including any plural number of sub-pixels, and each sub-pixel included in the group is separately controlled stepwise based on information about bits located in the vicinity of the bit corresponding to the group. Although the resolution of the bit map data corresponds to the size of each group of sub-pixels, the resolution for displaying the graphic corresponds to the size of each sub-pixel. Thus, the graphic can be displayed with a definition higher than that of the bit map data which represents the graphic. Furthermore, the bit map data used in the present invention is binary bit map data which is the same as a conventionally-employed dot font. Thus, the amount of data required for displaying the graphic is reduced.

Furthermore, according to the present invention, additional information is provided to at least one of the bits included in bit map data which represents a character, and a mode for controlling sub-pixels included in a group corresponding to the bit provided with the additional information is switched according to the additional information between the following two different modest (1) the sub-pixels are controlled based on information about bits located in the vicinity of the bit provided with the additional information; and (2) the sub-pixels are controlled based on a pattern determined by the additional information. When a portion of a character whose sub-pixels are controlled based on information about vicinal bits is displayed in an undesirable shape, the sub-pixels are controlled based on a pattern determined by the additional information. With such an arrangement, the character represented by the bit map data can be displayed with a high definition and a high quality, and the amount of data required for displaying the character is reduced.

Further still, according to the present invention, the color element level of at least one particular sub-pixel corresponding to a basic portion of a character is set to a predetermined color element level based on basic portion data, and the color element level of at least one sub-pixel located adjacent to the at least one particular sub-pixel corresponding to the basic portion of the character is set to a color element level different from the predetermined color element level. The intensity of each of a plurality of color elements is represented stepwise through a plurality of color element levels, and thus, the color element levels of adjacent sub-pixels can be set such that the color element levels gradually increases/decreases from sub-pixel to sub-pixel. With such an arrangement, occurrence of a color noise can be suppressed. The basic portion data defines the basic portion of the character on a sub-pixel by sub-pixel basis, and therefore, the character can be displayed with a high definition and a high quality.

The present invention is applicable in displaying characters used in any language (e.g., Chinese characters, the Hangul (Korean) alphabet, characters used in various European languages, etc.).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A character display apparatus for displaying a character which is represented by binary bit map data, comprising:
    a display device including a plurality of sub-pixels; and
    a control section for controlling the display device,
    wherein the plurality of sub-pixels form a plurality of groups,
    each of the plurality of groups includes a predetermined plural number of sub-pixels,
    the control section assigns each of bits included in the bit map data to one of the plurality of groups, and
    according to additional information provided to at least one of the bits included in the bit map data, the control section switches a mode for controlling sub-pixels included in a group to which the bit provided with the additional information is assigned between the following two different modes:
        (1) the sub-pixels are controlled based on information about bits located in the vicinity of the bit provided with the additional information: and
        (2) the sub-pixels are controlled based on a pattern designated by the additional information.

2. A character display method for displaying a character which is represented by binary bit map data on a display device including a plurality of sub-pixels, wherein:
    the plurality of sub-pixels form a plurality of groups;
    each of the plurality of groups includes a predetermined plural number of sub-pixels; and
    the method comprises steps of:
        (a) assigning each of bits included in the bit map data to one of the plurality of groups; and
        (b) according to additional information provided to at least one of the bits included in the bit map data, switching a mode for controlling sub-pixels included in a group to which the bit provided with the additional information is assigned between the following two different modes:
            (b-1) the sub-pixels are controlled based on information about bits located in the vicinity of the bit provided with the additional information; and
            (b-2) the sub-pixels are controlled based on a pattern designated by the additional information.

3. A recording medium which can be read by an information display apparatus incorporating a display device including a plurality of sub-pixels, wherein:
    the recording medium contains a program for allowing the information display apparatus to execute a character display process;
    the plurality of sub-pixels form a plurality of groups;
    each of the plurality of groups includes a predetermined plural number of sub-pixels; and
    the character display process comprises steps of:
        (a) assigning each of bits included in binary bit map data to one of the plurality of groups; and
        (b) according to additional information provided to at least one of the bits included in the bit map data, switching a mode for controlling sub-pixels included in a group to which the bit provided with the additional information is assigned between the following two different modes:
            (b-1) the sub-pixels are controlled based on information about bits located in the vicinity of the bit provided with the additional information; and
            (b-2) the sub-pixels are controlled based on a pattern determined by the additional information.

4. A program for allowing an information display apparatus incorporating a display device including a plurality of sub-pixels to execute a character display process, wherein:

the plurality of sub-pixels form a plurality of groups;

each of the plurality of groups includes a predetermined plural number of sub-pixels; and the character display process comprises steps of:
- (a) assigning each of bits included in binary bit map data to one of the plurality of groups; and
- (b) according to additional information provided to at least one of the bits included in the bit map data, switching a mode for controlling sub-pixels included in a group to which the bit provided with the additional information is assigned between the following two different modes:
- (b-1) the sub-pixels are controlled based on information about bits located in the vicinity of the bit provided with the additional information; and
- (b-2) the sub-pixels are controlled based on a pattern determined by the additional information.

* * * * *